Aug. 4, 1959 E. M. PALMER 2,898,574

APPARATUS FOR PROFILE PRESENTATION OF SEISMIC INFORMATION

Filed June 20, 1956 19 Sheets-Sheet 1

Aug. 4, 1959 E. M. PALMER 2,898,574

APPARATUS FOR PROFILE PRESENTATION OF SEISMIC INFORMATION

Filed June 20, 1956 19 Sheets-Sheet 2

INVENTOR.
Elton M. Palmer
BY Horace B. Cooke
ATTORNEY

APPARATUS FOR PROFILE PRESENTATION OF SEISMIC INFORMATION

Filed June 20, 1956 19 Sheets-Sheet 3

INVENTOR.
Elton M. Palmer.
BY
ATTORNEY.

APPARATUS FOR PROFILE PRESENTATION OF SEISMIC INFORMATION

Filed June 20, 1956 19 Sheets-Sheet 4

INVENTOR.
Elton M. Palmer
BY
Howard Cooke
ATTORNEY

Aug. 4, 1959 E. M. PALMER 2,898,574

APPARATUS FOR PROFILE PRESENTATION OF SEISMIC INFORMATION

Filed June 20, 1956 19 Sheets-Sheet 5

INVENTOR.
Elton M. Palmer

BY

ATTORNEY

INVENTOR.
Elton M. Palmer
BY
[signature]
ATTORNEY

APPARATUS FOR PROFILE PRESENTATION OF SEISMIC INFORMATION

Filed June 20, 1956 19 Sheets-Sheet 7

INVENTOR.
Elton M. Palmer.
BY [signature]
ATTORNEY

BY

APPARATUS FOR PROFILE PRESENTATION OF SEISMIC INFORMATION

Filed June 20, 1956 19 Sheets-Sheet 9

INVENTOR.
Elton M. Palmer
ATTORNEY

APPARATUS FOR PROFILE PRESENTATION OF SEISMIC INFORMATION

INVENTOR.
Elton M. Palmer
BY
Horace B. Cooke
ATTORNEY

INVENTOR.
Elton M. Palmer
BY Horace B. Cooke
ATTORNEY

INVENTOR.
Elton M. Palmer
BY Horace B. Cooke
ATTORNEY

APPARATUS FOR PROFILE PRESENTATION OF SEISMIC INFORMATION

Filed June 20, 1956 19 Sheets-Sheet 13

INVENTOR.
Elton M. Palmer
BY
Horace B. Cooke
ATTORNEY

Aug. 4, 1959 E. M. PALMER 2,898,574

APPARATUS FOR PROFILE PRESENTATION OF SEISMIC INFORMATION

Filed June 20, 1956 19 Sheets-Sheet 15

INVENTOR.
Elton M. Palmer.
BY- Horace B. Clarke
ATTORNEY.

INVENTOR.
Elton M. Palmer
By- Horace B. Cooke
ATTORNEY

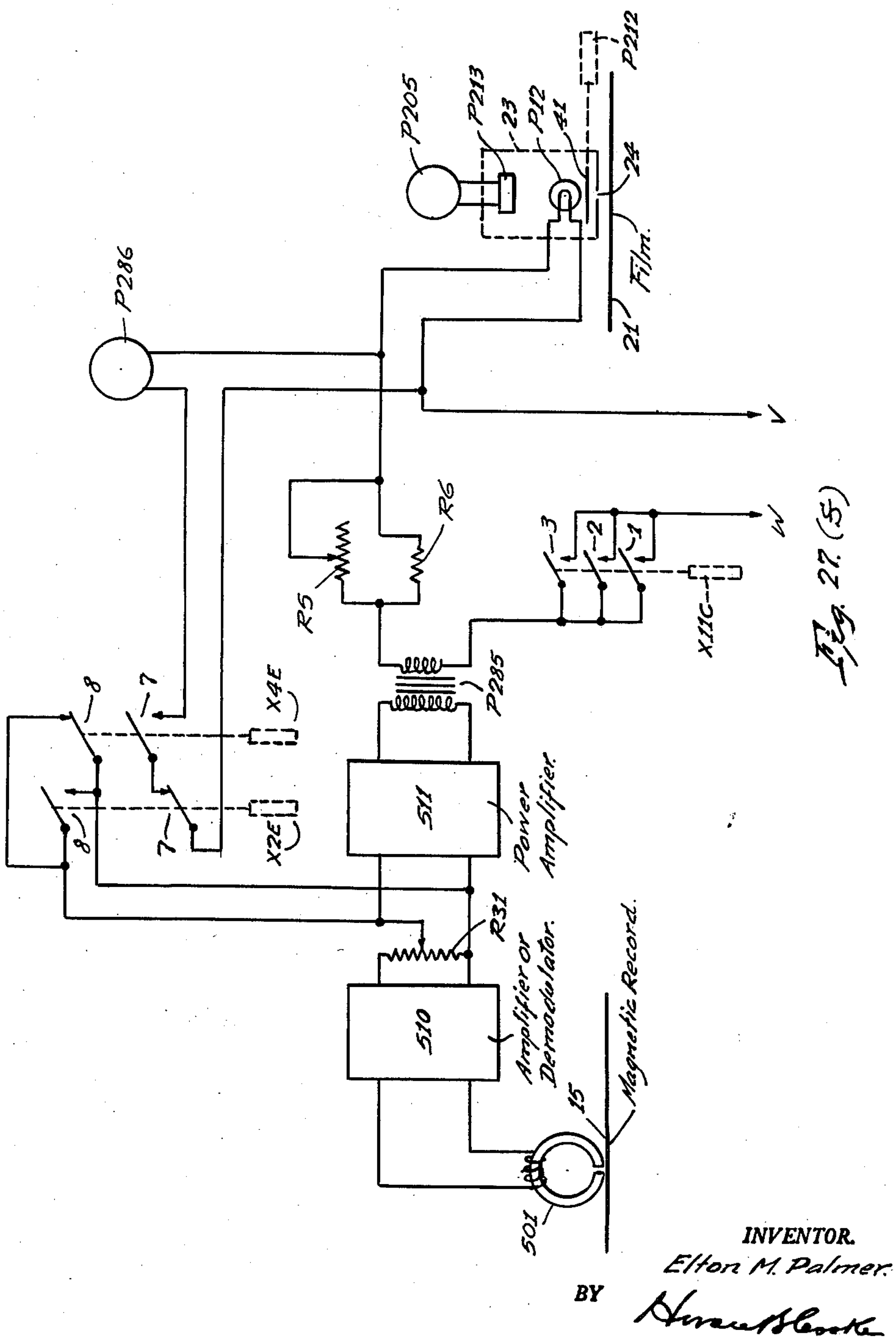
Fig. 27. (5)
INVENTOR.
Elton M. Palmer
BY Horace B. Cooke
ATTORNEY

United States Patent Office 2,898,574

Patented Aug. 4, 1959

2,898,574

APPARATUS FOR PROFILE PRESENTATION OF SEISMIC INFORMATION

Elton M. Palmer, Oakmont, Pa., assignor to Gulf Research & Development Company, Pittsburgh, Pa., a corporation of Delaware

Application June 20, 1956, Serial No. 592,563

4 Claims. (Cl. 340—15)

This invention concerns apparatus employed in the seismic method of geophysical prospecting and in particular concerns apparatus for automatically converting seismograms made in the form of magnetic records into spatially-coordinated, time-corrected, variable-density tracks for visual portrayal of the seismic information.

This application is a continuation-in-part of my copending application Serial No. 561,085 on Seismograph Profile Printer filed January 24, 1956, now Patent No. 2,861,507 and assigned to the same assignee as this application.

In the seismic prospecting art it is conventional to explode a charge of high explosive at or near the surface of the ground and to receive the resulting earth tremors at spaced points usually lying in a straight line by means of geophones (also called detectors) which are connected through amplifiers to recording galvanometers to produce a seismogram having as many tracks as there are signal channels in the seismograph apparatus employed. These seismograms are analyzed and various computations are made to compute the depth and configuration of reflecting horizons below the spread of geophones and these procedures are well known in the seismograph interpretation art. The seismograms which are obtained in the field operations may either be variable-amplitude, variable-area or variable-density records made on a photographic recording medium, or alternatively may be in the form of a magnetic record made on a magnetic recording medium. Apparatus for making multi-channel seismograms in the form of magnetic recordings is now well known in this art.

Whereas geophysical-prospecting seismograms made in the form of magnetic recordings are known to be advantageous for many reasons, a problem arises in that they must be converted to another form for visual presentation of the information which they contain. For purposes of computation the variable amplitude form of track is convenient, but for a particularly lucid presentation of all the recorded information the variable-density form of track is preferred. In the above-mentioned copending application Serial No. 561,085 (now Patent 2,861,507) there is disclosed and claimed apparatus for automatically making a time-corrected variable-density profile from variable-density field records by a contact printing process. The present invention concerns apparatus for automatically making a time-corrected variable-density profile from magnetic recordings and includes means for time-correcting the records in the transducing process.

Accordingly it is an object of this invention to provide apparatus by means of which multi-channel magnetically-recorded seismograms may be automatically sequentially reproduced in the form of a substantially continuous profile or seismic cross section portrayed in variable-density form.

It is another object of this invention to provide an apparatus for automatically sequentially converting multi-channel magnetically-recorded seismograms into variable-density tracks and concurrently correcting the time of recorded events for known time irregularities.

It is a further object of this invention to provide apparatus for automatically sequentially converting multi-channel magnetically-recorded seismograms into variable-density tracks in proper sequence and concurrently with the conversion automatically making time corrections which may be either fixed or variable or both.

It is a further object of this invention to provide apparatus for producing from a number of magnetically-recorded seimograms a lateral sequence of variable-density tracks with each track corrected for known time variations and arranged in a sequence which corresponds to the spatial sequence of geophone locations on the ground.

It is a further object of this invention to provide apparatus for automatically converting magnetically-recorded multi-channel seismograms to time-corrected variable-density tracks in useful combinations and/or order of sequence, such sequence being under control of the operator.

These and other useful objects are attained by the apparatus described in this specification, of which the drawings form a part, and in which Figure 1 shows a representation of a typical multi-track magnetically-recorded seismogram as obtained in seismic field operations;

Figure 24:
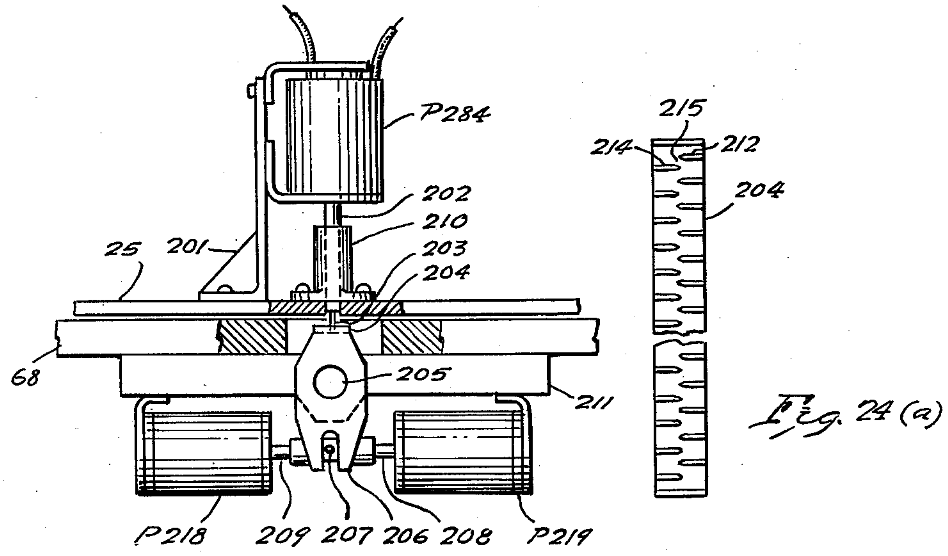
Figure 22:
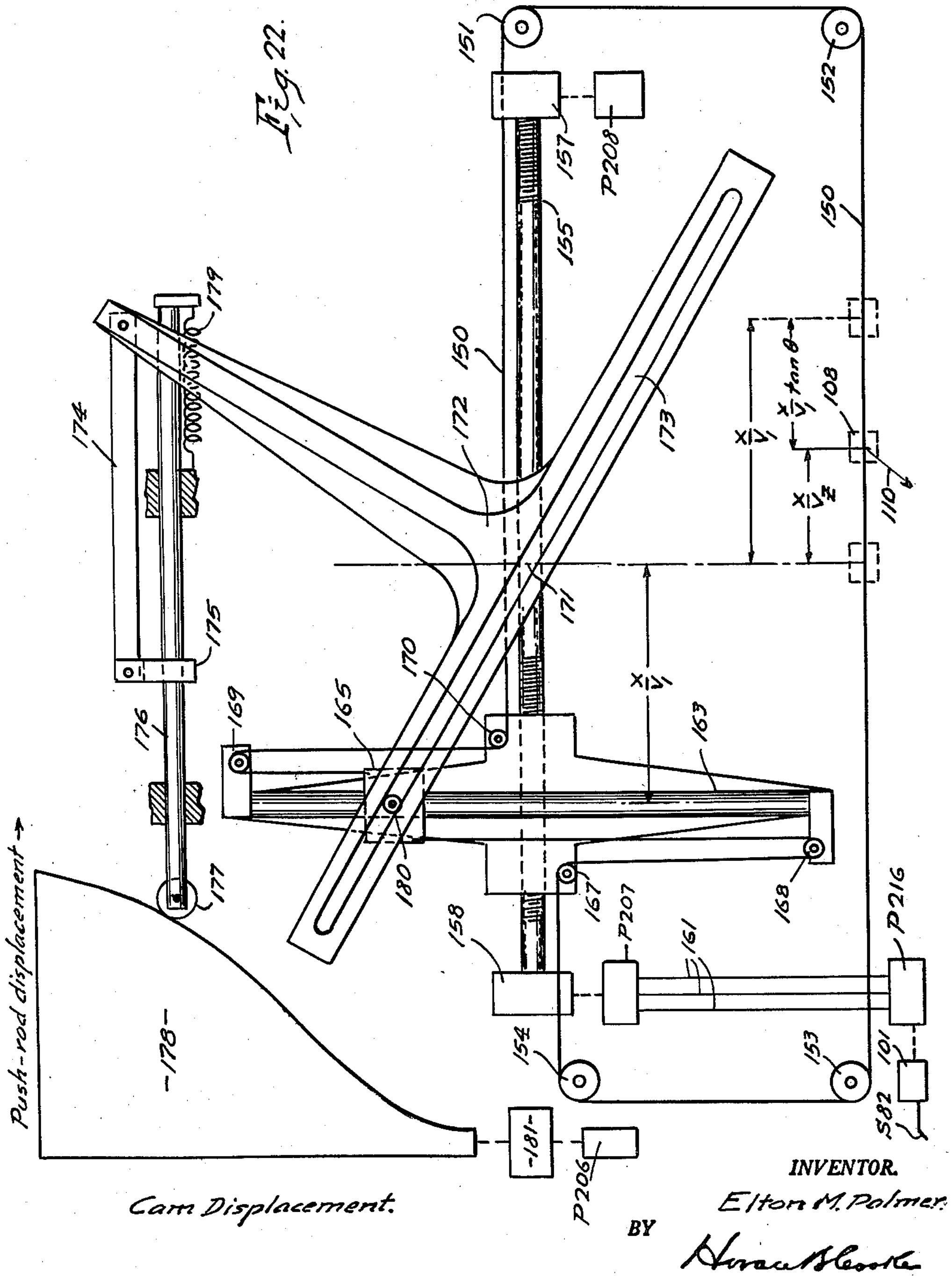
Figures 23, 23A, 23B:
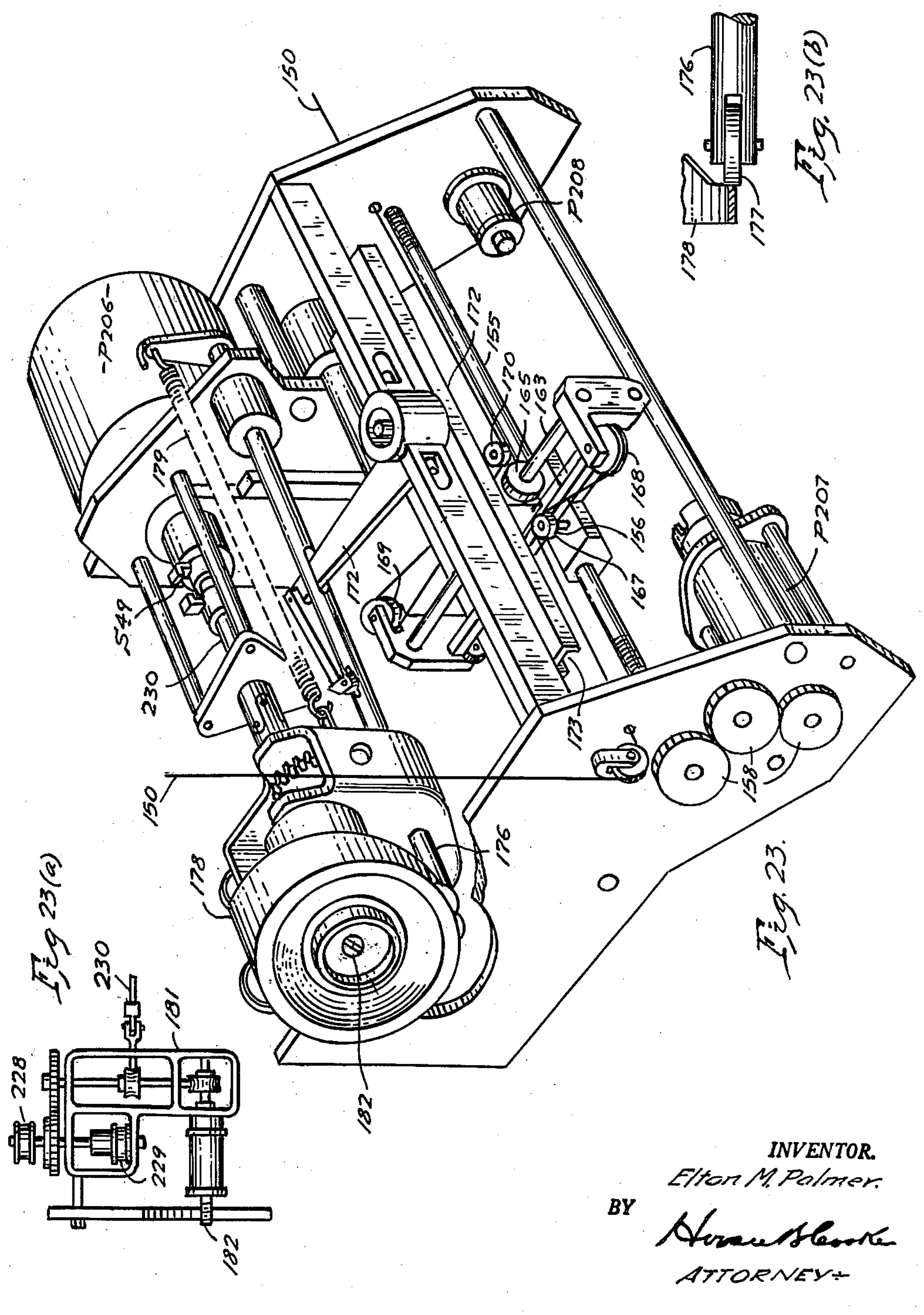
Figure 25:
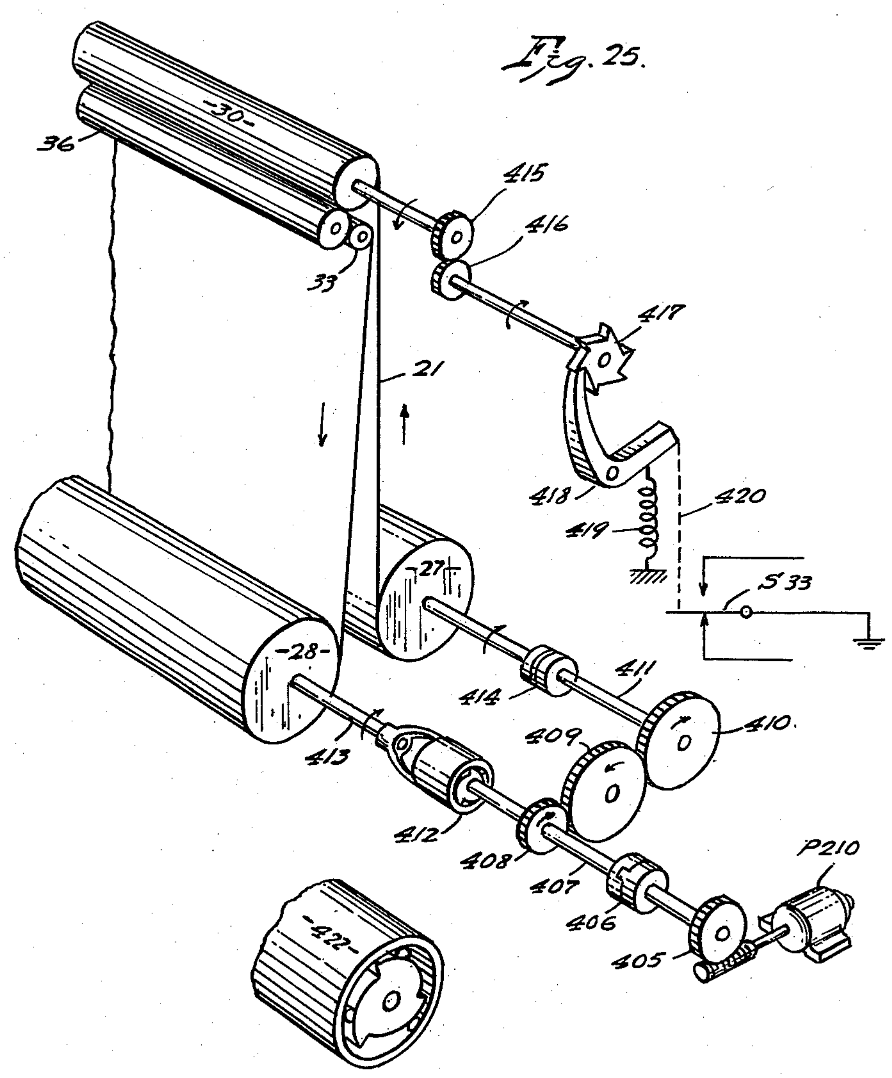
Figure 26:
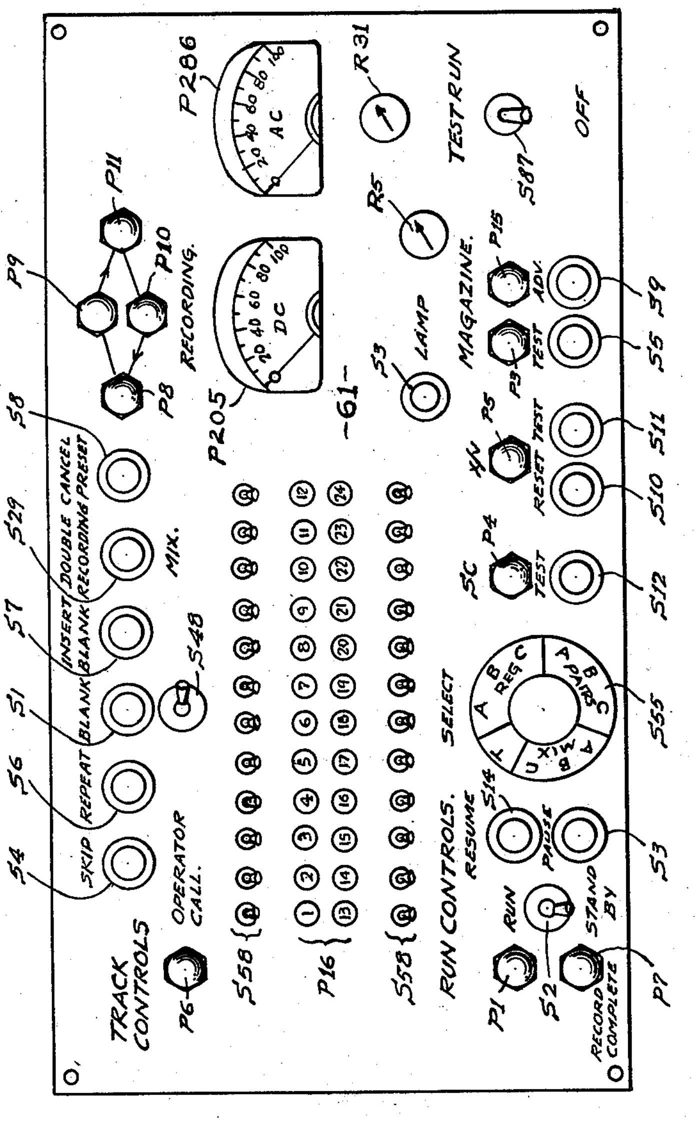

Figure shows a typical developed shape of a cam for correcting for velocity changes with seismic travel time;

Figure 22 illustrates diagrammatically the operation of the computer mechanism for effecting the variable corrections;

Figures 23, 23(*a*) and 23(*b*) show respectively a perspective view of the computer mechanism and two of its details;

Figures 24 and 24(*a*) show in detail the record-carrier plate advancing escapement;

Figures 25 and 25(*a*) show respectively an exploded perspective view of the film-advancing mechanism of the film magazine and one of its details;

Figure 26 shows an enlarged view of the main control panel of the apparatus;

Figures 27(*a*), (*b*), (*c*), (*d*), (*e*), and (*f*) show a schematic wiring diagram of the apparatus;

Figure 27(*g*) shows an enlarged view of one of the control switches.

The apparatus of this invention comprises a means for holding a multi-channel magnetically-recorded seismogram and sequentially traversing each track with a playback head connected through an appropriate amplifier to a restricted light source which synchronously traverses a photographic film so as to make thereon a variable-density photographic record of the magnetic signals. The apparatus imposes on the magnetically-recorded seismogram a motion with respect to the film in such manner that all known corrections are made in the conversion to the variable-density photographic record. This operation is performed sequentially on successive tracks which represent observations at different points along a traverse line, so that the lateral spacing of the variable-density tracks on the film are analogous to the lateral spacing of the points of observation in the field, whereby there is obtained on the film a seismic profile or cross section of recorded seismic events observed at successive recording stations.

The apparatus of this invention will be described for producing a variable-density profile, but this is by way of example only, and the apparatus may produce a profile of other form as well, such as variable-amplitude, variable-area, or other known visually-observable forms.

Figure 1:
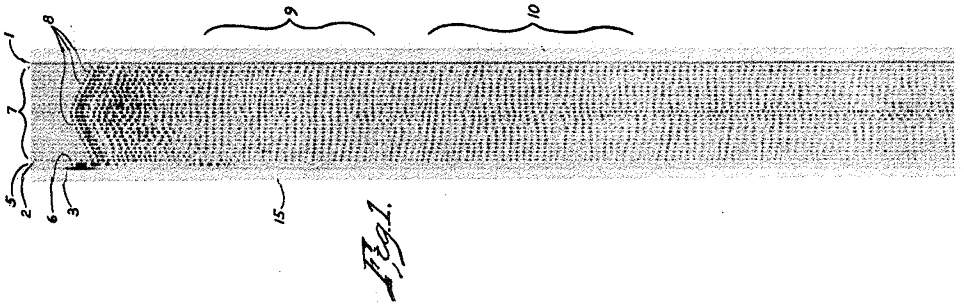

Figure 1 shows a visual representation of a typical multi-channel magnetic record 15 as obtained in a seismic field operation. Such magnetic records are well known in the art. The record comprises a strip of thin plastic which is coated on one side with ferromagnetic material in which the geophone signals are magnetically recorded as varying polarization of the material along the respective tracks. Inasmuch as the magnetic tracks and signals are not visible to the eye, the seismic information thereon cannot be directly illustrated. Figure 1 is a representation of a typical magnetic seismogram on which the seismic events have been pictured for purpose of explanation. In describing Figure 1 it will be understood that the magnetic channels are not ordinarily visible, but reference will be made to the channels and signals recorded thereon as if they were visible.

In Figure 1, the track indicated by numeral 1 has timing signals which are obtained by applying a standard frequency, usually 100 cycles per second, to the recording head for this track. It is convenient in the operation of this invention to assign at the outset a standard record speed which is maintained by the recorder at all times. A speed of 5 inches per second has been found convenient and this results in the 100 c.p.s. timing signals appearing on track 1 one twentieth of an inch apart. The need for timing the record is well known in the art. The record speed also determines the time scale of the apparatus of this invention. A scale factor of 5″=1 second will be used herein by way of example, but it is to be understood that any desired larger or smaller scale factor may be used as desired. In the apparatus of this invention numerous apparatus distances are related to time by this scale factor and in this description when apparatus distances are called "times" it is understood that the time mentioned is to be multiplied by the scale factor to convert to the apparatus distance to which reference is made.

On Figure 1 the head which produces the track indicated by numeral 2 is connected to the source of seismic energy in well known manner and a recorded signal at 3 indicates the instant of initiation of the seismic impulses. Inasmuch as the seismogram is substantially a record of the travel time of seismic impulses, it is apparent that the impulse 3 is the point of zero time measurement and it is often called the "time break." This point 3 of zero time is important and will be referred to again.

Figure 10:
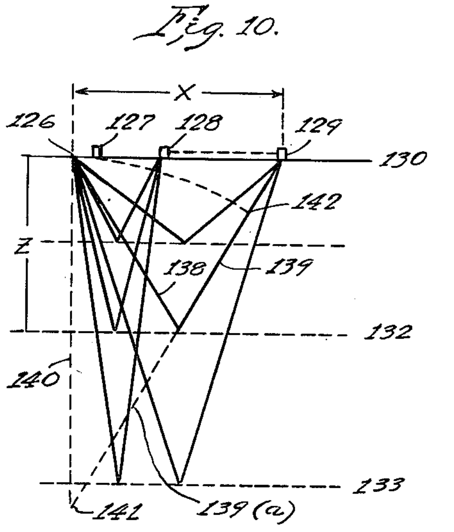
Figure 10 illustrates the path geometry of the seismic impulses as they travel from shot to detector.

The next track (indicated by 5 in Figure 1) may be used for recording the time of arrival of the seismic impulse at the surface of the ground at a point immediately adjacent to the shot point (as illustrated by detector 127 shown in Figure 10). The time between the time break impulse 3 and the impulse 6 is the time required for the seismic impulse to travel from the bottom of the shot hole to the surface of the ground substantially vertically through the weathered layer. This time is used in computing the so-called "weathering correction" for the various tracks of the seismogram in well-known manner.

The next twenty-four tracks (indicated by bracket 7 in Figure 1) represent the tracks of magnetic heads which are connected to the respective detectors 128—129 of Figure 10. However, in the case of Figure 1 the seismometers happen to be disposed on each side of shot point 126. The seismic impulses shown on tracks 7 are the well known first arrivals 8, followed by reflections 9 from shallow horizons, and as time progresses these are followed by reflections 10 coming from successively deeper and deeper horizons. Due to the fact that the detectors (geophones) which produce the tracks have increasing separation from the shot point (as illustrated by detectors 128—129 in Figure 10), the first arrivals are received in sequence and from monitor play-backs the respective weathering corrections for each track may be computed in well-known manner. A weathering correction for each detector location is computed and tabulated on appropriate data sheets, and this represents a portion of the fixed time correction which must be applied to each recorded impulse on the corresponding track. In addition to the weathering correction, the elevation of the detector, the elevation of the shot point, and the depth of the shot in the shot hole give rise to corrections which combine in well-known manner to produce a total correction which also must be applied to each event of the track and therefore this total correction is fixed for every event on the track. These corrections, being fixed for every impulse of a track, are collectively termed the "fixed correction." They are determinable from the elevations of the shot and detector locations concerned with respect to a chosen datum plane, and from an analysis of the first-arrival times for each recorded track. All of these corrections and the manner of computing them are well known in the seismograph prospecting art and do not per se form a part of this invention. These corrections are conveniently tabulated with the field data pertaining to the particular record.

Further consideration of the record shown in Figure 1 shows that reflections differ slightly in time due to the fact that as the shot-detector distance increases for the successively-distant detectors, the traverse path of the reflection also progressively increases. The increase of time or "step-out" is a function of the shot-detector distance and the travel time of the reflected impulse, the latter being related to the reflection depth (as illustrated in Figure 10). Further explanation of how this correction is made by the apparatus of this invention will be given later and it will suffice at this point to merely point out that this is called the "variable correction," since it varies both with shot-detector distance and time, and therefore this correction varies throughout the length of the track as well as from track to track.

As was previously pointed out, the various signals are not directly visible on the magnetic record of which Figure 1 is a representation. Furthermore, signals on the various tracks representing impulses reflected from the same underground reflecting surface are recorded at various times due to variations in the fixed time correction and variations in the step-out time. It is a purpose of this invention to provide apparatus into which the magnetic record of Figure 1 may be placed and which will automatically and in sequence convert the individual magnetic tracks to variable-density tracks, concurrently adjusting the timing of recorded events by the amount of the required corrections, and placing the corrected variable-density tracks side by side on a profile film. The fixed correction for any one track is made by shifting the entire magnetic record lengthwise prior to converting it, but a more complicated procedure is superimposed in order to make the variable correction as will be described later.

Figure 2:
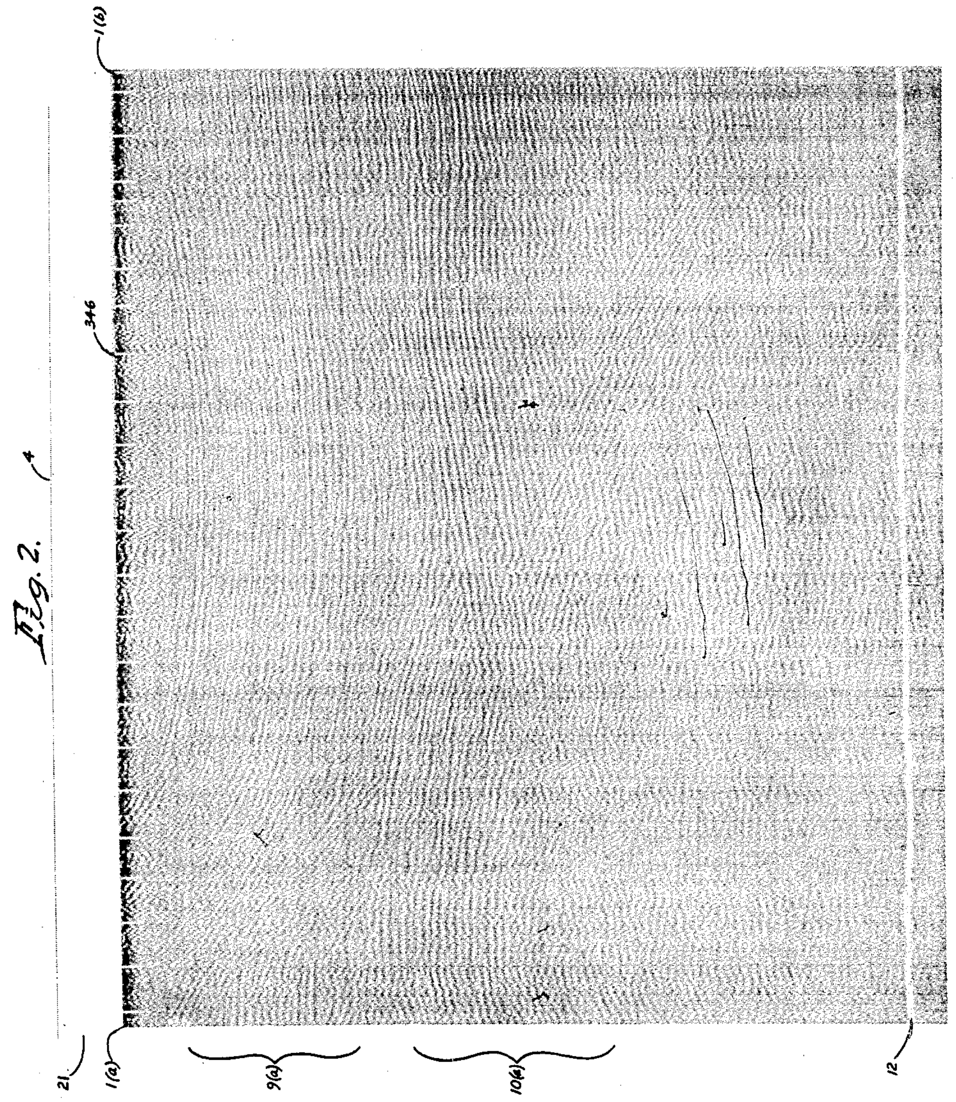
Figure 2 shows a typical seismic profile or cross section as produced by this invention.

The apparatus of this invention provides a final profile or seismic cross section such as illustrated in Figure 2. Figure 2 shows a part of a long profile which may be from several miles to many tens of miles long. Each track on Figure 2 has a corrected zero time indicated by the mark 4 extending the length of the profile. Each track has removed therefrom the fixed correction by proper longitudinal adjustment of its time break 3 with respect to the zero mark 4. Each track also has removed therefrom the variable correction by proper variable shift of reflection times so that each track on Figure 2 represents impulses which would start at zero time 4 from a point located at the datum plane, then reflected (at normal incidence) from a substantially horizontal reflecting surface, and return at the time indicated. A timing track taken from track 1 of Figure 1 is conveniently put on the film of Figure 2 at the beginning of the profile and again at the end of the profile as shown by tracks 1(*a*) and 1(*b*) and such a timing track may also be introduced intermediate the ends of the profile if desired.

By placing side by side the successive corrected seismic tracks 7 of successive records as shown by Figure 2, there is produced a profile or cross section of seismic events which (with certain reservations which will be pointed out later) "paint a picture" of the geological strata beneath the profile line. Furthermore, since all significant impulses recorded on the original record are reproduced, no part of the recorded information is lost. In Figure 2 the impulses due to shallow horizons are clearly evident in the region indicated by numeral 9(*a*) and the events reflected from deep horizons are clearly evident in the region indicated by numeral 10(*a*). The zig-zag line 12 represents a monitor of the shift which is made to effect the fixed correction on each track, and reference will be made to this later.

Figure 3:
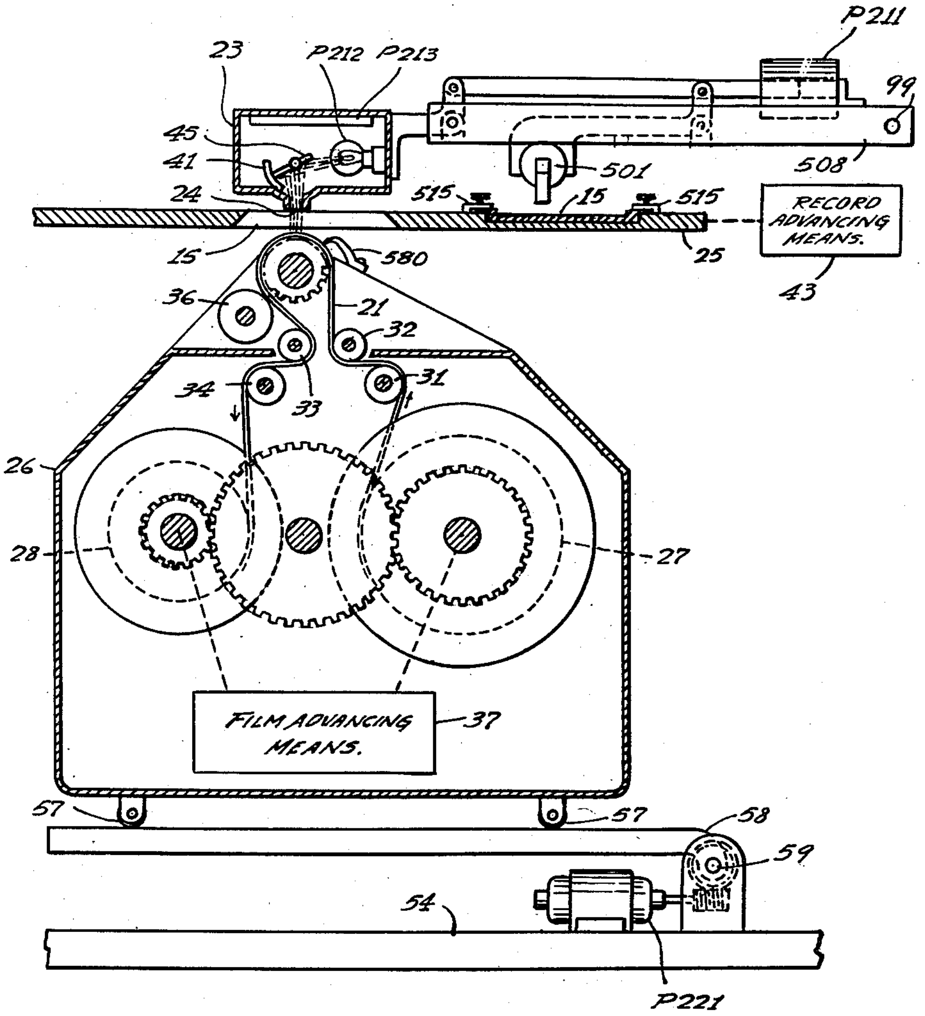
Figure 3 shows a simplified schematic diagram (right-end elevation) of the apparatus of this invention.
Figure 4:
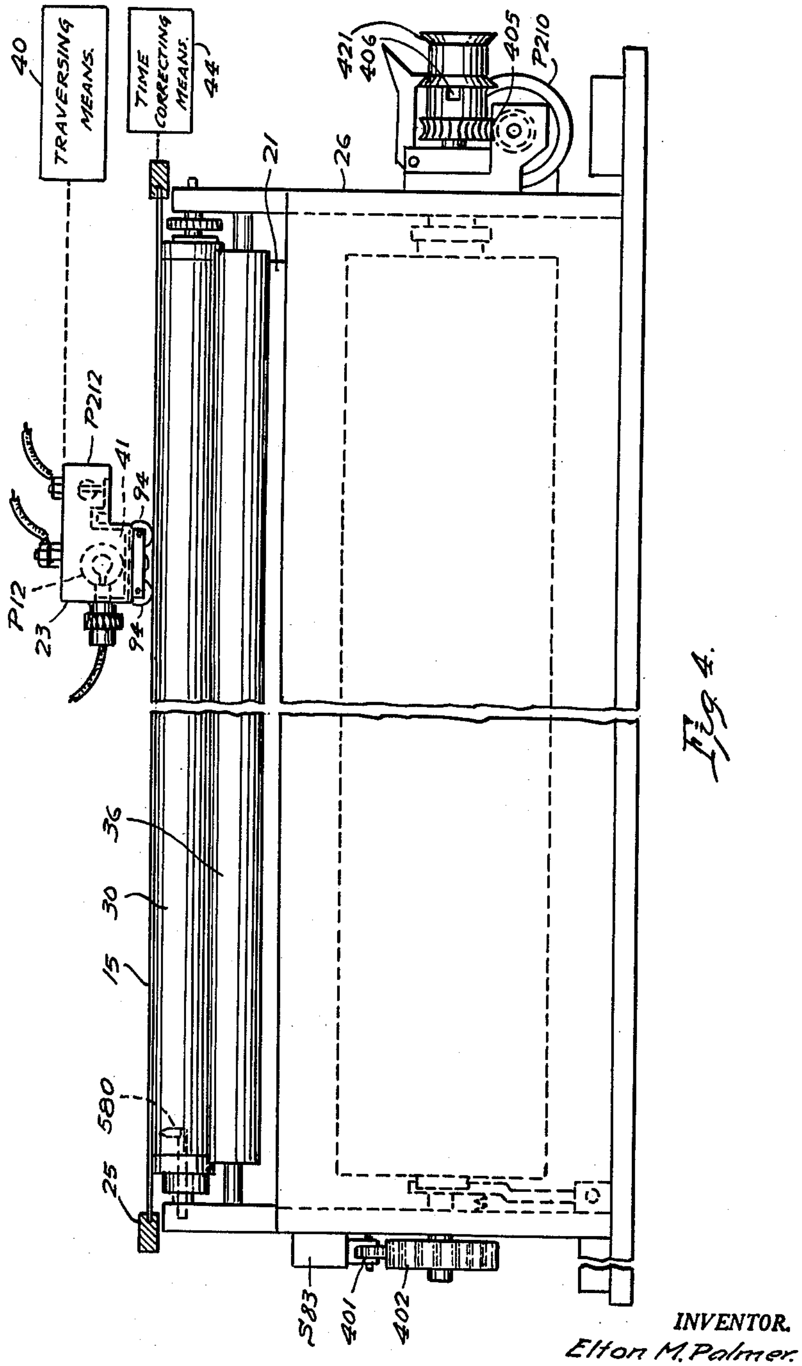
Figure 4 shows a simplified schematic diagram (front elevation) of the apparatus of this invention.

Figures 3 and 4 show a simplified diagrammatic view of part of the apparatus of this invention illustrating the manner in which the profile of Figure 2 is made from a series of magnetic seismic records similar to Figure 1. The apparatus comprises means for traversing a magnetic play-back head 501 along a particular track of the magnetic record 15 whereby electrical signals are obtained corresponding to the original seismic impulses. These electrical signals are amplified and fed to a variable-density recording lamp P12 which is also mechanically connected to the traversing means 40 so that the lamp housing 23 moves in synchronism with motion of the play-back head. A restricted amount of light from the lamp is allowed to fall on a photographic film 21 whose degree of exposure at the lamp location therefore corresponds to the signal picked up by the play-back head 501. The lamp P12 is enclosed in a small housing 23 which has a small rectangular aperture or slit 24 whose dimensions are properly chosen as will become evident later. A record-carrier plate 25 is provided and has appropriate means for clamping the magnetic record 15 in place thereon. Beneath the record-carrier plate 25 is a film magazine 26 which contains a film supply roll 27 and a film take-up roll 28. The film 21 passes over the roller 30, and additional rollers 31, 32, 33 and 34 are provided to guide the film 21 through appropriate light traps. Pressure roller 36 holds the film in snug contact with the roller 30. The film 21 is normally supplied on roll 27 wound emulsion side in and moves from the supply roll over the roller 30 with its emulsion side out and is wound up again on roll 28. The width (axial length) of the film 21 on the roll 27 is determined by the length of the records 15 to be accommodated, and its length (as drawn off from the roll 27) depends on the linear extent of the seismic profile to be covered. Film-advancing means 37 is connected to the rolls 27 and 28 and periodically actuated when a new track is to be made as will become evident later.

From Figures 3 and 4 it is apparent that light from the lamp P12 exposes a variable-density track on film 21 along the axis of roller 30, but limited to a restricted segment of the periphery of roller 30, and produces on film 21 a reproduction of that portion of the record 15 which lies directly under the play-back head 501. The dimensions of the aperture 24 in the lamp housing are such that the dimension transverse to the axis of roller 30 (i.e., normal to the plane of Figure 4) is substantially the width of the variable-density track on the finished profile. The dimension of the aperture 24 in the longitudinal direction of the track (i.e., normal to the plane of Figure 3) is such as to afford adequate exposure time to the film as the lamp P12 and aperture 24 are moved at a uniform chosen rate along roller 30. Furthermore, the longitudinal dimension of the aperture should be small compared to the effective wave length of the magnetically-recorded signal. In Figure 3, the film 21 and aperture 24 are shown spaced apart for clarity only, and in operating conditions the film is raised so as to be close to the aperture with only enough clearance to prevent scratching. The film track is thus progressively exposed in a direction normal to the plane of Figure 3, and the photographic recording on the film 21 of the density-variations corresponding to the magnetic record track takes place during the traverse of the play-back head and lamp housing from right to left in Figure 4. By the term operating cycle is meant one complete traverse of the magnetic head and lamp housing from left to right and return, whereas by the term play-back operation is meant only that part of the operating cycle in which the magnetic head and lamp move from right to left, i.e., that during which play-back and exposure of the film 21 occurs.

A shutter 41 is provided in the lamp housing 23 and is opened by energizing a coil P212 (Figure 4) only during the play-back operation so that the film is not exposed when the lamp housing moves from left to right, thus preventing exposure of the film except during the play-back operation. It is apparent that the same result may be obtained by other means, as for example by turning off the lamp P12. The coil P212 is connected to rotate the shutter 41 about the axis 45 (Figure 3). There is also included in the lamp housing 23 a photovoltaic cell P213 which is connected to a meter P205 (Figure 5) on a control panel 61 (Figure 5) and thereby forms a light meter whose function is to monitor the average brightness of lamp P12 to insure proper photographic exposure. An A.-C. voltmeter (not shown in Figures 3 and 4) is connected across the lamp P12 to monitor the A.-C. signal input to the lamp. Movement of the play-back head 501 with the attached lamp housing 23 is effected at a fixed rate by means 40 shown schematically in Figure 4. This play-back rate is preferably the same as the rate at which the magnetic record was originally recorded, but higher or lower rates may be employed. Also the play-back rate together with the brightness of the lamp P12 and the longitudinal dimension of aperture 24 will determine the density of the tracks on the film 21. Record-advancing means 43 shown schematically in Figure 3 is provided to move the record transversely. Operation of the shutter 41 is synchronized with the means 40 (Figure 4) which moves the play-back head along the magnetic track and the lamp housing along the profile film 21.

The lamp housing 23 has on its under side rollers 94 (Figure 4) which serve to allow the lamp housing to move smoothly over the film 21 on roller 30. The rollers 94 are positioned vertically so as to leave only very small clearance between the slit 24 and the film 21.

In Figure 3 the record 15 on the record-carrier plate 25 is shown located to one side of the path of the lamp housing 23, and the lamp housing 23 and play-back head 501 are mechanically connected to a common traversing means 40 (Figure 4). It is apparent, however, that greater spatial separation of the lamp housing and play-back head may be used and that these two elements may be traversed across their respective record media by separate traversing means which operate in synchronism. When separate traversing means are employed the longitudinal time scale of the film 21 may be made different from the longitudinal time scale of the record 15 if such is desired, the two traversing means still operating in synchronism but at appropriately different rates. It is preferred, however, to operate the lamp and play-back head at the same rate in which case a simple mechanical connection between them suffices.

The record-advancing means 43 shown in Figure 3 schematically connected to the record-carrier plate 25 serves to periodically advance the record in a transverse direction (normal to the plane of Figure 4) so as to bring the new track to be played back under the play-back head 501. The film-advancing means 37 periodically moves the film 21 over the roller 30 in a direction normal to the plane of Figure 4 so as to bring a new strip of film under the lamp housing 23 for the recording of each new track. The film-advancing means 37 is shown as a motor P210 in Figure 4, but also comprises other parts not shown in this figure. The motor P210 is periodically energized in a predetermined manner to advance the film 21 by small increments in coordination with the record-advancing means 43.

As pointed out above, the fixed correction is made by longitudinally shifting the magnetic record the proper amount prior to play-back and the means 44 for doing this is shown schematically in Figure 4 connected to the record-carrier plate 25 which carries the record 15. It is apparent that the operation of time-correcting means 44, film-advancing means 37, and the record-advancing means 43 are coordinated with each other and also with the operation of the traversing means 40 and the shutter-control coil P212. All of these are controlled by electrical control circuits comprising a multiplicity of sequence controls, interlocks, indicators, selectors, and various limit and override switches. Not all of the interlocks, indicators and override switches will be described in detail inasmuch as their operation will be evident to those skilled in the art upon examination of the electrical wiring diagram to be described generally later.

Figure 5:
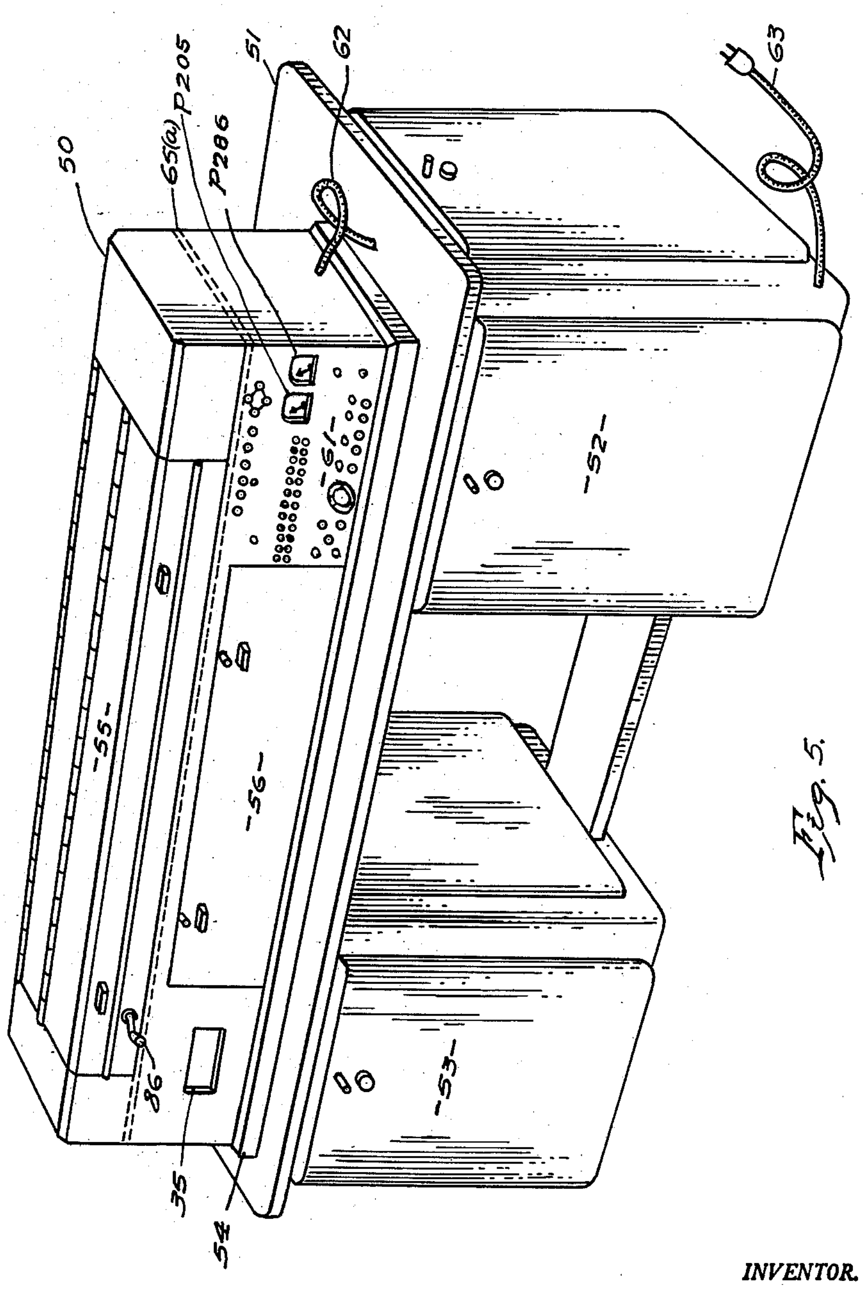
Figure 5 shows a view of the apparatus housing.

Referring now to Figure 5, the mechanical parts are housed in an upper case 50 which rests on a desk-like bench 51. The legs 52 and 53 of the bench have a plurality of shelves on which are mounted the various relays and other stationary electrical components of the control circuits, and removable covers are provided to enclose these parts. The mechanical unit 50 comprises a substantial base casting 54 on which the inner framework or chassis of the apparatus is mounted. A hinged light-tight top cover 55 is provided and is closed whenever the machine is in photographic operation. A removable light-tight front cover 56 is provided and is closed whenever the machine is in photographic operation. By opening the cover 56 the film magazine unit 26 may be inserted and removed, this being facilitated by wheels 57 (see Figure 3) on the base of the magazine 26. The wheels 57 roll on rails 58 hinged to the base 54. The rails 58 are mounted on a common hinge shaft 59 geared to magazine-elevator motor P221 which when energized in one direction raises the magazine unit 26 up into position close under the lamp housing 23, and when energized in the opposite direction, lowers the magazine unit 26 so that it may be rolled out of the apparatus for removing the finished film and reloading.

A small amount of film is necessarily fogged in transferring the magazine into or out of the apparatus, but a push button S9 (Figure 26) is provided on the control panel 61 to permit the operator to run the initially fogged film out of the way before starting photographic operation, and also avoid fogging the latent profile image by running that portion of the film well inside the magazine when the profile is completed. In order to facilitate this a switch S83 (not shown) is mounted on the left-hand end of the magazine and is actuated by a cam follower 401 which rides a notched cam 402 on the shaft of the film take-up roll 28, and the notches are so spaced that the switch is closed during the passage of every alternate ½ inch of film and closed during passage of the intervening ½ inch of film. The switch S83 is in series with an indicator light P15 on the control panel and flashing of this light informs the operator of advance of film through the magazine in response to his pressing button S9.

The control panel 61 on Figure 5, also shown in detail as Figure 26, is provided at the right front of the case 50 and this will be described in more detail later. Certain seldom-used control switches, test switches, battery-charger controls, etc., are mounted on a panel inside the left end of the case and are not shown in Figure 5. The lower left end of the case 50 houses a computing mechanism for the variable corrections and this will also be described in detail later. Window 35 permits inspection of the computer mechanism during operation of the machine. The electrical apparatus in case 50 is connected to the control apparatus by means of cables such as 62. Indicator lights on the control panel 61 provide the operator with information concerning the progress of the operation. The control panel 61 also has control switches which will be described in detail later. Provision is made to supply the apparatus with 110-volt, 60-cycle house current through a conventional plug and cord 63.

The play-back and reproducing mechanism is located inside the case 50 above a substantial frame indicated in Figure 5 by the dotted lines 65 and rigidly fastened to the case 50 and base 54. The frame 65 forms a major part of the chassis of the apparatus and it supports numerous pulleys, brackets, tracks, supports, etc., incidental to the various parts of the play-back and computing mechanism and described simply as being mounted on the chassis or frame of the apparatus. A light seal is provided between the frame 65 and the case 50. Access may be had to the play-back mechanism in order to change the record, etc., by raising the lid 55 which is hinged in several sections for convenience of the operator.

Figure 7:
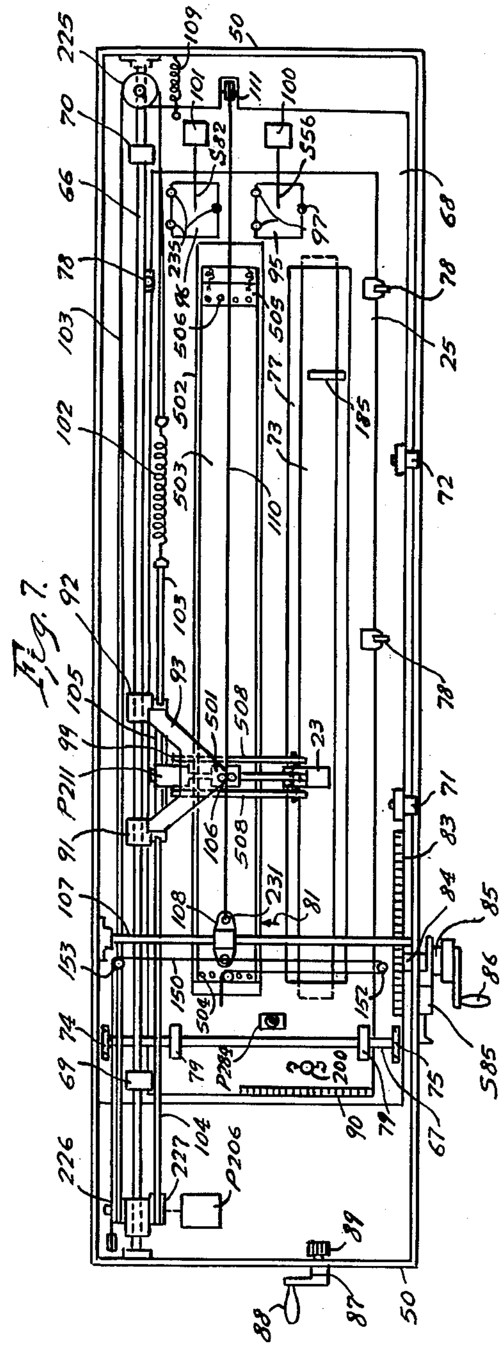
Figure 7 shows a top view of the apparatus with the cover removed.
Figure 6:
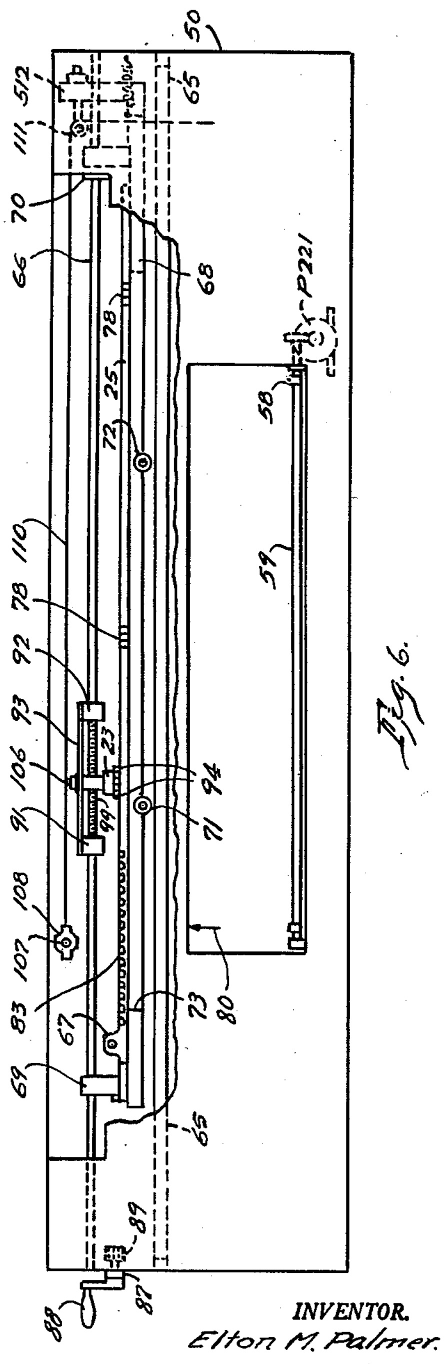
Figure 6 shows a front elevation of the apparatus with part of the case cut away to show important components.

Figures 6 and 7 show in a general way the actual manner of mounting some of the elements shown in Figures 3, 4 and 5. The outer case 50 contains the chassis to which is rigidly fastened a longitudinal bar 66 and a transverse bar 107 accurately at right angles thereto. A main plate 68 is suspended from the bar 66 by means of roller bushings 69 and 70 rigidly fastened to the main plate 68 near the rear edge thereof. The front of the plate has rollers 71 and 72 which ride on a longitudinal track rigidly mounted on the front of the case 50. By this construction, the main plate is free to move longitudinally (right and left in Figures 6 and 7) in the case. The purpose of transverse bar 107 which is accurately at right angles to this motion will be described later.

The main plate 68 has a slot 73 (Figure 7) which is wide enough to accommodate the roller 30 and whose length is longer than the length of roller 30 (Figure 3) over which the film 21 is held. The slot 73 is flared on its lower side to permit raising the magazine 26 upward so that the top of roller 30 is somewhat above the top surface of the main plate 68.

In the lower part of the case 50 space is provided for the magazine 26 (not shown in position in Figure 6) which is supported on rails 58 previously mentioned. The rails may be elevated so that roller 30 of the magazine may be raised into position within the slot 73 of the main plate. In this manner the film 21 on top of the roller 30 is brought into contact with the lamp housing 23.

The main plate 68 has rigidly mounted thereon two brackets 74 and 75 between which is rigidly mounted a transverse bar 67 perpendicular to the bar 66. The record-carrier plate 25 (previously referred to in Figure 3) rides slightly above the upper surface of main plate 68 on ball rollers 78 (Figures 6 and 7) and is provided with a slot 77 cut therein of sufficient width to clear the lamp housing 23. The record-carrier plate 25 also has a longitudinal recess 502 milled part way through it. A record holder 503 fits into this recess in such manner that it may be slid longitudinally for the purpose of properly zeroing the record 15 when it is placed into the apparatus by the operator.

The record holder 503 is in turn recessed slightly to provide a shallow trough into which the magnetic record fits accurately, the bottom of the recess being padded with thin rubber sheet as is customary in mounting magnetic records for play-back. At its left-hand end the record holder 503 has pins 504 which engage the left-hand end (shot-moment end) of the magnetic record. Near the right-hand end of the record holder a small sliding bar 505 also has pins 506 to engage the right-hand end of the record 15. Tension springs 507 are connected between the sliding bar 505 and the extreme right-hand end of the record holder 503 and thereby apply tension to the magnetic record 15. The latter is thereby held snugly in the recess of the record holder 503.

A fixed index scratch 81 is carried by the record-carrier plate 25, and the record 15 when inserted in the apparatus is adjusted by longitudinal displacement of the record holder 503 so that the shot moment or time break 3 (Figure 1) coincides longitudinally with index 81. The location of the time break 3 on the magnetic record 15 may previously have been made visible by painting this part of the record with fine ferromagnetic powder suspended in a quick-drying adhesive in well-known manner. After the record 15 is accurately aligned as described, clamps 515 which hold the record holder 503 in longitudinal position are tightened (see Fig. 3).

The record-carrier plate 25 carries two brackets 79 with ball bushings which slide freely on the transverse bar 67, and in this manner the record-carrier plate 25 is held accurately at right angles to the bar 67 at all times, but may slide transversely with respect to the main plate 68. This construction permits the desired track of the magnetic record which is mounted in the record holder 503 to be positioned accurately under the play-back head 501. Periodically, through operation of the control circuits, the film-advancing means (37 in Figure 3) brings a new element of film 21 under the lamp housing 23 and the record-advancing means 43 brings a new magnetic track into position under the play-back head 501. The main plate 68 on which the record-carrier plate 25 is mounted may move longitudinally with respect to the case and with respect to the film magazine 26, the main plate 68 being considerably shorter than the inside dimension of the case 50 and the slot 73 in the main plate being correspondingly longer than the roller 30.

A pointed index arm 580 is mounted on the magazine 26, and arranged to scratch a line on the film 21 as it traverses the roller 30 (Figure 4). When the film is developed, the scratch made by arm 580 appears as the mark 4 shown on Figure 2. For convenient later reference the longitudinal position of the sharp point of the arm 580 which makes the scratch 4 on film 21 is termed index 80. The index 80 represents the point of zero time on the finished profile and is a point of constant reference in the ensuing description of the apparatus. The magazine is fixed in a longitudinal position with respect to the chassis of the apparatus so that the longitudinal position of the index 80 is also fixed with respect to the chassis. The longitudinal relationship between the index 80 and the index 81, which was described previously as the point of longitudinal alignment of the time break 3 (Figure 1) of a record loaded in the record holder 503 and the record-carrier plate 25, will become apparent later.

The lid 55 (Figure 5) which when closed keeps light out of the case must necessarily be opened to replace the record to be reproduced. It is apparent that the record-carrier plate 25 extends a considerable distance to the rear of slot 73, so that by moving the record-carrier plate 25 forward on the main plate 68, the rear area of the record-carrier plate will cover the slot 73 to prevent the entrance of light to the roller 30 when the record is being changed in record holder 503. This prevents fogging of film 21 when changing magnetic record 15.

A rack 83 is provided near the front edge of the main plate 68 and a pinion 84 is mounted on a shaft 85 which passes through the front of the case 50 and is provided with a crank arm 86. The shaft 85 is made sufficiently long that the pinion may be pushed back into engagement with the rack to manually move the main plate either to the extreme left or to the operating position (toward the right), but pinion 84 is disengaged from the rack 83 during automatic operation of the apparatus. The shaft 85 is provided with a latch which prevents the operator from accidentally engaging the pinion 84 with the rack 83 during operation of the machine, and the latch has an electrical interlock switch S85 in the control circuit, arranged so that the machine cannot be placed in automatic operation if the pinion 84 is engaged with the rack 83. When it is desired to change the record, the shaft 85 is pushed in so that the pinion 84 engages the rack 83 and the crank 86 turned to bring the main plate to the left end of its travel. On the left end of the case a shaft with a crank 88 on its outer end is attached to a pinion 89 inside the case. The pinion 89 meshes with a rack 90 on the left-hand end of the record-carrier plate 25. A friction disc 87 is provided for the crank end of the shaft and a torque spring (not shown) is interposed between the inner end of the shaft and the pinion 89. The spring and friction disc serve to firmly hold the record-carrier plate in its forwardmost position while the operator changes the record 15 in the machine. When changing the record the operator first moves the main plate to the left by engaging and turning the crank 86, after which by turning the crank 88 the record-carrier plate is moved to its forward limit, so that the magnetic record in the record holder 503 becomes accessible and at the same time the rear area of the record-carrier plate seals the opening 73 from entrance of light. The film 21 is thus protected from light and the operator may open the lid 55 to change the record 15. A reverse procedure is employed after the new record has been placed in position in the record-carrier plate, and the apparatus may then continue its automatic operation with the new record.

The record-carrier plate 25 is spaced by the rollers 78 to have only a very small clearance above the main plate 68. Appropriate light seals (not shown) are provided between the record-carrier plate 25 and the main plate 68 to prevent access of light to the magazine through the small clearance space between the plates when the case lid 55 is opened. The ends of this space are light-sealed by means of thin transverse downwardly-extending strips (not shown) fastened to the bottom of the record-carrier plate at the ends thereof and which fit loosely within somewhat wider and deeper transverse grooves (not shown) in the main plate. The front and back sides of the space are light-sealed by means of two longitudinal lines of small hollow cylinders (not shown) with their joints staggered and which roll loosely in a pair of longitudinal rectangular grooves (not shown) cut into the under side of the record-carrier plate in front and in back of the slot 77. The grooves (not shown) are somewhat wider and deeper than the diameter of the cylinders so that the latter may roll freely on the top surface of the main plate without in any way hindering transverse motion of the record-carrier plate. Two very shallow grooves (not shown) are provided on each side of the slot 73 in the main plate and these grooves are positioned so that when the record-carrier plate and the main plate are moved to the record-changing position, the aforementioned cylinders drop into these shallow grooves and effectively prevent access of light to the film 21 on printing roller 30.

The longitudinal bar 66 also supports a pair of roller bushings 91 and 92 which are free to move longitudinally on the bar. The bushings 91 and 92 are fastened together by an arm 105 forming a carriage which also supports a micrometer screw 99. A nut on the screw 99 engages a pair of transverse arms 508 which together carry the solenoid P211. The arms 508 also carry at their outer extremity the lamp housing 23, and intermediate the nut and the housing 23 the arms carry the play-back head 501. Both the lamp housing and the play-back head are pivotally mounted on the arms by means of bell cranks which are operated by the common head-lifting solenoid P211 as best illustrated in Figure 3. The arrangement is such that energization of solenoid P211 raises both the lamp housing and the play-back head off their respective record media whenever this is desirable, as for example to permit transverse motion of the record-carrier plate under the lamp housing and play-back head for changing the magnetic record. The lamp housing 23 is positioned on the arms 508 so that the slit 24 is directly over the top of the roller 30. The play-back head 501 is positioned on the arms 508 so that it contacts the magnetic record in record holder 503. It is not essential that the slit 24 in the lamp housing 23 be in actual longitudinal alignment with the gap 509 in the magnetic play-back head 501. However, it is convenient to assume that slit 24 and gap 509 are in effective longitudinal alignment, and this assumption will be made for the purpose of the ensuing discussion.

The carriage comprising bushings 91 and 92 connected by arm 105 also carries a V-shaped arm 93 rigidly fastened to the bushings 91 and 92. The arm 93 is above the lamp housing and play-back head and carries on its upper side a pair of small rollers 106 whose purpose pertains to making the variable corrections as will be explained later. The micrometer screw 99 permits a certain amount of longitudinal adjustment of both the play-back head and lamp housing with respect to the rest of the carriage assembly and particularly with respect to the rollers 106. The purpose of this adjustment will be explained later.

As previously indicated the carriage assembly is moved longitudinally to play back the magnetic record and concurrently record the signals in variable-density form on the film. To provide for automatically doing this the entire carriage assembly, which by means of sliding bushings 91 and 92 rides on longitudinal bar 66, is drawn from left to right and back again by an effectively-endless steel tape whose two parts 103 and 104 are fastened respectively to the right-hand side and the left-hand side of the carriage assembly. The tape 103 makes a 90° twist and passes over a pulley 225 whose axis is fastened to the right-hand inside end of the case 50. The tape 103 then returns to the left-hand end of the case (making another 90° twist on the way) and passes downward over a pulley 226 to be wound up on a drum 228 (Figure 23(*a*)) driven by motor P206 which is mounted on the case below the frame 65. The other portion of the tape (namely 104) passes downward over a pulley 227 and is wound up in an opposite direction on a drum 229 (Figure 23(*a*)) also driven by motor P206. The two drums, not shown on Figures 6 and 7, are indicated on Figure 23, of which Figure 23(*a*) is a detail, and are geared to a computing mechanism to be described later. The two drums 228 and 229 are on the same shaft and because of the opposite direction of wrapping the tape on the respective drums, one part winds up as the other unwinds. The common shaft is driven through gearing by the motor P206 which is coupled to shaft 230 as shown in detail in Figure 23(*a*). The tapes 103 and 104 are made of steel about ¼" wide and .002" thick. A very stout spring 102 is interposed in the tape 103 to maintain tension.

Motor P206 also drives other parts of the apparatus shown in Figure 23 and this will be explained later. Inasmuch as the tapes 103 and 104 are wound on drums 228 and 229 in opposite directions, it is apparent that rotation of motor P206 in one direction causes the carriage assembly to traverse from left to right. Rotation of motor P206 in the opposite direction causes the carriage assembly to traverse from right to left, and it is during this traverse that play-back occurs and the shutter 41 is opened to effect recording on the profile film.

At the right-hand end of the record-carrier plate 25 a space is provided for two cards 95 and 96 which will be described in detail later. The cards 95 and 96 are accurately positioned both longitudinally and transversely on the record-carrier plate by means of indexing buttons 97 and 235, three such buttons being provided to hold each card. The cards are thus accurately positioned longitudinally and transversely with respect to the record-carrier plate 25, and hence also longitudinally with respect to the main plate 68. However, since the cards 95 and 96 are mounted on the record-carrier plate 25 they are carried transversely therewith with respect to the main plate 68. A thin silver contact plate (not shown) is located under the cards 95 and 96, and a stylus S56 rides on card 95 and a stylus S82 rides on card 96. The styluses S56 and S82 and their respective operating mechanisms 100 and 101 are indicated in Figure 7 in diagrammatical form only. The cards 95 and 96 have holes punched therein for a purpose which will become evident later. The cards are made of electrically-insulating material and thereby insulate the respective styluses from making electrical contact to ground except when the stylus drops into a hole in the card. The cards are conveniently made 3" x 4" of about .0085" thick index card paper preferably with about 50% rag content.

The stylus S56 is actuated by a device 100 termed the surface correction (SC) stylus carriage which will be described in more detail later. The stylus S82 is actuated by a device termed the $x/V$ stylus carriage 101 whose significance in connection with performing the variable corrections will also be explained later. Each of the carriages 100 and 101 are movably mounted on the main plate 68 and their styluses extend onto the respective cards 95 and 96 mounted on the record-carrier plate 25.

The punched cards 95 and 96 are the analog means for introducing into the machine the fixed correction and the variable correction respectively for the respective tracks of the record. For this purpose each card has a transverse series of holes punched therein whose separation is the same as the lateral separation of the tracks on the record 15. Alignment of the carriages 100 and 101 and their respective styluses S56 and S82 are such that a hole in the card pertaining to a particular track of the magnetic record falls in line with the respective stylus when that track is in play-back position under the play-back head 501. It is apparent that proper coordination is achieved by proper transverse spacing of the holes in the cards 95 and 96 with respect to the tracks on the magnetic record in the record holder 503 and that the styluses S56 and S82 must be in alignment with corresponding holes in the respective cards. Each stylus is connected into an electrical control circuit which is closed to ground (the record-carrier plate and chassis of the instrument) whenever the respective stylus drops into a hole. The manner of preparing the punched cards will be described later.

Electrical control circuits (to be described) are provided so that the carriage assembly is moved repeatedly from left to right and return. The lamp P12 is lighted, but the shutter 41 is closed during the traverse from left to right. Also just prior to the left-to-right traverse the record-carrier plate 25 is advanced to present the next track for play-back and the film 21 is advanced during the left-to-right traverse to present a new strip of film for exposure.

The manner in which the apparatus effects the fixed correction will now be described. The transverse bar 107 which is fastened to the chassis (and therefore is fixed in longitudinal position with respect to the index 80 on the film 21) carries a bushing 108 which may slide on bar 107 in a direction transverse to the case. The bushing 108 has a special purpose which will be described later, but for the present let it be assumed that the bushing 108 is in transverse alignment with the travel path of the pair of rollers 106 mounted on top of the arm 93. A tension spring 109 fastened between the main plate 68 and the right-hand end of the case (shown only diagrammatically in Figure 7) retracts the main plate to an extreme right position. This position is determined by a metallic cord 110, which may be a small metallic rope, wire, thin band or fine chain or a similar flexible and (for the forces involved) substantially non-stretchable member, one end of which is fastened to a small rotatable vertical pin 231 in the side of bushing 108. The cord 110 extends to the right and passes between the rollers 106 and over a pulley 111 on a bracket extension 512 of the main plate, and then is effectively terminated on the under side of the main plate.

The index 80 on film 21, as explained earlier, represents the point of zero time on the finished profile. When the magnetic track 15 is played back and reproduced on the film 21 in the absence of any correction (the correction having a value of zero) the time break 3 on the record must be reproduced in coincidence with the index 80 on the film 21. It is recalled that the time break 3 is aligned with index 81 on the record-carrier plate 25 at the time the record holder 503 and the record 15 are installed in the record-carrier plate. Since the slit 24 of the lamp housing 23 and the gap 509 of the magnetic play-back head 501 are themselves in longitudinal alignment, the requirement of zero correction is met if index 81 is previously brought into alignment with index 80, this alignment being made as a basic adjustment of the apparatus. If the slit 24 and the gap 509 are not in longitudinal alignment, the requirement of zero correction dictates a corresponding displacement of indexes 80 and 81.

If for any given track to be played back there is a fixed time correction which must be added to or subtracted from the time of each event on the track, this correction may be effected on the reproduced track on the profile film 21 by longitudinal adjustment of the main plate prior to the play-back operation, whereby the record 15 is displaced to the right or to the left, respectively, relative to the chassis and index 80. The shift is accomplished by changing the effective length of the cord 110 and this mechanism is shown in detail in Figure 8.

Figure 8:
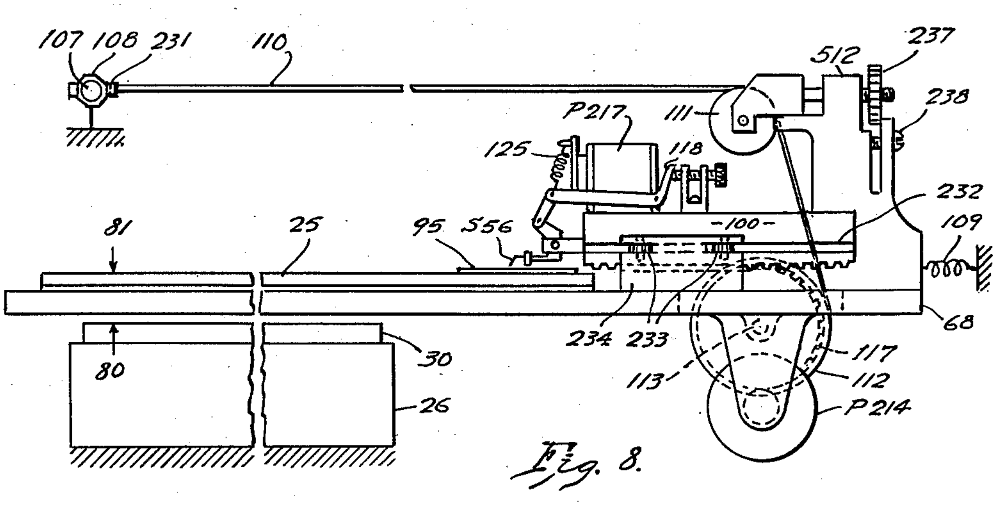
Figure 8 shows a detailed view of the mechanism for effecting the fixed correction.

Figure 8 shows diagrammatically how the fixed correction is made, and for purposes of clarity extraneous parts have been omitted. The film magazine 26 with the printing roller 30 and index 80 is longitudinally fixed to the case as previously described. The transverse bar 107 with its bushing 108 is also fixed longitudinally to the case. The index 81 on the record-carrier plate, as explained above, corresponds to the time break 3 of the magnetic record. It will be remembered that the record-carrier plate 25 is fixed longitudinally on the main plate 68, and is capable only of transverse motion with respect thereto (i.e., perpendicular to the plane of Figure 8). The main plate 68 may move longitudinally (i.e., right or left in Figure 8) and carries the record-carrier plate 25 and the magnetic record with it. Therefore, the longitudinal position of the index 81 with respect to the index 80 may be adjusted by the effective length of the cord 110, one end of which is fastened to the pin 231 in bushing 108. In order to effect the fixed (SC) correction the longitudinal position of the main plate 68 carrying index 81 and the record is adjusted with respect to the index 80 by the amount of the fixed (SC) correction as indicated by the longitudinal position of a hole in punched card 95. The cord 110, instead of being rigidly fastened directly to the main plate, actually passes over a pulley 111 (which is slidably mounted on a bracket on the main plate 68 as shown in Figure 8 for purposes of adjustment) and the cord 110 is wound up on a drum 112 whose shaft 113 rotates in bearings fastened to the main plate 68. A reversible electric motor P214 is geared to the drum 112 and is also mounted on the main plate. By appropriately supplying power to the motor P214 the drum 112 winds up the cord 110, and it is apparent that for each increment of cord so wound up, the main plate (together with the record-carrier plate 25, the record 15, and the card 95) moves toward the left. The motor P214 is reversible and running in the other direction unwinds the cord 110, and the spring 109 (Figure 6) pulls the main plate (with the record-carrier plate 25, record 15 and card 95) toward the right.

The SC stylus carriage 100 is slidably mounted on the right-hand end of the main plate 68. The stylus carriage 100 has a groove 232 on each side which forms a track for rollers 233 carried on bracket 234 fastened to the main plate. A rack 236 is mounted on the lower side of the stylus carriage 100 and is engaged by a gear 117 which is pinned to the same shaft 113 which carries the drum 112 and is thereby driven by motor 114. The pitch diameter of gear 117 is accurately the same as the effective diameter of the drum 112. Consequently it is seen that when the motor P214 winds up the cord 110, the gear 117 simultaneously moves the rack and carriage 100 in amount and direction exactly opposite to the resulting motion of the main plate. Accordingly, operation of the motor P214 causes the main plate (carrying also the record-carrier plate 25, record 15, and index 81) to move longitudinally, while the stylus carriage 100 incidentally remains fixed in a longitudinal position with respect to the chassis. Figure 8 shows one way of taking up or paying out the cord 110, but it is apparent that other equivalent means may be employed to effectively alter the position of plate 68 by means of a cord.

Stylus carriage 100 carries a coil P217 whose armature 118 is connected by a mechanical linkage to the stylus S56 which overhangs the card 95 on the record-carrier plate 25. As previously indicated, the stylus S56 and a contact plate (not shown) underneath the card 95 are connected into an electrical control circuit. The arrangement of this circuit is such that when the motor P214 moves in a direction to urge the main plate 68 to the left with respect to the carriage 100 by winding up the cord 110, the solenoid P217 is energized and its armature presses the stylus S56 downward against the card 95. The stylus S56 will eventually drop into a hole in card 95. This closes the control circuit which stops the motor P214.

It is apparent that if the hole has previously been correctly longitudinally positioned in the card 95, the effective longitudinal position of the magnetic record (index 81) with respect to the profile film (index 80) will be such as to account for the proper fixed correction (SC). It is also apparent that the zero reference point for an SC correction on card 95 is the location of the stylus S56 when index 81 is in effective alignment with index 80. Displacement of the hole in card 95 from this zero point by a time (5″=one second) corresponding to the previously-computed fixed correction controls the device to bring the record into proper longitudinal position so as to apply the correction to the magnetic track to be played back. The SC stylus carriage 100 is provided with limit switches and override switches which control the power supply to motor P214 so as to prevent mechanical damage. Also the stylus S56 (as well as stylus S82 of Figure 7) is not a single contactor, but is made up of several wires spaced by very small transverse amounts so as to assure a prompt contact when the stylus drops into the hole. The circuits which control motor P214 are shown on the wiring diagrams, Figure 27, which will be described in detail later.

Figure 9:
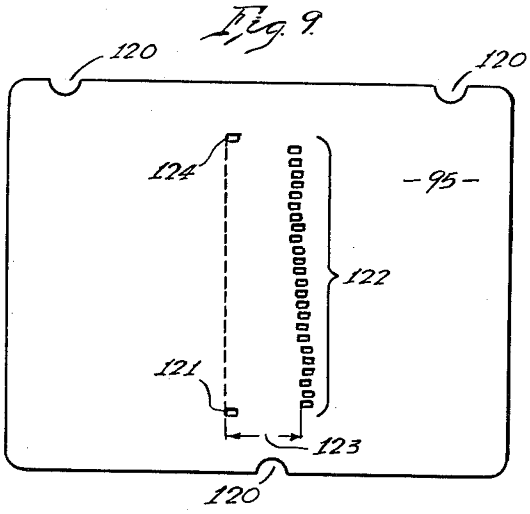
Figure 9 shows a view of the analog computer card for controlling the fixed correction.

Figure 8 shows how the movement of the main plate 68 (and the record) with respect to the index 80 is dependent on the location of the hole with respect to a zero location on the card 95. Figure 9 shows a plan view of the card 95. It comprises a thin card (conveniently about 3″ x 4″ of index card stock) having appropriate entry blanks (not indicated in Figure 9) into which the operator may write identification numbers, etc., pertaining to the particular record to which the card applies. The card, previously notched as at 120, is punched in a device in accordance with information available to the operator. The notches fit into indexing buttons 97 (Figure 7) on the record-carrier plate 25 and thus serve to accurately hold the card in place both longitudinally and transversely with respect to the magnetic record 15. A zero hole 121 is punched into the card by the punching machine at a longitudinal position which is fixed with respect to the notches 120 and which coincides with the position of the SC stylus when the index 81 is effectively in line with index 80. This hole is located transversely of the card in a position to correspond to the shot-moment track 2 (Figure 1), which however is not played back. When the stylus S56 is arranged to be just at the beginning (left-hand edge) of the hole 121 (Figure 9), the index 81, i.e., the time break 3 of the record (Figure 1), is effectively in alignment with the index 80 on the film (see also Figures 6 and 7). Adjusting nut 237 (Figure 8), rotation of which longitudinally moves the position of pulley 111 on the main plate, is provided in order to make the above adjustment. Inasmuch as this is a permanent adjustment, the nut 237 and pulley 111 are thereafter clamped by screw 238 and the adjustment only periodically checked. The length of the hole 121 is of no significance since only its left-hand edge is sensed by the stylus S56. Additional holes are punched in the card with a transverse spacing the same as the transverse spacing of the tracks 7 of the magnetic record 15 (Figure 1). Inasmuch as the card 95 is mounted on the record-carrier plate 25, each time the latter is transversely advanced to bring a new track into play-back position, the appropriate hole of card 95 pertaining to that track is also in transverse alignment with the stylus S56. Accordingly, the holes 122 are punched into the card, each displaced longitudinally from the hole 121 by an amount 123 equal to the previously-computed fixed correction (using of course the machine scale of 5″=1 second). The fixed correction may be either positive or negative, but in the card of Figure 9 only negative values are shown, and the respective correction time will be subtracted from the observed travel time of all impulses on each of the magnetic tracks.

The longitudinal distance 123 between holes 121 and 122 represents the combined fixed corrections (SC) and may be made either positive or negative depending on the sign of the correction. It is apparent that for a known original magnetic record speed (previously mentioned to be 5″ per second) the amount of time represented by the fixed correction may easily be accurately made the longitudinal displacement 123 of the holes 122 so that the holes in card 95 serve as an analog of the total fixed correction (SC) for each track on the magnetic record to which it pertains. Inasmuch as the card 95 (Figure 9) is punched to conform to the computed correction times for the respective tracks of the magnetic record, the card serves as the analog means by which the apparatus converts these corrections into a physical displacement of the magnetic track so as to add or subtract the appropriate time correction.

The machine for punching the card 95 is described in copending application Serial No. 560,928 assigned to the same assignee as the present application. The punch is carried on a lead screw which the operator may turn to put the hole in the proper longitudinal position. The lead screw is conveniently provided with a counter or dial which reads directly in milliseconds. It is apparent that with the previously-assigned record speed of 5″ per second, each ½ inch of longitudinal distance 123 on the card represents an SC value of 0.1 second. It is advantageous to punch the holes according to the computed corrections and at the end of the punching return the machine to zero to punch hole 124 which is in longitudinal alignment with hole 121. The punching machine also transversely displaces the successive holes so that their transverse position corresponds to that of the magnetic track to which each hole pertains.

The SC stylus-control solenoid P217 has an armature 118 which forces the SC stylus S56 downward when the coil P217 is energized. When not energized a spring 125 raises the stylus off the SC card, an appropriate mechanical linkage being provided for this purpose. Inasmuch as the SC card may have corrections punched into it which may vary somewhat in time from track to track, the stylus S56 starts to scan the card from a point to the left of a previous hole and scans to the right until it meets the next hole 122. In order to provide for finding a hole, the SC carriage motor P214 is arranged by means of control-circuit relays, to first move the stylus to the left on the card, and as this is being done, the cord 110 unwinds so that the main plate 68 and the magnetic record move to the right. The motor P214 is then reversed so that the stylus S56 may scan the card toward the right and move the main plate 68 and the magnetic record to the left. Upon dropping into the hole, the stylus closes the control circuit which stops the motor P214 and the magnetic record is then in the proper position relative to index 80 to proceed with the play-back of the track. Actually, in order to reduce the time required for this card-scanning operation, the stylus S56 does not ordinarily start scanning for a hole location from the extreme left-hand side of the card, but starts only about one-fourth inch to the left of the preceding hole. The control circuit further provides that in the event no hole is found, the stylus repeats its scanning cycle, but this time starting from the extreme left-hand side of the card 95.

In the previous discussion of Figure 2, mention was made of the zig-zag line 12 shown on this figure. It will be found convenient in checking operation of the machine to monitor the fixed correction (SC) made by the machine in playing back each track. This is done by fastening a thin narrow opaque strip 185 to the bottom of the main plate 68, extending part way across the opening 73 (Figure 7). It is convenient to place the strip 185 near the right-hand (long travel time) end of the record-carrier plate, i.e., where the variable correction is small. As the lamp housing 23 traverses the film 21, the strip acts as a mask which prevents exposure of the film over a short portion of the variable-density track. The sharp shadow of the strip becomes a segment of the irregular line 12 (Figure 2) on the film. Furthermore, since the strip 185 is fastened to the main plate and the SC correcting mechanism adjusts the effective length of cord 110 prior to play-back, the shadow 12 for each track will shift in the same manner as the SC correction inserted by the apparatus. Accordingly the line of the shadow is a discontinuous line 12 which monitors the SC correction, and its position on the finished profile may readily be compared with the data sheets or with displacements of holes in corresponding cards 95 (Figure 9) at any subsequent time.

Up to this point no provision has been made for the variable corrections. In the apparatus of this invention the variable correction is made by deflecting the cord 110 from a straight line by displacing bushing 108 from alignment with the rollers 106 previously mentioned. This deflection of cord 110 pulls the main plate 68 to the left. It is apparent that for events reflected from deep horizons, the slant time is substantially the same as the vertical time, or in other words the variable correction is negligible at the extreme right-hand (long travel time) end of the record. Accordingly the play-back of each track takes place from right to left in the machine, so that at the beginning of the play-back operation the main plate is displaced only a small amount and its displacement is gradually increased as the play-back progresses to the left. In order to provide for the deflection of the cord, the rollers 106 (Figures 6 and 7) are mounted on the top of the carriage assembly in such manner that the cord 110 will pass between them in transverse alignment with the pulley 111 over which the cord passes at the right-hand end of the main plate. Thus to the right of the rollers 106 the cord 110 lies parallel to the track being played back, but to the left of the rollers 106 the cord 110 makes an obtuse angle toward the displaced bushing 108 in a manner to be described. The rollers 106 are of small diameter, preferably the smallest practical diameter, and each has a small juxtaposed groove cut therein to accommodate the cord 110 through the resulting opening between them. The axes of rollers 106 lie in a common transverse plane parallel to the transverse bar 107.

By way of background, there is shown in Figure 10 a geometric representation (not to scale) of the travel path of reflected seismic events. The shot point is represented by 126 and the up-hole detector by 127. The nearest seismic reflection detector is at 128 and the farthest detector at 129, with a total of twenty-two additional more or less equally-spaced detectors between them. Each detector 128—129 is connected to apparatus which produces one of the tracks 7 on the magnetic record 15 (Fibure 1). The detectors and shot point are shown on the datum plane 130 which is their equivalent position after the fixed corrections are made as described above. The reflected impulses are reflected from many subsurface horizons, only three of which 131, 132, and 133 are shown.

It is apparent that the slant travel distances are longer than the vertical travel distances to the various reflecting horizons, and consequently the slant travel time is longer than the vertical travel time. If the magnetic record is to be played back so as to give the true vertical travel time of a reflected impulse, the track must be moved to the left by a leftward shift of the main plate 68 to adjust the position of the impulse so that it will appear at a shorter time on the profile film. This is accomplished in the apparatus by sliding the bushing 108 to one side in an appropriate manner. It is desired that the profile film have reproduced thereon the various tracks with the variable (angularity) correction removed, i.e., each event is to be played back as if it were a vertically-traveling event. The manner in which this is accomplished will now be described.

Figures 12, 13, 14, 15, 16:
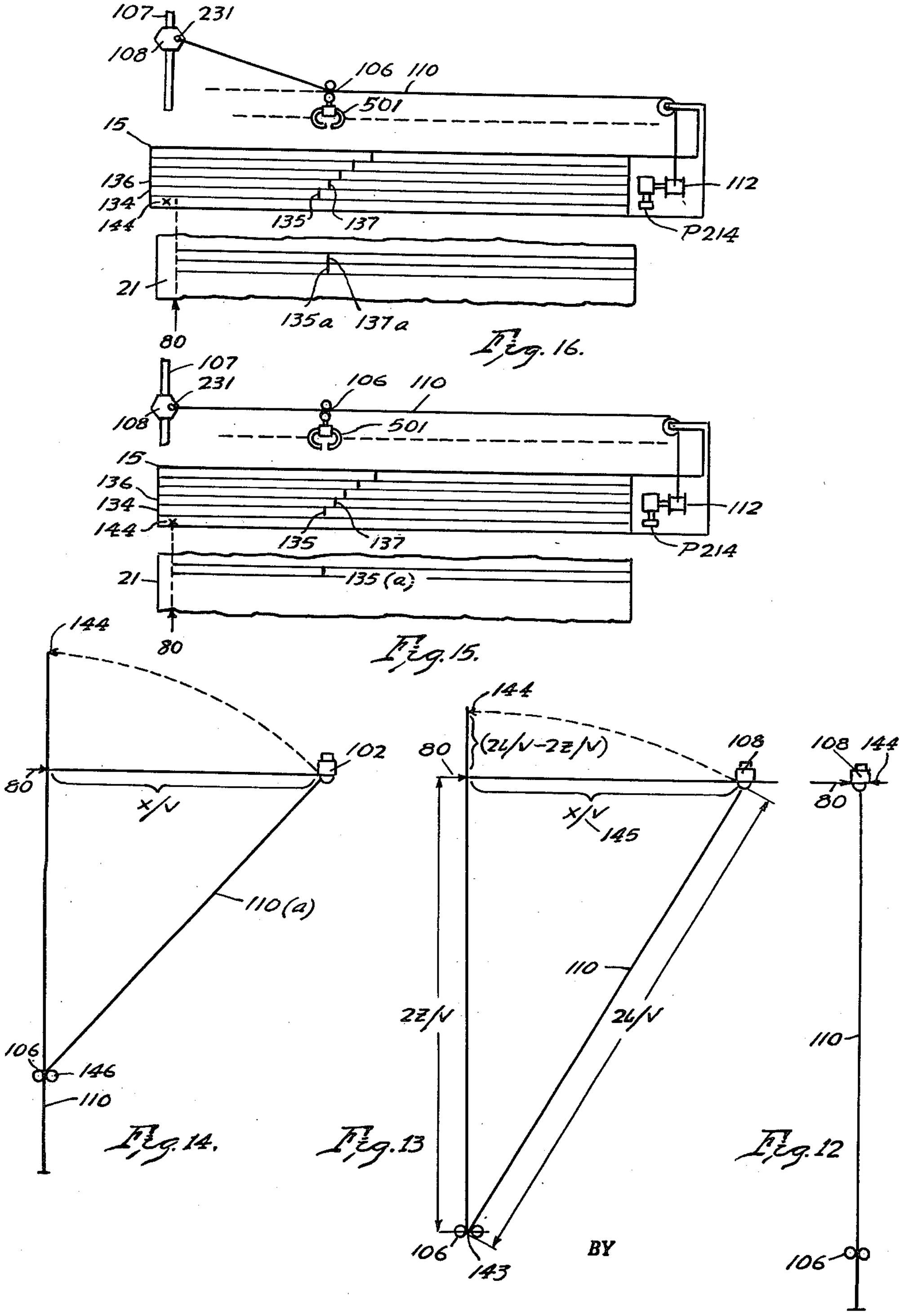
Figure 12 illustrates diagrammatically the arrangement of components preparatory to making the variable correction.
Figure 13 illustrates diagrammatically the arrangement of components when starting the variable corrections.
Figure 14 illustrates diagrammatically the arrangement of components when making the variable correction.
Figure 15 shows the magnetic record and profile in position when reproducing a track without variable correction.
Figure 16 shows the magnetic record and profile in position when reproducing a track so as to effect the variable correction.

Referring to Figures 15 and 16, there is shown in Figure 15 a schematic representation of the film 21 and the magnetic record 15. The cord 110 is shown with one end fastened to the pin 231 on bushing 108 and the other end effectively fastened to the right-hand end of the magnetic record 15. The record is of course in its holder clamped to the record-carrier plate and these carried on the main plate, but these components have been omitted from Figures 15 and 16 in the interest of clarity. In Figures 15 and 16 the right-hand end of the cord 110 is assumed to have been wound up the proper amount on the drum 112 by the motor P214 in order to position the track to be played back to effect the fixed correction as previously described. Accordingly, Figures 15 and 16 are simplified representations of the magnetic record with the respective fixed correction removed from each track, whereby a fictitious point of zero corrected time on the record may be considered to be at point 144. Note that point 144 is not the time break but is a fictitious point to which each track of the record will have been set when the fixed correction has been made as previously described. The point 144 is a reference point useful in the ensuing explanation.

In Figures 15 and 16 the effective point of attachment (pin 231) of the cord 110 to the sliding bushing 108 is effectively over the index 80. The magnetic gap of the play-back head is represented by 509 and the head carries the pair of rollers 106. Let it be assumed for the moment that the detector for the first track 134 (Figure 15) coincides with the shot point so that the record times are times for vertical paths and therefore require no angularity correction. The point 144 then is effectively in line with index 80 as shown in Figure 15 and the cord 110 will be straight. The play-back and recording operation will under these conditions (Figure 15) reproduce an event 135 at a film time 135($a$), which it will be noted is the same as the corrected record time.

Now assume that the record-carrier plate (i.e., the record 15) is moved transversely (i.e., downward as shown in Figure 16) to bring the second track 136 into play-back position, and that for this track the detector is displaced from the shot point. A reflection 137 on track 136 from the same depth horizon is now to be played back at the same vertical time. In order to do this the bushing 108 is moved out of line (as indicated in Figure 16) a sufficient amount to pull the right-hand end of the cord 110 to the left a sufficient distance (remembering that 5″=1 second) so that the play-back 137($a$) of event 137 will fall alongside the play-back 135($a$) of event 135. Figure 16 schematically illustrates the cord 110 as it appears when event 137 is played back so that 137($a$) is in line with the previous play-back 135($a$) of event 135. The event 137($a$) thus appears on the profile film alongside the event 135($a$). The bushing 108 has been displaced to the right (shown upward in Figure 16) by an amount such that the right-hand end of the record is pulled to the left by a sufficient amount to make the necessary correction. The required correction varies with time and therefore is different for each event recorded in the course of the record. The displacement of the magnetic track to the left is therefore a function of the play-back position, i.e., a function of the position of the play-back head along the cord. The manner in which the cord 110 does this properly will become evident.

Figure 10 shows the geometrical relationships involved. For purposes of explanation let it be assumed that the datum plane coincides with the surface of the ground. Consider a shot point 126 on the surface of the ground 130 and a detector 129 spaced from the shot point a distance $x$. An event reflected from a horizon 132 at a depth $z$ will have a path substantially that shown by lines 138 and 139 which we may call 2L. We may construct the image of the shot point in the reflecting horizon by drawing the line 139(*a*) as an extension of line 139, and a line 140 from 126 perpendicular to the reflecting horizon 132. These lines will intersect at the shot-point image 141. The total slant reflection travel distance 2L is equal to the distance from 141 to 129, but the vertical travel distance is from 141 to 126, namely 2$z$. We may swing an arc of radius 2$z$ about the center 141 and it will intersect line 139 at a point 142. The distance 142 to 129 is the excess distance in the slant path, and it is the purpose of the variable-correction device to remove a corresponding amount of time from the total reflection time on the record track of detector 129.

Figure 11:
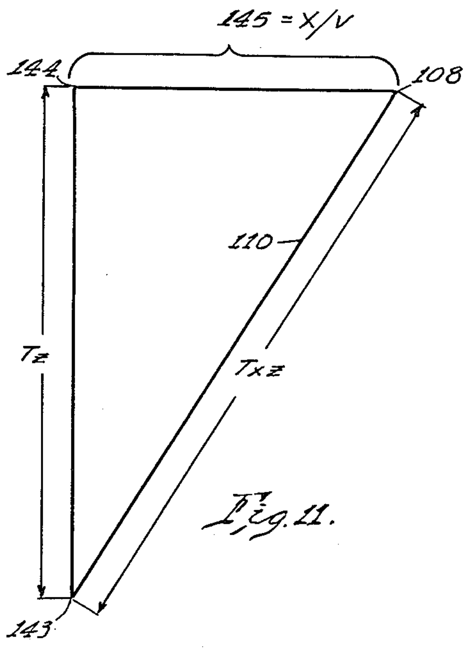
Figure 11 illustrates diagrammatically how the apparatus forms an analog of seismic travel time.

In order to convert the diagram of Figure 10 to an analog diagram of time, consider that on Figure 11 an event 143 (such as 137 of Figure 16) is being reproduced by the play-back head. The rollers 106 will be at 143 and the index 80 is at the point 144, previously mentioned. It is desired to play back the event 143 and record it at a point on the profile film which is the two-way vertical travel time (remembering that 5″=1 second) from the point 144, and the bushing 108 is to be displaced the necessary distance 145 to bring this about. The slant two-way travel time (with the SC correction removed) for an event reflected from a bed at depth $z$ to a detector spaced $x$ distance from the shot may be called $T_{xz}$. This is the record track time (Figure 16) as measured from point 144 previously mentioned. The vertical two-way travel time may be called $T_z$. This is the time at which it is desired to play back the event. If it is assumed that the velocity V is constant then $T_{xz}=2L/V$ and $T_z=2z/V$. The geometric relationship between the time analog lengths in Figure 11 is that the square of length 143 to 108 is equal to the square of length 143 to 144 plus the square of length 145. Accordingly, the geometric relationship between the time analog lengths is $(T_{xz})^2=(T_z)^2+(x/V)^2$.

It is therefore seen that the event 137 of Figure 16 will be played back as desired provided the displacement of bushing 108 (i.e., length 145) is made equal to $x/V$, namely the shot-detector distance $x$ divided by the velocity V; remembering of course that 5″=1 second and that $x/V$ has the dimension of time. The shot detector distance $x$ is of course known for each magnetic track.

Figure 17:
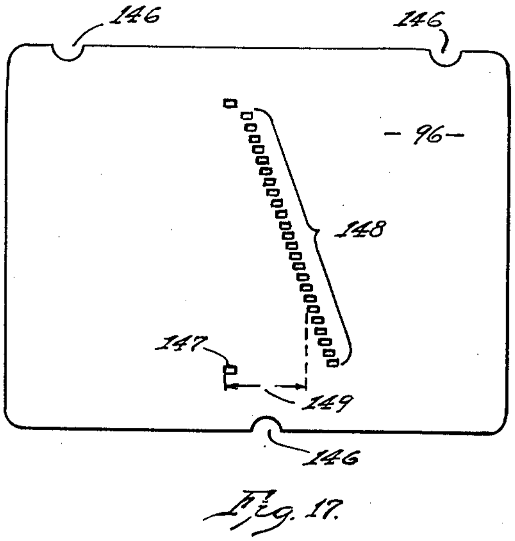
Figure 17 shows a view of the analog computer card for controlling the angularity correction.

In order to properly displace the bushing 108 an $x/V$ stylus carriage 101 (Figure 7) is provided whose stylus S82 senses a hole in a punched card 96 (Figure 17). The card 96 has previously-punched holes which are an analog record of the quantity $x/V$ for the track being played back. Figure 17 shows the card 96 which may be similar in size and shape to card 95. The card 96 is mounted on the record-carrier plate 25 (Figure 7) and is accurately positioned by three notches 146 (Figure 17) which fit against indexing buttons 235 (Figure 7) on the record-carrier plate 25. For each track of the magnetic record the shot-detector distance $x$ has a different value which is always known from the field data sheets. The velocity V is also known (further explanation on this point will follow) so that it is possible to compute the $x/V$ value for each track, and a distance proportional to the $x/V$ quotient is punched into the card 96 at a transverse location on the card corresponding to the track to which it pertains. Inasmuch as the card 96 moves transversely with the record-carrier plate 25, it is apparent that the card 96 always presents to the $x/V$ stylus the proper hole for the track being played back. The card 96 is punched with a zero hole 147 whose left-hand edge represents no displacement of the bushing 108, i.e., it represents the machine configuration shown in Figure 15. The holes 148 pertaining to the respective tracks have their left-hand edges displaced from that of hole 147 by an amount 149 which is proportioned to the quantity $x/V$. The holes in card 96 thus serve as as analog record of the $x/V$ value for each seismic track on the record to which the card pertains. The manner in which this controls the displacement of bushing 108 will become evident later.

Figures 12, 13 and 14 show diagrammatically the progressive positions of the magnetic record with respect to the index 80. Referring to Figure 12, the fixed correction mechanism previously described adjusts the effective length of cord 110 so that the point 144 on the record effectively corresponds to index 80 on the profile film. It should be noted from Figure 12 that when the bushing 108 is in the zero position and the record track has been shifted to make the fixed correction, there is a one-to-one relationship between each point on the cord 110 and each point on the record track. Therefore every point on the cord 110 that is in line with the track (i.e., to the right of the rollers 106 in the apparatus or below the rollers 106 as shown in Figures 12, 13, and 14) may be assumed to be fixed on the track. This means that when the roller 106 (over which the cord 110 passes) is at any point along the track, the cord may simply be considered as fastened to the record at the roller location, and that portion of the cord 110 to the left (above in Figures 12, 13, and 14) of the roller 106 is still the analog of $T_{xz}$ for the record impulse being played back at the point where the roller 106 is located. The track 136 (Figure 16) is however not played back with the cord straight as shown in Figure 12, but is played back with the bushing 108 displaced to one side by an amount $x/V$ (at 5″=1 second) indicated by distance 145 in Figures 11 and 13. The index 144 of the track is thereby moved to the left (upward in Figure 13) by an amount $(2L/V—2z/V)$ which is the desired correction to put the event being played back at the proper position 143 with respect to index 80 for play-back as if it were a vertically-reflected event which is as desired. If now the rollers 106 move farther left (upward as in Figure 14) to scan an event which was recorded at 146, the record and index 144 will be pulled still further to the left (upward as shown in Figure 14). Note however that the part 110(*a*) of the cord is still an analog of $T_{xz}$ for the event. Accordingly, the distance from index 80 to the played back event 146 is an analog of $T_z$ for the event. The apparatus in this manner functions as a computing device in which machine length is a time analog.

The $x/V$ stylus carriage 101 (Figure 7) is substantially similar to the carriage 100 previously described in connection with Figure 8. However, stylus carriage 101 does not move the record 15, but its motion is coordinated with other means (to be described) which move the bushing 108 proportionately. The $x/V$ stylus unit 101 has a motor P216 geared to a rack on the carriage 101, so that rotation of the motor P216 moves the stylus carriage and stylus S82. Motion is progressively from left to right. The motor P216 which is used to drive the stylus carriage 101 is a selsyn-receiver motor driven from a selsyn-transmitter P207 in another part of the apparatus to be described later. Inasmuch as the detectors for the various tracks in field operations are in sequence with respect to the shot point, the corresponding $x/V$ values 149 which are punched into card 96 (Figure 17) progress across the card in one direction, and a punched hole will thus always lie to the right of the preceding hole. Therefore after the stylus has dropped into one hole (148 Figure 17) and the machine has played-back the corresponding track, the card simply moves over with the record-carrier plate 25 on which it is fastened to present to the stylus the $x/V$ hole for the next track. The control circuit for moving the $x/V$ stylus carriage 101 is therefore arranged to lower the stylus S82 and move it to the right, whereupon the stylus seeks and locates the next hole.

Depending on the direction in which the record was shot, it may be necessary to reverse direction of transverse motion of the record-carrier plate 25. Accordingly, the control circuits are arranged so that the machine may play back the tracks 7 (Figure 1) in succession from 1 to 24, from 24 to 1, or in any other arrangement corresponding to the detector spreads. Figure 17 shows an $x/V$ card for a detector spread on one side of the shot point with track #1 nearest the shot point and #24 farthest, i.e., the upper-most hole 148 in Figure 17 corresponds to the $x/V$ value for detector 128 of Figure 10 and the lower-most hole 148 corresponds to the $x/V$ value for detector 129 of Figure 10. For convenient reference, track #1 is defined as the right-hand seismic signal track of Figure 1.

It has been shown above that the apparatus by means of bushing 108, cord 110, and rollers 106 effects an angularity correction during the play-back operation so that events recorded by detectors at various shot-detector distances will be played back in alignment as if they were seismic events reflected vertically from the same horizontal bed. The apparatus as described up to this point follows the equation $$(T_{xz})^2=(T_z)^2+(x/V)^2$$

where V has been assumed constant.

It is known however, that the velocity V is not constant, but is in fact a function of depth to the reflecting layer and therefore of the travel time. Therefore to apply the above equation correctly it must be remembered that V is a function of travel time. The proper angularity correction is given by $(T_{xz}-T_z)$, and it can be seen from the above equation that this is a function of $x/V$, and because V is a function of time, the proper correction will involve an $x/V$ value which is a function of time as well as of $x$. In the apparatus of this invention the variations of $x/V$ with $x$ and with time during the course of the play-back operation are both taken into account and the two variations in the correction are both automatically made, so that when the respective track is played back, each event is reproduced at a corrected time which is $T_z$ instead of $T_{xz}$. As has been explained above, the displacement of the bushing 108 by the amount of the $x/V$ value provides the correct dependence of the correction on $x$ for all events of the track whose shot-detector distance is $x$. Additionally, in order to provide the proper dependence of the correction on V, the bushing 108 is moved slightly during the course of the play-back process, as will now be described.

Consider first that the entire regime has a constant velocity $V_1$ which may be that observed for the near-surface reflections. Then $$(T_z')^2+(x/V_1)^2=(T_{xz})^2$$

where $T_z'$ is the vertical reflection time at the velocity $V_1$. From this we obtain $$T_{xz}=[(T_z')^2+(x/V_1)^2]^{1/2}$$

It is apparent that for an event, such for example as 146 in Figure 14, the portion 110(*a*) of the cord above the rollers 106 (to the left of rollers 106 in Figure 7) is still the analog of $T_{xz}$ for the event 146.

As was pointed out, the velocity is known to change with depth. Because of this change, which is generally an increase, the actual depth to a reflection of time $T_{xz}$ is generally greater than that computed on the basis of velocity $V_1$. Accordingly the angularity correction, when effected as illustrated in Figures 12, 13, and 14 when based on a value of V (for example $V_1$), is based on only an approximate path geometry and requires a correction which is to account for the change in velocity with depth. Let $V_z$ be the average velocity to a depth $z_1$, i.e., that corresponds to any time $T_z$ on the record track. The ratio of the chosen $V_1$ to the velocity $V_z$, namely $V_1/V_z$, varies with the time $T_z$ for corresponding depths $z$. We previously had assumed $$T_{xz}=[(T_z')^2+(x/V_1)^2]^{1/2}$$

The more accurate relationship, however is $$T_{xz}=[(T_z)^2+(x/V_z)^2]^{1/2}$$

where $V_z$ is the average velocity to the depth $z$ and $T_z$ is the two-way vertical travel time at the true average velocity $V_z$. We may write this in the form $$T_{xz}=[(T_z)^2+(V_1/V_z)^2(x/V_1)^2]^{1/2}$$

From this equation it is apparent that a more accurate angularity correction will be made by displacing the bushing 108 by the amount $(V_1/V_z)$ $(x/V_1)$ instead of simply x/V as was previously described. This is accomplished in this invention in a manner to be described.

It has already been explained that the bushing 108 is displaced an amount $x/V_1$ which has the dimension of time and this displacement is controlled by the card 96 and stylus S82. A further mechanism, however, is required to introduce the factor $V_1/V_z$ which is a dimensionless ratio and is a function of time. We can make the following transformation:

$$\begin{aligned} x/V_z &= (x/V_1)(V_1/V_z) \\ &= (x/V_1)1-1+V_1/V_z) \\ &= (x/V_1)-(x/V_1)(1-V_1/V_z) \\ &= x/V_1-x/V_1 \tan\theta \end{aligned}$$

where $\tan\theta=(1-V_1/V_z)$ is a machine parameter which is evidently a function of time, but is a dimensionless quantity.

In the apparatus, the bushing 108 is actually displaced a distance $x/V_1$ for small values of time as previously explained. However, $V_z$ is generally larger than $V_1$, so in order to take into consideration the higher velocity for large values of time, the bushing 108 must be closer to its zero position for deep events, and gradually moved outward so that it eventually reaches a displacement $x/V_1$ for shallow events on the record. This is accomplished in the proper manner as will be evident by reference to Figures 18 to 23.

Figure 18:
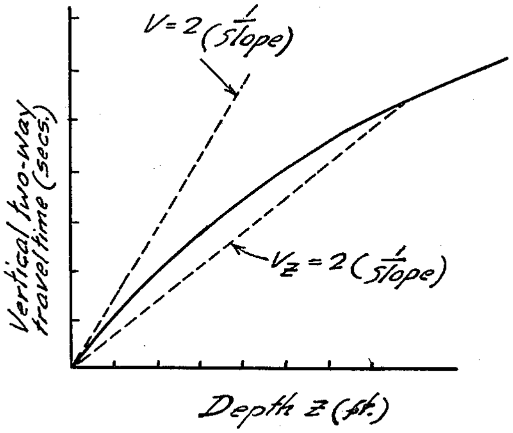
Figure 18 shows a typical time-depth curve.

The dimensionless quantity $\tan\theta$ is introduced in the invention by means of a push rod riding on a cam whose shape is derived from a time-depth curve and the geometry of an analog computer mechanism shown in Figures 22 and 23 to be described. The time-depth relationship is known, usually quite accurately, in any region where extensive seismic work has been done, and may be obtained for example from well shooting. An example of a typical time-depth curve is shown in Figure 18. The initial slope of the curve of Figure 18 depends on the velocity $V_1$ that is observed for reflections from shallow horizons. The average velocity $V_z$ to any reflecting horizon of depth $z$ depends on the slope of the line drawn from the origin to a point on the curve corresponding to a depth $z$. From the curve of Figure 18 it is possible to compute at various values of two-way travel time, the corresponding value of $V_1/V_z$ and to plot the curve shown in Figure 19. Now the abscissa of the curve shown in Figure 19 is vertical two-way travel time $T_z$ and by mechanically driving a cam in synchronism with motion of the play-back head, the cam displacement is made proportional to $T_z$.

Figures 19, 20, 21:
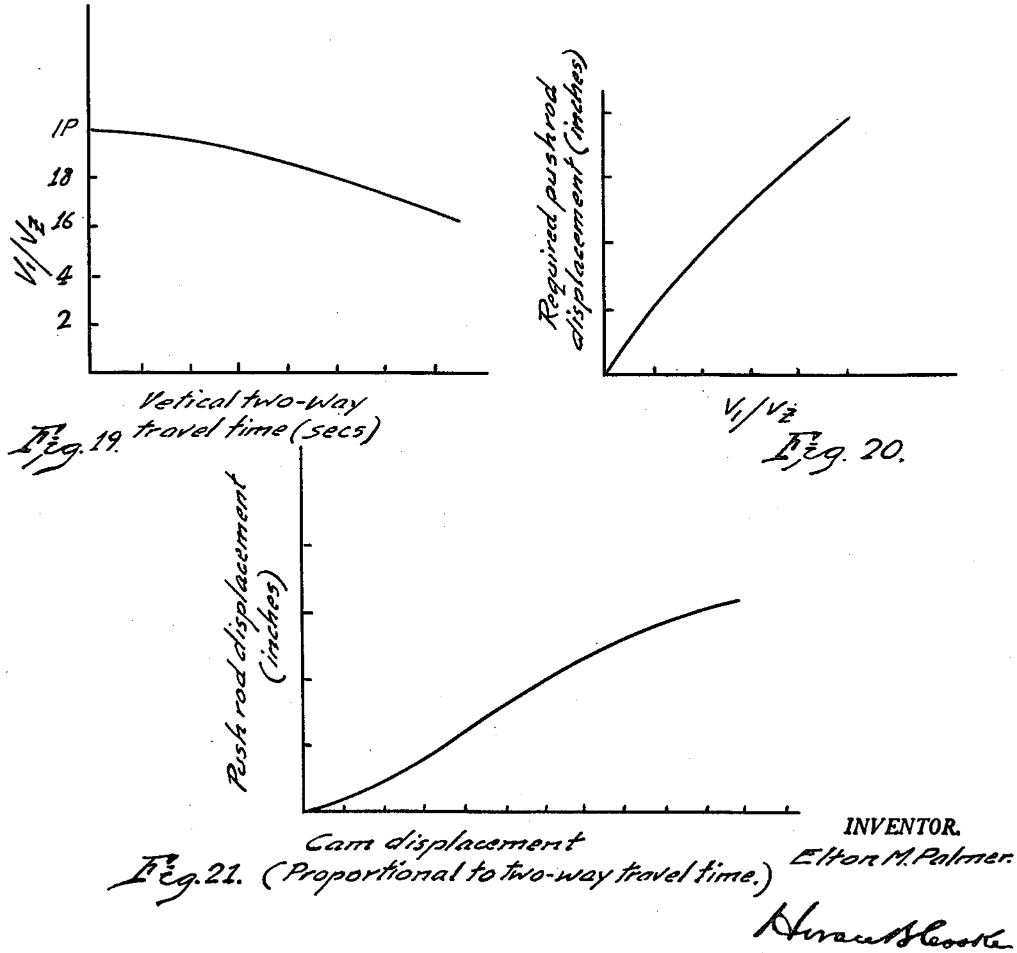
Figure 19 shows a curve of the ratio of velocities against seismic travel time.
Figure 20 shows a transfer curve for converting velocity ratios to push-rod displacement.

From the known geometry of the various linkages, lever arms, etc., in the computer mechanism of Figures 22 and 23, it is a simple matter to determine and plot the relationship between $V_1/V_z$ and the push-rod displacement that is required to produce angle $$\theta=\tan^{-1}(1-V_1/V_z)$$

and surch a curve is shown in Figure 20. The requierd developed push-rod motion as shown in Figure 21 is then obtained from the curve of Figure 19 using Figure 20 as a transfer curve. The push rod preferably has a roller which rides on the cam and the radius of the roller must of course be subtracted from the curve of Figure 21 to give the actual cam height as is well known in cam design. Having thus arrived at the cam shape required to introduce the factor $\tan \theta = (1 - V_1/V_2)$, we may now explain how it is embodied in the machine.

The transverse displacement of the bushing 108 is controlled by an endless cord 150 best seen in Figure 7. This cord passes over pulleys 152 and 153 at the ends of the bar 107, and over other pulleys at the left-hand end of the instrument case to an analog computer mechanism contained in the lower left-hand end of the case. Inasmuch as the various pulleys over which the cord passes serve no function other than to change the direction of the cord 150 they will not be mentioned further. Figure 22 shows a diagrammatical sketch of the computing mechanism which actuates the cord 150 and thereby determines the transverse displacement of bushing 108.

The quantity $(x/V_1 - x/V_1 \tan \theta)$ is determined by means of an analog computer whose elements are controlled by the position of the hole in the $x/V$ card 96 and the position and shape of the cam 178 defined by Figure 21. These factors are properly combined in the mechanism shown in Figures 22 and 23 so as to provide the proper displacement of bushing 108 by imparting the required motion to the endless cord 150. In Figure 22 the cord 150 is shown passing over pulleys 151, 152, 153, and 154 but these are merely diagrammatical representations of pulleys fastened to the case of the machine and over which the cord 150 passes in order to reach bushing 108 on bar 107. Bushing 108 also has fastened to it the main plate cord 110 previously discussed in detail, and the bushing 108 and cord 110 are shown only diagrammatically in Figure 22.

The computer is shown diagrammatically in Figure 22 and in perspective in Figure 23. A steel lead screw 155 engaging a threaded carriage 156 has a gear box 157 and 158 at each end. A D.-C. reversible motor P208 is connected to the gear box 157 and serves to slowly rotate the lead screw 155. The other gear box 158 rotates a selsyn transmitter P207 whose electrical output is transmitted over wires 161 to a selsyn receiver P216 located on the right-hand end of the main plate. The selsyn receiver P216 moves the $x/V$ stylus carriage 101 previously described, and the carriage 101 moves the stylus S82 longitudinally on card 96. The $x/V$ stylus carriage elements have been previously mentioned; they are shown in Figure 22 in diagrammatical form only. The selsyn receiver P216 and the $x/V$ stylus carriage 101 are of course not shown on Figure 23 being located in a different part of the apparatus. The motion of selsyn receiver P216 accurately repeats the motion of selsyn transmitter P207 so that the motion of the $x/V$ stylus S82 is accurately proportional to rotation of the lead screw 155 (or vice versa). Motor P208 which drives the lead screw is controlled through an electrical control circuit described later, arranged so that the motor P208 is driven in such direction to move the $x/V$ stylus carriage 101 and stylus S82 toward the right over the $x/V$ card, and when the stylus S82 drops into a hole in the card, the stylus S82 makes contact to ground and completes a control circuit which stops the motor P208. In this manner the amount of rotation imparted to the lead screw 155 by the motor P208 is accurately proportional to the quantity $x/V$ which was previously punched into the $x/V$ card for the particular track being scanned. The motor P208 is reversible so that other control circuits can subsequently return the lead-screw carriage 156 as well as the stylus carriage 101 to their respective starting positions.

The lead-screw carriage 156 carries a bar 163 which is mounted accurately perpendicular to the axis of lead screw 155. For purposes of explanation let us assume that the zero position of the carriage 156 is in the middle of the lead screw and that the corresponding zero position of the vertical axis of bar 163 is on the line 164 of Figure 22. In order to simplify the explanation, let us assume that the zero position of bushing 108 is also on the line 164. The cord 150 is fastened to a bushing 165 which may slide on bar 163 and is provided with appropriate ball-bearing bushings. The lead-screw carriage 156 also carries pulleys 167, 168, 169, and 170 over which the cord 150 passes. The two parts of cord 150 are so adjusted that when lead-screw carriage 156 is at its zero (i.e., the axis of bar 163 lies on line 164) and the bushing 165 is also at its zero (i.e., on the axis of lead screw 155), bushing 108 is at its zero (i.e., with no lateral displacement as shown on Figure 7). It is apparent then that rotation of the lead screw 155, as controlled by the position of the hole in the $x/V$ card, moves the lead-screw carriage 156 and also moves the bushing 108 the same transverse amount on bar 107. The motion of lead-screw carriage 156 is imparted to the bushing 108 by means of cord 150. Inasmuch as the bushing 108 displacement is related to the $x/V$ value by the scale factor of the machine (i.e., 5″=1 second), it is apparent that the displacement of lead-screw carriage 156 must also be related to the $x/V$ value by this same scale factor. In Figure 22 the displacement of the lead-screw carriage 156 and the bushing 108 are marked $x/V_1$, but it is understood that the actual machine displacements are related to the times shown by the machine scale factor (i.e., 5″=1 second).

It may be pointed out that whereas displacements of elements 108 and 156 of Figure 22 are analogous to time by the machine scale factor (i.e., 5″=1 second), it is not necessary to hold to this same factor for the distances on the $x/V$ card. It is clear from Figure 22 that distances on the $x/V$ card are related to displacements of lead-screw carriage 156 through the gearing 158, the thread pitch of lead screw 155 and also the gearing between selsyn receiver P216 and the rack on stylus carriage 101. Any or all of these factors may be suitably selected so that a given distance 149 on the $x/V$ card 96 (Figure 17) will result in a displacement of the lead-screw carriage 156 at the machine scale (i.e., 5″=1 second). It has been found convenient to punch the $x/V$ card at a proportionality factor of 1½ inches=1 second so as to permit accommodating fairly large values of $x/V$ on a card of reasonable size.

In addition to the above-described motion of the lead-screw carriage 156, it is also seen that motion of the bushing 165 along the bar 163 can also effect transverse displacement of bushing 108 and in this way the second term of the equation, namely $(x/V_1 \tan \theta)$, is introduced into the analog computer, Figure 22. Pivoted at the point where line 164 crosses the axis of the lead screw 155, i.e., at point 171, is a T-shaped member 172 having a slot 173 which passes through the point 171. The member 172 has an area which extends perpendicular to the slot 173 and has a pivoted linkage arm 174 pivoted to a clamp 175 on the cam push rod 176. The push rod 176 has a cam roller 177 at its left-hand end. The cam roller 177 rides on the cam 178 shown in developed form in Figure 22. The shape of cam 178 is determined by the curve of Figure 21, as previously explained. A tension spring 179 fastened to the end of push rod 176 urges the rod against the cam. By this means the cam will control the angle between the slot 173 and the axis of the lead screw 155. This angle is the angle $\theta$ in the equation previously referred to.

A pin 180 projects from bushing 165 and has an accurate sliding fit in slot 173 of the arm 172. It is apparent that if the lead-screw carriage 156 is displaced say to the left of point 171 (by rotation of the lead screw) by the amount $x/V_1$ and the slot 173 is set by the cam to make an angle $\theta$ with the axis of the lead screw 155, then the bushing 165 will slide on the bar 163 to a position off the axis of the lead screw by the amount $(x/V_1 \tan \theta)$. Furthermore, this displacement is superimposed on the cord 150 and therefore on the bushing 108. As is evident from Figure 22, the displacement of bushing 165, namely $(x/V_1 \tan \theta)$, subtracts from the original $x/V_1$ displacement of bushing 108 so that the net displacement of bushing 108 is $(x/V_1 - x/V_1 \tan \theta)$.

The angle $\theta$ of course varies with the position of the play-back head during the play-back operation. The cam 178, whose developed shape is shown diagrammatically in Figure 22, is actually made in the form of a thin hollow cylinder (see Figure 23) whose base is perpendicular to its axis 182 and whose elements have an altitude given by the curve of Figure 21. The shaft 182 on which the cam 178 is mounted is geared by means of gear box 181 (see detail Figure 23($a$)) to the motor P206 which drives the play-back head by means of tapes 103 and 104 (Figure 7) as previously described. The cylindrical cam 178 is held on its shaft by a thumb nut and the proper angular orientation of the cam is assured by an appropriate keyway. In this way the cam displacement is accurately related to the play-back head position. The cam shape and resulting push-rod displacement generate the angle $\theta$ so as to correctly enter the $V_1/V_z$ ratio into the computer during the play-back process. Thus the proper $x/V_1$ value is set into the machine by the $x/V$ stylus before starting the play-back operation, and during the course of the playback operation the proper quantity $(x/V_1 \tan \theta)$ is subtracted from $x/V_1$, thereby properly positioning the bushing 108 at each point in the play-back operation so that the transverse displacement of bushing 108 is the desired quantity $x/V_z = x/V_1 - x/V_1 \tan \theta$. The computing mechanism shown in Figures 22 and 23 thus serves as an analog computer for the quantity $x/V_z$. A series of cams 178 can be made up for a number of typical areas in which seismic work is done.

Provision is made in the machine for accommodating either positive or negative values of $x$ (or $x/V_1$). Inasmuch as detector spreads are generally shot from either or both ends, and oftentimes there are spreads which have the shot point in the middle of the spread or at some other point intermediate its end detectors (so-called split spreads), it is apparent that the seismic field operations will give rise to both positive and negative values of $x$ and therefore of $x/V_1$. The $x/V$ card (Figure 17) is accordingly punched with positive values on the right side of zero hole 147 and with negative values on the left side of zero hole 147. As is evident from Figure 7 the bushing 108 may be displaced on either side of its zero point on the bar 107. Similarly the lead screw 155 (Figure 22) can effect displacement of its carriage 156 on either side of its zero line 164. Furthermore the slot 173 in the arm 172 also extends both ways from the point 171, and the bushing 165 can move either up or down from its zero point opposite the axis of lead screw 155. Hence, the apparatus entirely automatically takes care of either a positive or a negative value of $x/V_1$ for the track to be played back.

The function of the longitudinal micrometer adjustment 99 can now be described. The screw 99 affords a means for simultaneously adjusting the longitudinal position of the play-back head 501 and the lamp housing 23 with respect to the rollers 106. It is evident that the fixed correction (SC) will include what is generally known as a datum correction, i.e., the reflection times are corrected to a common datum plane for all tracks and all records, and since this applies to all events of any one track, it is convenient to include it as part of the fixed correction. The angularity correction should be based on an $x/V$ value in which $x$ is measured on the surface of the ground (not the datum plane) and on the travel time measured from the surface of the ground (not the datum plane). In order to maintain precision in the angularity correction the departure of the ground surface from the datum plane should be taken into account. Thus, if the ground surface should, due to changes in elevation, wander far from the datum plane, a datum adjustment is made by setting micrometer screw 99 to the datum correction value. This provides that the rollers 106 operate so as to impart a geometery to cord 110 which is similar to that which existed on the ground, the play-back head meanwhile playing back and the lamp housing recording events at correct time with respect to the datum plane. The micrometer screw 99 is graduated in time units (at the machine scale of 5″=1 second). By thus providing for longitudinally shifting the play-back head and the lamp housing with respect to the rollers 106 by an amount equal to the datum correction, the apparatus can make the angularity correction with the proper precision. It is apparent that for profiles made in relatively flat country the screw 99 requires at most only slight initial adjustment, but for profiles made in hilly country the screw 99 is adjusted at the beginning of each record.

As previously pointed out, the record-carrier plate 25 advances transversely each time a new track is to be played back. In order to effect the advance, a tension spring (not shown) is connected from the main plate to a post 200 (Figure 7) on the record-carrier plate and an escapement is provided which allows the record-carrier plate to move the proper distance to bring the new track into position. The spring and escapement are indicated diagrammatically by 43 in Figure 3. An axial view of the escapement is shown in Figure 24 (i.e., as it would appear when looking at the front of the machine as in Figure 6). The escapement is located under the main plate 68 near the left-hand end thereof and its axis is transverse to the main plate 68. The record-carrier plate 25 is shown over the main plate 68. A solenoid P284 (see also Figure 7) is mounted on a bracket 201 fastened to the record-carrier plate 25. The plunger 202 of the solenoid extends downward through a ball bushing 210 and the plate 25, and the plunger is reduced in diameter at its lower end to form a pin 203 which reaches below the record-carrier plate to an escapement rack 204. An enlarged top view of the rack 204 is shown in Figure 24($a$), the top of Figure 24($a$) being the rear end of the rack. The lengths of the solenoid, link and pin are such that when the solenoid is energized as by closing switch S15 (Figure 27($d$)) the pin 203 is retracted from the escapement rack 204 and the record-carrier plate 25 can then be moved transversely (forward and backward) by means of crank 88 (Figure 7), which of course must be done when loading a new record into the machine.

During the play-back operation the pin 203 is in its lowered position and engages the rack 204 to hold the record-carrier plate 25 and the record carried thereon in proper transverse position for playing back the desired record track. The escapement rack 204 is carried at each end on trunnions 205 which may rotate in bearings fastened to a base plate 211 mounted on the under side of the main plate 68. The escapement rack 204 carries a lower forked extension 206 and the fork engages a transverse pin 207 in the opposing plungers 208 and 209 of two solenoids P218 and P219 also mounted on the under side of the base plate 211. This arrangement permits either of the solenoids P218 or P219 to rock the escapement rack 204 about its trunnions 205.

The escapement rack has a particular form shown in Figure 24($a$). The rack actually comprises two racks 212 and 214 which are displaced by half a tooth pitch. Furthermore the diameter of the pin 203 is such that it can slip from the tooth of one rack to the tooth of the other rack by passing in the narrow space 215 between teeth. Thus as the rack is rocked back and forth by alternate energization of the solenoids P218 and P219, the pin slips alternately from one half of the rack to the other. Because of the spring (not shown) which draws the record-carrier plate 25 (carrying the pin) transversely across the main plate 68, it is apparent that alternate energization of the solenoids P218 and P219 will each time advance the magnetic record one space across the main plate. It is also apparent that by proper design of the spacing of the escapement rack teeth, the transverse advance of the record-carrier plate 25 will be just equal to the record track spacing. It is of some importance in understanding the control circuits to note that repeated energization of the same solenoid does not advance the escapement, but that an advancement occurs only when the other solenoid is energized.

It has previously been noted that it may be necessary to reverse the order of playing back the tracks across the record. Therefore, it is required that the escapement allow stepping in either direction. This is accomplished by providing the record-carrier plate 25 with two springs (not shown), the appropriate one of which may be connected by the operator to the post 200 (Figure 7) to pull the record-carrier plate either toward the front or toward the back in Figure 7. The escapement is so designed that the record-carrier plate occupies the same transverse positions regardless of whether the pin 203 is against the forward edge of a tooth on rack 214 or the rearward edge of the next rearward tooth on rack 212 and vice versa. By this design the positions of the record-carrier plate are accurately reproduced when under the influence of either spring (i.e., either direction of advancement) to give the desired order of playing back the tracks.

The above description explains how the record-carrier plate 25 is moved laterally by the record-advancing means shown schematically as 43 in Figure 3 in order to bring the successive tracks under the magnetic play-back head 501. As the various tracks are played back and each seismic impulse is appropriately shifted in time by the operation of the apparatus as explained above they are reproduced in variable-density form on the film by the motion of lamp housing 23 and the lamp P12 energized from the play-back head. In order that the variable-density reproductions be properly placed side by side on the film 21 shown in Figure 3 it is also necessary to advance the film accordingly. This is indicated schematically in Figure 3 by 37 and the actual mechanism employed will be described later with reference to Figure 25. Figure 3 shows the rails 58 on which the magazine 26 rests by means of wheels 57. The rails are fastened to a common shaft 59 which is journaled in brackets on base 54, the shaft being rotated by means of a worm gear and motor P221. In Figure 3 the printing lamp housing 23 and the film 21 (as the latter goes over the top of roller 30) are shown separated by a considerable distance but in actual operation the aperture 24 clears the top of the film 21 by only a few thousandths of an inch by means of the rollers 94 (Figure 4). The film 21 of course passes over the roller 30 emulsion side up. Figure 3 also indicates the play-back head-lifting solenoid P211 which when energized pulls on a bell crank to lift the play-back head 501 and the lamp housing 23 to permit passage of the record-carrier plate 25 beneath them when a record is to be changed, as described above.

It is apparent that the spacing of the tracks on the magnetic record is fixed by the spacing of the magnetic heads in the field recorder. This spacing is not easily changed. However, the spacing of the reproduced variable-density tracks on the profile film (Figure 2) depends on the amount of the advancement given to the film 21 between track reproductions. This is conveniently controlled in a manner to be described later. The width of the aperture 24 as shown in Figure 3 is related to the desired spacing of the variable-density tracks on the film 21 (Figure 2), this width being ordinarily made slightly less than the track spacing. Means for varying the aperture 24 is not shown but comprises a mask which is easily removed and replaced by one of a different size. For convenience this mask is held on the same mounting as rollers 94 (Figure 4) so that both may easily be removed if desired.

The film-advancing means (indicated only diagrammatically by 37 in Figure 3) will now be described with reference to Figure 25 which shows an exploded perspective view of this mechanism, which is located at the right-hand end of magazine 26 and only partially shown in Figure 4. In Figure 25 the roll 28 is the film take-up roll and 27 is the film supply roll. The rollers 31, 32, and 34 of Figure 3 are not shown in Figure 25. The film runs off roll 27, over the printing roller 30, between the roller 30 and pressure roller 36, over roller 33 and on to the take-up roll 28. A reversible D.-C. motor P210 drives the mechanism through worm gearing 405 and manually-releasable dog-clutch 406. The clutch 406 may conveniently be disengaged by means of knob 421 (see Figure 4) when loading and unloading film from the magazine, this operation being done in a photographic dark room. The clutch 406 turns the shaft 407 which has pinned thereto a spur gear 408 which through an idler gear 409 drives the gear 410 which is pinned to shaft 411. An important feature is that gear 408 is considerably smaller in diameter than gear 410 whereas the rolls 27 and 28 are nearly the same diameter. The shaft 413 forms the axis of take-up roll 28. Between the shaft 407 and the shaft 413 there is an overrunning clutch 412 shown in more detail in the insert Figure 25(*a*). The clutch 412 may, for example, be a well-known device having rollers which lock the shaft 407 to the outer cylinder 422 whenever clockwise angular velocity of the shaft 407 exceeds that of the cylinder 422. An enlarged view of the clutch is shown in Figure 25(*a*). The action of the clutch 412 is that when the motor P210 rotates the shaft 407 clockwise (i.e., in the direction of the arrow in Figure 25) the clutch 412 engages and transmits the clockwise torque to shaft 413 and the take-up roll 28. However, when the motor P210 rotates in the opposite direction to turn shaft 407 counterclockwise, the clutch 412 disengages and no torque is transmitted. A friction clutch 414 is interposed in shaft 411, so that the shaft of supply roll 27 is always in frictional engagement with shaft 411, but the friction clutch may slip without tearing the film 21.

A spur gear 415 is pinned to the shaft of printing roller 30 and meshes with a smaller gear 416. The gear 416 is connected to a ratchet wheel 417 having a pawl 418 which is depressed by a tension spring 419. A pivoted but otherwise rigid mechanical link (indicated by 420) connects the pawl 418 with a switch S33 in such manner that when the pawl rests at the root of a ratchet tooth (as shown in Figure 25) contacts of the switch S33 are in normal position as shown in Figure 25, but when the pawl is raised as in passing over a ratchet tooth the switch S33 is operated.

Operation of the film-advancing means shown in Figure 25 may now be described. Consider clutch 406 to be engaged and that the film 21 is threaded on both rolls 27 and 28. When the apparatus has completed the reproduction of one track and is ready to advance the film 21 for reproduction of a succeeding track, appropriate control circuits energize the motor P210 so that it rotates the shaft 407 in the direction of the arrow. This engages clutch 412 and take-up roll 28 rotates to wind up the film 21. Inasmuch as gear 408 is smaller than gear 410, slippage occurs between the discs of friction clutch 414, thus maintaining desired tension on the film. Passage of film 21 over the roller 30 effects rotation of ratchet wheel 417 and pawl 418 is lifted up onto a ratchet tooth. This operates switch S33 which cocks the control circuit of motor P210, whereupon subsequent release of switch S33, when the pawl 418 drops into the next notch, causes the control circuit to reverse rotation of motor P210. Motor P210 of course coasts a small amount before reversing so that actually the ratchet wheel 417 has by this time advanced slightly beyond the point at which the pawl dropped. With the motor reversal, the clutch 412 disengages (since it cannot transmit torque in this direction) and the friction clutch 411 drives the roll 27 in a direction opposite to the arrows on Figure 25. Accordingly the film rewinds on roll 27 until the pawl 418 comes sharply up to the root of the ratchet tooth, whereupon the roller 30 is arrested and the film cannot wind further on roll 27 so that clutch 414 slips. The film 21 is then accurately positioned. It is apparent that the roll 27 can rewind only very small length of film before it is stopped and this only takes a fraction of a second. Accordingly after an appropriate time delay the control circuit shuts the motor off. The latter expedient avoids continually supplying power to the motor which power would be dissipated in the friction clutch 414, but it is apparent that other types of motor shut-off means may alternatively be provided, e.g., one which shuts off motor power after a predetermined degree of rotation of shaft 411 or 407 opposite to that shown by the arrows.

It is convenient to make the effective diameter of the printing roller 30 equal to one inch and make the ratio of gears 415 and 416 equal to pi, conveniently 44/14. In such case one revolution of gear 416 corresponds to the passage of one inch of film over the top of roller 30. Inasmuch as the film 21 is stopped and generally has a track exposed thereon for each tooth of ratchet wheel 417, the above arrangement provides for as many tracks per inch as there are teeth on the ratchet wheel 417. Accordingly, if it is desired to change the spacing of the variable-density tracks on the film, it is merely necessary to remove and replace the ratchet wheel 417 with one whose number of teeth equals the desired number of film tracks per inch.

From the foregoing description of the apparatus it is apparent that electrical connections must be made to many moving parts of the apparatus. For this purpose, flexible pigtails, cables, sliding contactors and the like are employed. These have been omitted from the drawings in the interest of clarity. Also certain parts must be insulated from the frame or chassis of the apparatus as will be evident from the wiring diagrams and such insulation is provided as required. In particular the styluses S56 and S82 are each insulated from their respective carriages, and are connected in their respective circuits by pigtail connections. There are also many leads to the carriage assembly and these are conveniently cabled and formed into a long helical plastic-covered pigtail which is loosely wound around the longitudinal bar 66 (Figure 7) to the right of the carriage assembly. The bar thus supports the pigtail, but being loose on the bar the pigtail does not impede longitudinal motion of the carriage assembly.

Figures 27(*a*), 27(*b*), 27(*c*), 27(*d*), 27(*e*), and 27(*f*), herein generally referred to simply as Figures 27, show the wiring diagram of the apparatus. The Figures 27(*a*) to 27(*e*) are placed end to end in the order named and are to be considered as a single diagram. Wires at the right-hand end of one sheet connect to correspondingly-placed wires at the left-hand end of the next adjacent sheet. Identifying symbols (having both letters and numbers) are used to identify various components shown on the wiring diagram, and the same symbol has in each case been used in referring to the component in the foregoing description of the mechanical parts of the apparatus. Figure 27(*f*) showing the circuitry between the magnetic play-back head 501 and the printing-head lamp P12 is also to be considered a part of the group of Figures 27(*a*) to 27(*e*), but it is not shown as connecting with these sheets for simplicity.

The following tables list by way of example all of the components indicated on the wiring diagram Figures 27 and the reference symbol of each component with a brief statement as to the nature of the component if such is not otherwise apparent.

TABLE OF ELECTRICAL COMPONENTS SHOWN ON WIRING DIAGRAMS

*Capacitors*

| Reference character: | Remarks |
|---|---|
| C1 | 2000 mfd., 30 w.v. |
| C2 | 3 mfd., 330 v. A.-C. |
| C3 | 5 mfd., 330 v. A.-C. |
| C4 | 4000 mfd., 50 w.v. |
| C5 | 4000 mfd., 50 w.v. |
| C6 | .25 mfd., 600 v. |
| C7 | .5 mfd., 200 v. |
| C8 | 150 mfd., 150 v. |
| C9 | .5 mfd., 200 v. |
| C10 | 100 mfd. 50 v. |
| C11 | .25 mfd., 600 v. |
| C12 | .25 mfd., 600 v. |
| C13 | 150 mfd., 150 v. |
| C15 | 100 mfd., 50 v. |
| C16 | 100 mfd., 50 v. |
| C17 | 100 mfd., 50 v. |

| Reference Character | Component | Remarks |
|---|---|---|
| P1 | Indicator light | 28 v. Indicates that controls are set for apparatus operation. |
| P2 | do | 28 v. Battery charger, On. |
| P3 | do | 28 v. Magazine cycle indicator. |
| P4 | do | 28 v. SC stylus drive indicator. |
| P5 | do | 28 v. *x*/*V* stylus drive indicator. |
| P6 | do | 28 v. Track controls: Operator Call. |
| P7 | do | 28 v. Run Controls: Record Complete. |
| P8 | do | 28 v. Carriage assembly, left position. |
| P9 | do | 28 v. Carriage assembly, left to right motion. |
| P10 | do | 28 v. Variable-density lamp recording. |
| P11 | do | 28 v. Carriage assembly, right position. |
| P12 | Variable-density lamp | 1.4 volt. |
| P14 | Indicator light | 28 v. Main power on. |
| P15 | do | 28 v. Magazine manual advance indicator. |
| P16 | Indicator lights | 28 v. Number of track to be played back next, 24 lights. |
| P67 | Indicator light | 28 v. Sequential circuit check. |
| P200 | Power transformer | Pri. 115 v.: Sec. 25 v. 25 va., 60 v. 15 va., 40 v. with 30 v. tap 275 va. |
| P201 | Charger transformer | Pri. 115 v.: Sec. 6.3 v., 1 a. |
| P202 | Rectifier | Full wave, output 28 v. D.-C. at 5 amp. |
| P203 | do | Full wave, trickle charger. |
| P204 | do | Full wave, output 9 v. D.-C. at .12 amp. |
| P205 | Meter | 0-100 Microamperes, Variable-density lamp (P12) brightness indicator. |
| P206 | Motor | 115 v., 60 cycle, 2 Phase, synchronous. |
| P207 | Selsyn | Transmitter for P216 selsyn receiver. |
| P208 | Motor | 28 v. D.-C., reversible. |
| P209 | Solenoid | 28 v. Brake actuator. |
| P210 | Motor | 28 v. D.-C., reversible. |
| P211 | Solenoid | 28 v. Play-back head and lamp housing elevator. |
| P212 | do | 28 v. Shutter actuator. |
| P213 | Photovoltaic cell | Variable-density lamp (P12) brightness measurement. |
| P214 | Motor | SC stylus drive, 28 v. D.-C., reversible. |
| P215 | Solenoid | 28 v. *x*/*V* stylus depressor. |
| P216 | Selsyn receiver | *x*/*V* stylus drive. |
| P217 | Solenoid | 28 v. SC stylus depressor. |
| P218 | do | 28 v. Record-carrier plate escapement, left. |
| P219 | do | 28 v. Record-carrier plate escapement, right. |
| P220 | Buzzer | Operator call. |
| P221 | Motor | Magazine elevator, 28 v. D.-C. reversible. |
| P222 | Fuse | Main power. |
| P224 | Battery | 2 v. storage, power supply for P12 Variable-density lamp. |
| P225 | Attachment plug | For wall socket. |
| P226 | Rectifiers | 24 rectifiers, type 1N91 (G.E.Co.) |
| P250 | Rectifier | Rectifier, type 1N91 (G.E. Co.). |
| P251 | do | Rectifier, type 1N151 (G.E. Co.). |
| P252 | do | Rectifier type 1N91 (G.E. Co.). |
| P253 | do | Rectifier, type 1N91 (G.E. Co.). |
| P254 | Rectifiers | 24 rectifiers, type 1N91 (G.E. Co.). |
| P278 | Rectifier | Rectifier, type 1N91 (G.E. Co.). |
| P279 | do | Rectifier type 1N91 (G.E. Co.). |
| P284 | Solenoid | 28 v. Escapement pin lift. |
| P285 | Transformer | Amplifier output to 16-ohm load. |
| P286 | Voltmeter | 0.5 v. A.-C. |

*Resistors*

| Reference character: | Remarks |
|---|---|
| R1 | 0.4 ohm, 10 watt. |
| R2 | 50 ohm, 10 watt. |
| R3 | 39 ohm, 1 watt. |
| R4 | 39 ohm, 1 watt. |
| R5 | 0–25 ohm, 150 ma. |
| R6 | 18 ohm, 1 watt. |
| R7 | 75 ohm, 10 watt. |
| R10 | 3.3 ohm, 1 watt. |
| R11 | 47 ohm, 1 watt. |
| R12 | 47 ohm, 1 watt. |
| R13 | 100 ohm, 10 watt. |
| R14 | 100 ohm, 10 watt. |
| R15 | 100 ohm, 10 watt. |
| R16 | 100 ohm, 10 watt. |
| R17 | 10 ohm, 1 watt. |
| R18 | 75 ohm, 10 watt. |
| R19 | 100 ohm, 1 watt. |
| R20 | 100 ohm, 10 watt. |
| R21 | 100 ohm, 10 watt. |
| R22 | 100 ohm, 10 watt. |
| R23 | 100 ohm, 1 watt. |
| R24 | 100 ohm, 10 watt. |
| R25 | 100 ohm, 10 watt. |
| R26 | 500 ohm maximum, 10 watt. |
| R27 | 18 ohm, 1 watt. |
| R28 | 10 ohm, 1 watt. |
| R30 | 20 ohm, 10 watt. |
| R31 | Gain control, matched for units **510** and **511** (Figure 27(*f*)). |

*Switches*

| Reference Character | Type of Switch | Remarks |
|---|---|---|
| S1 | Push button | Track controls: Blank. |
| S2 | Toggle | Run controls: Run/Standby. |
| S3 | Push button | Run controls: Pause. |
| S4 | do | Track controls: Skip. |
| S5 | do | Magazine: Test. |
| S6 | do | Track controls: Repeat. |
| S7 | do | Track controls: Insert Blank. |
| S8 | do | Track controls: Cancel Preset. |
| S9 | do | Magazine: Advance. |
| S10 | do | *x/V:* Reset. |
| S11 | do | *x/V:* Test. |
| S12 | do | SC: Test. |
| S13 | do | Operation interruption. |
| S14 | do | Run controls: Resume. |
| S15 | Toggle | Manual control for escapement pin lift solenoid. |
| S20 | do | Main power: On/Off. |
| S21 | do | Battery charger: On/Off. |
| S22 | do | Automatic magazine elevator control. |
| S23 | Snap-action | Magazine elevator, up limit. |
| S24 | do | Magazine elevator, down limit. |
| S25 | do | Interlock for main plate in load position. |
| S26 | Toggle | Magazine elevator control, apparatus not operating. |
| S27 | do | P206 motor inactivate control (for testing). |
| S29 | Push button | Track Controls: Dougle Recording-Mix. |
| S31 | Toggle | P12 lamp and P212 shutter manual operate (for testing). |
| S32 | Push button | Variable-density lamp (P12) brightness test. |
| S33 | Snap-action | Magazine ratchet pawl. |
| S34 | do | Lead screw carriage, left override, computer unit. |
| S35 | do | Lead screw carriage, right override, computer unit. |
| S36 | do | *x/V* stylus carriage, left override. |
| S37 | do | *x/V* stylus carriage, right override. |
| S38 | do | *x/V* stylus carriage, left limit. |
| S39 | do | *x/V* stylus carriage, right limit. |
| S40 | Toggle | Magazine inactivate control (for testing). |
| S41 | do | SC stylus inactivate control (for testing). |
| S42 | do | *x/V* stylus inactivate control (for testing). |
| S43 | Snap-action | Carriage assembly, left limit. |
| S44 | do | Carriage assembly, right limit. |
| S45 | do | Carriage assembly, left override. |
| S46 | do | Carriage assembly, right override. |
| S47 | Contactor | Main plate cord. |
| S48 | Toggle | Track play-back order. |
| S49 | Centrifugal | P206 motor shaft, switch closed when running. |
| S50 | Snap-action | SC stylus carriage, left limit. |
| S51 | do | SC stylus carriage, right limit. |

*Switches*—Con.

| Reference Character | Type of Switch | Remarks |
|---|---|---|
| S52 | Snap-action | SC stylus carriage, left override. |
| S53 | do | SC stylus carriage, right override. |
| S54 | Push button | Power supply control. |
| S55 | Rotary | Selection of form of reproduction. |
| S56 | Contactor | SC stylus. |
| S58 | Toggle | Individual track controls: 24 preset switches. |
| S82 | Contactor | *x/V* stylus. |
| S83 | Snap-action | Magazine take-up roll shaft. |
| S84 | Toggle | Battery charger, to boost charging rate. |
| S85 | Snap-action | Interlock for main plate crank. |
| S86 | do | Interlock for magazine in position. |
| S87 | Toggle | Test: Test Run/Off. |

*Relays*

All relays are 28 volt, short-coil telephone type unless otherwise noted. By "normal" is meant that the relay has no special structure to affect its operating time. A slow-release relay is indicated on the wiring diagrams with a cross-marked square at the lower end of the relay coil as shown on the diagrams. A slow-operate relay is indicated by a cross-marked square at the upper end of the relay coil as shown on the diagrams.

| Reference character: | Remarks |
|---|---|
| X1A | Normal. |
| X1B | Slow operate. |
| X1C | Normal. |
| X1E | Normal, 14 v., 100 ohm coil. |
| X1F | Normal. |
| X1G | Normal. |
| X1H | Normal. |
| X1J | Slow release. |
| X1K | Normal. |
| X2A | Slow operate. |
| X2B | Slow release. |
| X2C | Slow release. |
| X2D | Slow release. |
| X2E | Normal. |
| X2F | Normal. |
| X2G | Slow release. |
| X2H | Slow release. |
| X2J | Normal. |
| X2K | Normal. |
| X3A | Normal. |
| X3B | Normal. |
| X3C | Slow release. |
| X3D | Slow release. |
| X3E | Normal, 14 v., 100 ohm coil. |
| X3F | Normal. |
| X3G | Slow release. |
| X3H | Normal. |
| X3J | Normal. |
| X3K | Normal. |
| X4B | Slow release. |
| X4C | Normal. |
| X4D | Normal. |
| X4E | Normal. |
| X4F | Normal. |
| X4G | Normal. |
| X4H | Normal. |
| X4J | Slow operate. |
| X4K | Normal. |
| X5B | Normal. |
| X5C | Slow release. |
| X5D | Normal. |
| X5E | Normal, 14 v., 100 ohm coil. |
| X5F | Normal. |
| X5G | Normal. |
| X5H | Slow release. |
| X5J | Normal. |

| Reference character: | Remarks |
|---|---|
| X5K | Normal, 14 v., 100 ohm coil. |
| X6B | Slow release. |
| X6C | Normal. |
| X6D | Normal. |
| X6E | Normal. |
| X6F | Slow release. |
| X6G | Normal. |
| X6H | Normal, 14 v., 100 ohm coil. |
| X6J | Normal. |
| X6K | Normal. |
| X7B | Normal. |
| X7C | Latching type, 28 v. coil. |
| X7D | Normal. |
| X7E | Slow release. |
| X7F | Normal. |
| X7G | Normal. |
| X7H | Normal. |
| X7J | Normal. |
| X7K | Normal, 14 v., 100 ohm coil. |
| X8B | Slow release. |
| X8C | Release coil for X7C, 28 v. |
| X8D | Normal. |
| X8E | Normal. |
| X8F | Normal. |
| X8G | Slow release. |
| X8H | Normal. |
| X8J | Normal. |
| X8K | Slow operate. |
| X9B | Slow release. |
| X9C | Normal. |
| X9D | Slow release. |
| X9E | Normal. |
| X9F | Normal. |
| X9G | Slow operate. |
| X9H | Normal, 14 v., 100 ohm coil. |
| X9J | Slow operate. |
| X9K | Normal. |
| X10B | Slow release. |
| X10C | Normal. |
| X10D | Normal. |
| X10E | Normal. |
| X10F | Normal, 14 v., 100 ohm coil. |
| X10G | Normal. |
| X10H | Normal, 14 v., 100 ohm coil. |
| X11B | Slow operate. |
| X11C | Normal. |
| X11D | Normal. |
| X11E | Normal. |
| X11F | Normal, 14 v., 100 ohm coil. |
| X11G | Normal. |
| X11H | Normal. |
| X12A | Step switch actuator, 28 v. coil. |
| X12E | Latching type, 28 v. coil. |
| X12G | Thermal switch, 28 v. heater. |
| X13E | Release coil for X12E, 28 v. |

Many of the components shown on the wiring diagrams and listed above are not indicated on the descriptive figures since they would only tend to confuse the latter and their mechanical application to the apparatus is clearly apparent to those skilled in the art. Thus, for example, many of the moving members of the apparatus have limit switches and override switches all of which are indicated in the wiring diagram (Figures 27) but are not shown on the mechanical figures. The purpose of the various limit switches is to actuate the appropriate control circuit (as shown in the wiring diagram) upon completion of the respective machine movement concerned, so that the sequence of operation may proceed or, under certain conditions operation may be arrested. The purpose of the override switches is primarily protective to prevent internal mechanical damage in the event that one of the limit-switch circuits should fail.

Two-pole switches are shown in the wiring diagram with their switch arms connected by a dash line bearing the reference symbol which identifies the switch. The respective switch arms are numbered and this number is stated after the switch number in referring to it in the ensuing description. Manually-operated switches are either selectively-closed (e.g. toggle) type switches which are closed to either one side or the other, or are push-button switches of the snap-action type spring-biased to one position. In the wiring diagram these switches are generally shown operating horizontally so that the right or left position or contact can be specified in the description. Note that the toggle switches have no intermediate position. Manually-operated push-button switches are all shown in the released position with the direction of push motion indicated by the push-button characters. Note that the push-button switches also have no intermediate position (being of the snap-action type). Limit and override swtiches are also of the snap-action type and the traveling elements to which they pertain are clearly identified. (The so-labeled dot and dash line drawn on the wiring diagram does not indicate any mechanical connections between these switches.) They are shown in the normal position, i.e., as they exist when the moving member concerned is not on either limit. The limit and override switches also have no intermediate position.

Switch S49 (Figure 27(*b*)) is a centrifugally-closed switch mounted on the shaft 230 of motor P206 already mentioned. The purpose of this switch is to control circuits in synchronism with the operation of motor P206 which effects movement of the carriage assembly. The physical location of the switch S49 is shown in Figure 23. The shaft 230 also has a magnetically-actuated brake (not shown on Figure 23) which is applied by energization of solenoid P209 shown in the wiring diagram Figure 27(*c*). Thus energization of solenoid P209 stops rotation of the shaft 230 and of motor P206, therefore arresting motion of the carriage assembly and of cam 178.

The function and operation of the magazine advance ratchet switch S33 has already been explained in describing Figure 24. Also the function and operation of the switch S83 has already been explained by reference to Figure 4.

Certain of the switches indicated have a number of banks operated by a common shaft. Switch S55 is a manually-positioned rotary switch located on the control panel 61 (Figure 26). This switch comprises seven decks of ten contacts each, the contactor arms for all decks being mechanically mounted on a common shaft whose angular position is set by the operator and indicated on the control panel Figure 26. In the wiring diagram, the switch decks S55 are designated by this symbol followed by a deck number. Due to lack of space each contact point is not numbered but all are shown in corresponding sequence, and contacts may be identified by counting from the left. In referring to the contacts in each deck, the deck designation will in each case be followed by the contact number. Thus in Figure 27(*a*) the wiper of switch S55–1 is set on contact S55–1–1. For convenience, Figure 27(*g*) shows an enlarged view of the switch S55 with the panel indication which corresponds to each position of the contactor arms for all S55 decks as they are shown in the wiring diagram.

All relays are shown in the wiring diagram in the de-energized condition. Relay coils are shown in solid line connected by a dash line to the contactors which the relay armature actuates. In order to simplify the wiring diagram, those relay contacts which are not conveniently placed near the relay coil are shown connected by a dash line to a dotted relay coil bearing a corresponding reference symbol. It is to be understood that the contacts so indicated are assembled as a single relay unit.

In the interest of reducing the number of reference symbols on the wiring diagram, each relay coil is marked with its reference symbol and each contactor of that relay is given a simple number designation. Therefore, in referring to any particular relay contact, the symbolism will be to specify first the relay coil reference symbol followed by the number of the relay contact to which reference is being made.

Three types of relays are indicated in the wiring diagram, namely, slow-release relays (indicated with a cross-marked square at the lower end of the relay coil), slow-operates relays (indicated by cross-marked squares at the upper end of the relay coil), and normal or ordinary relays whose operate and release times are respectively much shorter than for either of the other types.

Relay X7C (Figure 27(*c*)) is a latching type relay which goes into the latching position when coil X7C is energized, and its latch is released when coil X8C is energized. Relay X12E (Figure 27(*c*)) is also a latching type relay which goes into the latching position when coil X12E is energized and its latch is released when coil X13E is energized.

Attention is called to the fact that certain relays have in addition to the common Form A, Form B, and Form C contacts, which are clearly indicated on the wiring diagram, one or more Form D (make-before-break) contacts also indicated on the diagrams and having the following reference character designations: X1E–1, X5E–1, X9E–1, X10E–1, X10E–2, and X9H–1.

Component X12A represents the actuator coil of a step switch identified by this reference symbol. This component has relay contacts labeled 1 and 2 which are Form B break contacts. The coil X12A also actuates switches labeled 3, 4, 5, 6 and 7 which are semicircular banks of contacts each traversed by a rotating wiper arm which completes separate circuits as indicated on the diagrams at each of twenty-five steps. The wiper arms are mounted on a common shaft which is rotated by a ratchet whose pawl is actuated by release of relay coil X12A, this being known as a back-acting type step switch. In referring to the contacts in each bank, the uppermost contact shown on the diagrams will in each case be referred to as #1. (Thus for example in Figure 27(*a*), the arm of X12A–3 is shown on contact X12A–3–2). Not all of the contacts are shown since numbers 3 to 11 are similar and these are simply represented by the third contact on the X12A banks; numbers 14 to 22 are similar and these are simply represented by the sixth contact on the X12A banks.

It will be apparent that in reproducing the seismic data from right to left, the magnetic playback head will eventually, near the left end of its travel, reach recorded events which have been reflected from very shallow horizons. It is evidently mechanically impractical to carry the play-back to zero time. In order to set an upper (leftward) limit of travel for the carriage assembly, an insulated contactor S47 (shown in the wiring diagram Figure 27(*c*) but not shown on the mechanical figures) is mounted alongside each of the rollers 106 between which the main plate cord 110 passes. The cord 110, being metallic, is electrically conducting and connected to ground (chassis of the apparatus), this being represented in the diagram Figure 27(*c*) as the grounded switch arm S47. The contactors are so arranged that when the cord 110 reaches an angular deflection of approximately 45° it touches one of the contactors thus applying a ground to the contactor. As indicated on the diagram (Figure 27(*c*)) the contactor S47 is in parallel with the carriage-assembly left-limit switch S43, and therefore serves an analogous function. In this manner leftward travel of the carriage is arrested in time to avoid unduly large stresses being developed in the cord 110, and it also keeps the main plate assembly from receiving an unduly large impetus toward the left.

It is believed unnecessary to trace out all of the control circuits shown on the wiring diagrams since this may be done by those skilled in the art. However, the following description of some of the more important circuits will be helpful in understanding their operation.

A power supply is shown at the left-hand side of Figure 27(*a*). When main power switch S20 is closed, the power supply circuits are actuated, but power is not available to all apparatus circuit components until subsequently as will be explained later. The multi-winding secondary of transformer P200 supplies approximately 25 volts to leads T and U which are continuous to the points marked T and U on Figure 27(*e*), so that rotors of selsyn units P207 and P216 are immediately energized for subsequent use.

The 30-volt winding of transformer P200 energizes the conventional full-wave rectifier P202. The direct current power supplied to the main control circuits by rectifier P202 has the positive side (+) grounded. As it will be seen, the negative (—) side of the rectifier is later connected to filter condensers C4 and C5, and to a negative bus to which reference in Figures 27 is made by the negative symbol (—). This symbol appears throughout the diagrams in association with nearly all relay coils, actuator coils, lamps and other circuit elements. However, at this point, the lead Z in Figure 27(*a*) is negative (—) and is continuous to the points Z in Figure 27(*c*), namely the coils of relays X1F and X2F, each of which having a ground connection is therefore energized. This negative lead Z it should be noted is also connected to the coils of relays X1K, X2K, and X11B whose function will be discussed later.

The 10-volt winding of transformer P200 (Figure 27(*a*)), energizes the conventional full-wave rectifier P204 for which the D.-C. output appears on leads X and Y at a subsequent time. When switch S21 is closed, full line voltage is also applied to the transformer P201, whose secondary activates conventional rectifier P203, which in turn acts as a trickle charger for 2-volt storage battery P224. The output leads V and W from battery P224 are continuous to the points V and W on Figure 27(*b*), and transmit 2-volt power to the variable-density lamp P12, the lighting of which will be discussed later. Resistors R3 and R4 and switch S84–1 (Figure 27(*a*)) are employed to control the rate of charge of battery P224 in an obvious manner.

Prior to placing the apparatus in operation, push button S54 must be momentarily depressed, whereupon a ground circuit through released switches S87–1 and S2 is completed to relay X1K, which operates. By closed make contact X1K–2, relay X2K also operates. Thus operated, it will be seen that a relay X1K remains operated by a locking ground path through adjustable resistor R26, closed make contact X1K–1, and by lead 336 to closed switches S46 and S45 on Figure 27(*c*). It is evident that when the push button switch S54 is released, relay X1K remains operated provided continuity is maintained in the locking ground path just described. As will become evident later, if override switches S45 and S46 open, a mechanical hazard exists in that the carriage assembly has exceeded the motion limits determined by limit switches S43 and S44, either through switch failure or circuit failure. In such a case, relay X1K then releases and, as it will be seen, D.-C. power is removed from the control circuits. Likewise, the function of resistor R26 is to reduce the normal D.-C. voltage on the coil of relay X1K to just above a marginal value which holds the relay operated. Thus in case of momentary line-voltage failure, or of a momentary decrease in line voltage, relay X1K releases. D.-C. power is then removed and, by the arrangement described, D.-C. power will not be re-established to continue operation when line voltage is restored. This provision obviates malfunction of the apparatus should the cases mentioned occur, by which certain relays in the circuit to be described would lose locking grounds or otherwise perform out of correct sequence.

When, as mentioned, relay X2K operates, make contacts X2K–1, X2K–2, X2K–3, and X2K–4 close and provide voltage to the respective circuits, it being noted that relay X2K remains operated so long as marginal lock relay X1K remains operated, as described.

Figures 27A, 27G:
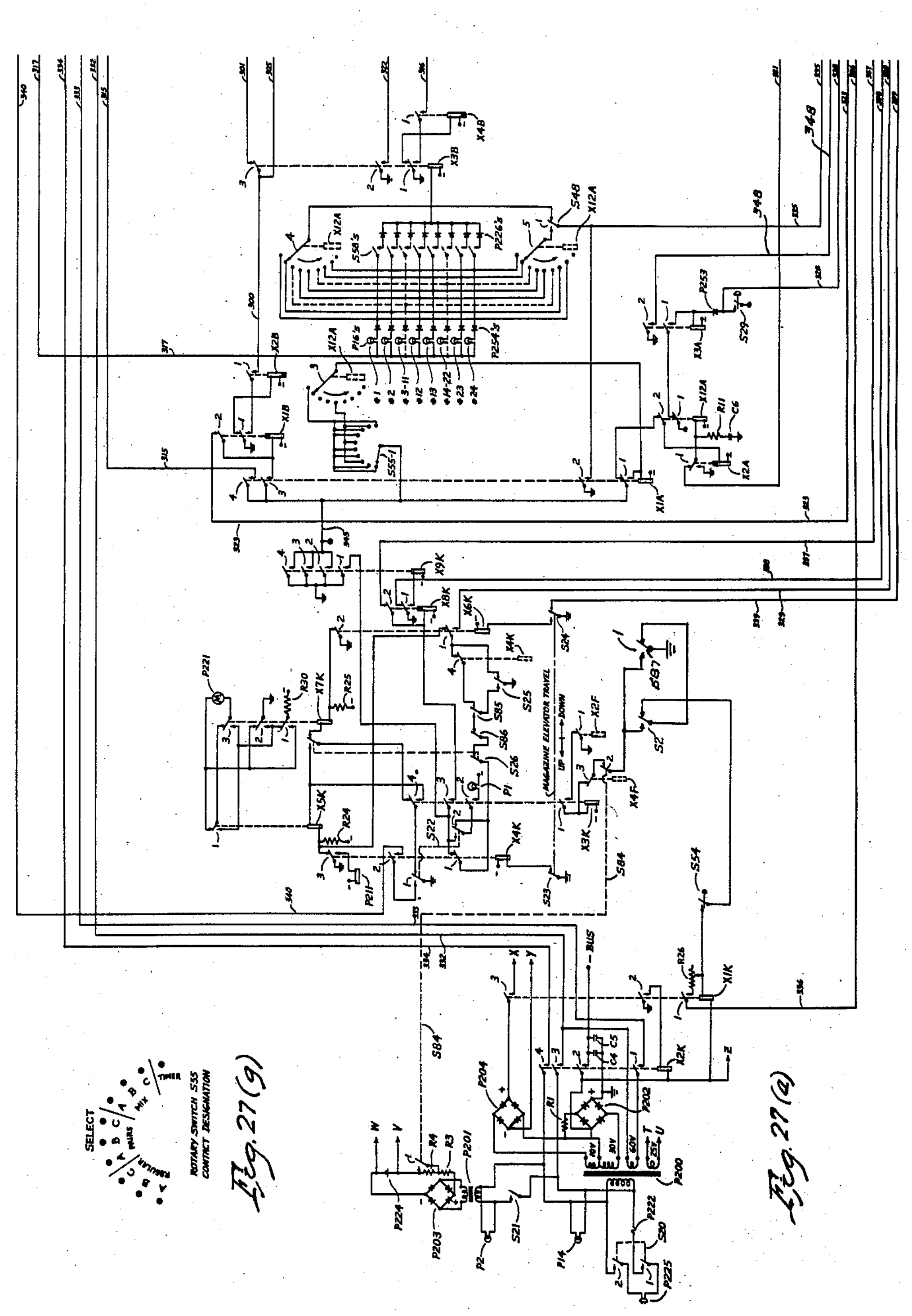
Figure 27B:
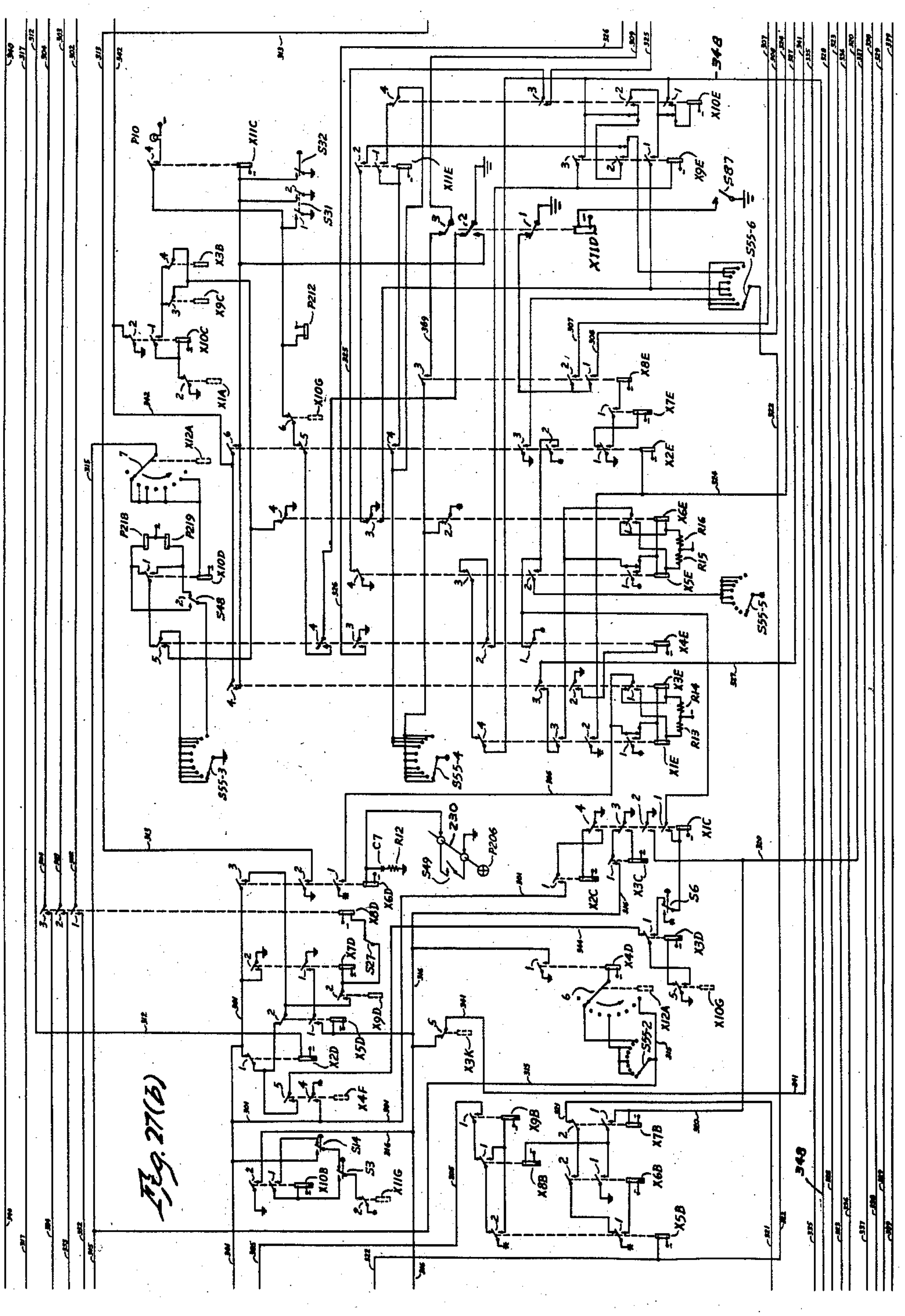
Figure 27C:
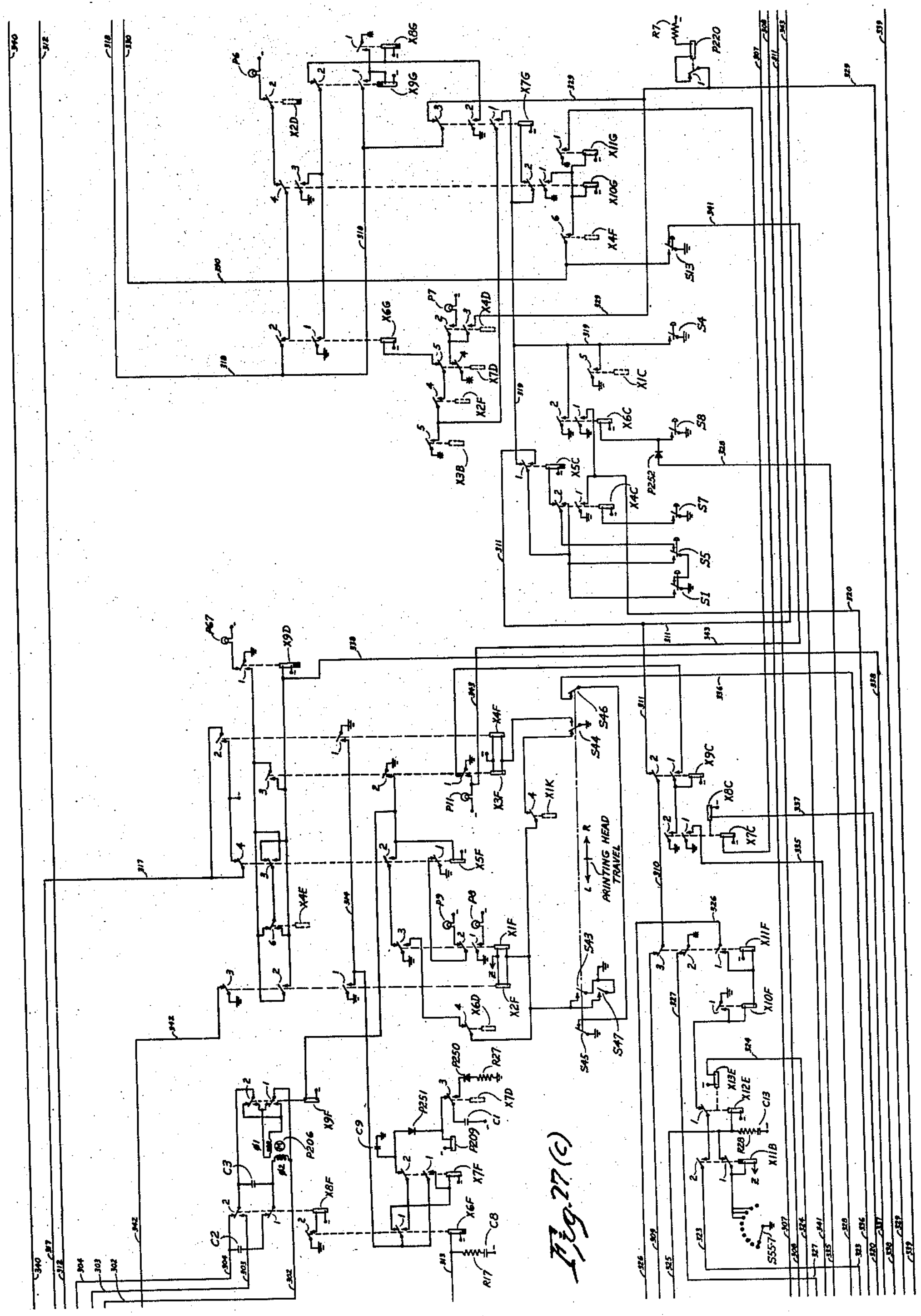
Figure 27D:
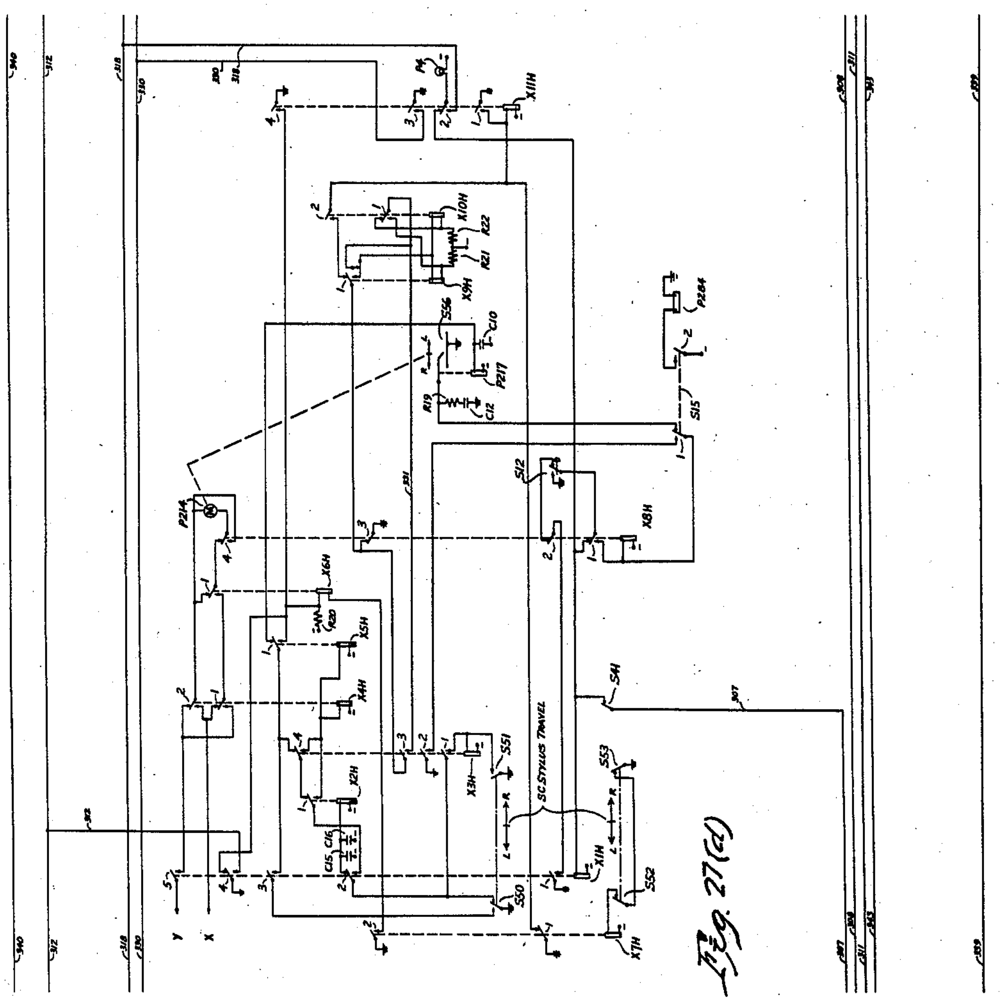
Figure 27E:
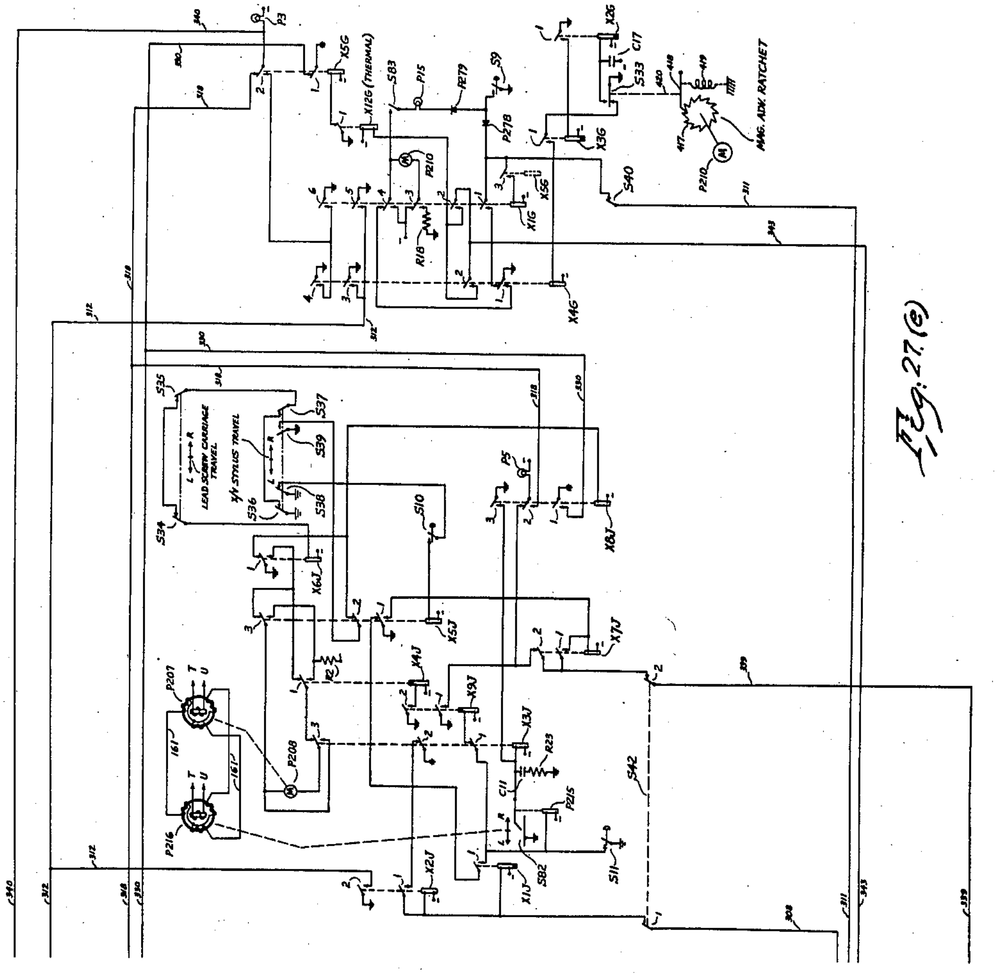

Operation of the apparatus is ordinarily initiated by throwing switch S2 on Figure 27(*a*) to the left, or run position, with switch S87–1, whose function will be described later, remaining in the right position, as shown. Actual operation is dependent on certain conditions being fulfilled, these being in the nature of safety provisions. In Figure 27(a), the trickle charger toggle S84–2 must be in normal charge-rate position, as shown, and break contact X4F–3 closed (i.e., the carriage assembly is not on its right limit switch S44, as will be described later). Switch S2, when operated, then places ground on relay X3K, which operates, and make contacts X3K–1, X3K–2, X3K–3, and X3K–4 are closed. Relay X3K is subsequently locked to ground by its own closed make contact X3K–1 and closed break contact X2F–1, the significance of which will become apparent later.

Closing of make contact X3K–4 results in operation of relay X5K whereupon the magazine elevator motor P221 is operated in the proper direction to raise the track 58 described above in connection with Figure 3. The motor stops rotation when up-limit switch S23 (Figure 27(*a*)) is thereafter operated. In anticipation of later discussion, when switch S2 is returned to normal condition and relay X3K is released, the reverse operation of motor P221 occurs, while relay X7K is operated, whereby track 58 is lowered until down-limit switch S24 is returned to normal.

When the magazine elevator reaches its up position, a necessary requirement for operation of the device, break contact X4K–1 is closed. The switches S25, S85, S86, and S26 are controlled by the position of mechanical components of the apparatus. By their introduction into the circuit as shown, these switches permit operation to occur only when these components are in suitable positions for proper operation. Assuming that a series circuit from ground through switches S25, S85, S86, S26, and closed break contact X4K–1 is continuous at this moment, then the closing of make contact X3K–3 operates relay X8K. The closing of make contact X8K–1 operates relay X9K and in turn make contacts X9K–1, X9K–2, X9K–3, and X9K–4 close. The closed contact X9K–1 provides a ground path through closed make contact X3K–3 to the coil of relay X8K, which thus remains locked on the operated relay X9K, and both must therefore remain operated until some subsequent time when relay X3K releases.

Closed make contacts X9K–2, X9K–3, and X9K–4, which are connected in parallel, ground the lead 345, when relay X9K is operated, and provide ground paths for various control circuits to be described. In particular it should be noted that the asterisk symbol (*) shown to the right of these contacts is connected to ground when relay X9K is operated, and that all such * symbols throughout the diagram are likewise simultaneously connected to ground. The asterisk symbol (*) is used to reduce materially the number of leads otherwise required to be drawn on the diagrams to lead 345.

Upon the operation of relay X9K, a series of events occurs which result, among other things, in the starting of apparatus operation and operation of the synchronous motor P206 which effects motion of the carriage assembly.

Assuming the step-switch wiper arm X12A–3 is in a position such as shown on Figure 27(*a*) (which is not on "home" position at the time relay X9K operates), a ground path from lead 345 through closed break contact X1A–1 and closed break contact X12A–2 energizes the coil of slow-operate relay X2A. By well-known principles, stepping of switch X12A occurs repeatedly until wiper arm X12A–3 in particular reaches a contact position grounded through rotary switch S55–1, at which time the coil of relay X1A is energized. (The function of the various arm positions of the various decks of rotary switch S55 and the various banks of step switch X12A will be discussed later.) When relay X1A thus operates, the stepping of switch X12A ceases by the opening of break contact X1A–1. Should wiper arm X12A–3 be on a "home" position when relay X9K operates as above, the stepping function does not occur, and relay X1A operates directly by the ground path from lead 345 through rotary switch S55–1 and the closed wiper path of switch X12A–3.

When relay X1A operates as above, a locking ground path is established from its coil through its own make contact X1A–1 to lead 345, so that relay X1A remains operated until the eventual release of relay X9K and removal of ground from lead 345.

Attention is now called to the sequence of functions of relays X1B and X2B following the operation of relay X1A. Relay X2B is normally operated through the break contact X1B–1. When, however, relay X1A operates, ground is completed through make contact X1A–3 to the coil of relay X1B, and since relay X1B is a slow-operate type, there is a short time interval before relay X1B operates. The significance of this time interval will be pointed out below.

When relay X1B operates following the short delay period, the relay arm X1B–1 removes ground from the coil of relay X2B and transfers it to closed make contact X2B–1. Since relay X2B is a slow-release type, there is a short time interval before relay X2B releases, and during this interval there is a ground on lead 300 through the series connection of make contact X1B–1 and make contact X2B–1. When relay X2B subsequently releases, the ground on lead 300 is terminated by the opening of make contact X2B–1. Thus relays X1B and X2B are interconnected in such manner as to produce a momentary ground pulse on lead 300 which occurs when relay X1B operates and continues essentially for the duration of the delayed release of relay X2B. It should be noted that subsequent release of relay X1B will not re-establish a ground on lead 300 since make contact X1B–1 will open before make contact X2B–1 closes.

The above principle of ground pulse generation as described with respect to relays X1B and X2B is utilized in principle in many parts of the circuits to be discussed and thus will not be described in detail on those occasions.

The momentary ground pulse on lead 300 operates relay X8D through contacts X3B–3, X2D–1, X5D–2, X9D–2, and switch S27, it being assumed for the present that these are all closed. The closing of contacts X8D–1, X8D–2, and X8D–3 transmits A.-C. power through leads 302, 303, and 304 respectively to contacts of relays X8F and X9F which control A.-C. voltages on synchronous motor P206, which drives the carriage assembly through gearing 181 (Figure 23(*a*)) and the drums 228 and 229 on which the tapes 103 and 104 (Figure 7) are wound. Reference to relays X8F and X9F and motor P206 will be made later. At present it suffices to note that motor P206 is powered when relay X8D operates. It should be noted that ground on lead 300 is transmitted to lead 301 through closed contact X3B–3, and it is the grounding of lead 301 which initiates starting of motor P206. It is evident from the diagram that there are other grounding pulses and connections to lead 301, which produce essentially the same starting functions. It will be convenient to refer later to grounds on lead 301 as "start" pulses or "start" ground connections. If toggle switch S27 (assumed closed above) is open, relay X8D will not operate, this being a provision for testing purposes; but in the following discussion it is assumed that switch S27 remains closed.

When switch S27 is closed, relays X7D and X8D are in parallel, so that the ground pulse on lead 301 operates relay X7D simultaneously. Thus, when relay X7D operates, make contact X7D–2 closes and locks relay X7D through the series path formed by closed contacts X9D–2, X5D–2, X2D–1, and X7D–2 to ground; and relay X8D is obviously locked by the same path. For subsequent discussion, it should be noted that make contact X6D–3 is in parallel connection with the portion of the locking circuit enumerated above comprising contacts X2D–1 and X5D–2. Thus if, as will later be discussed, either of the contacts X2D–1 or X5D–2 are subsequently opened, the locking circuit for relays X7D and X8D will be maintained, and motor P206 will continue to be powered as long as make contact X6D–3 is closed.

Further, it should be mentioned for later reference that relay X6D is operated when switch S49 is closed, and the switch S49 is mounted on the shaft of motor P206 in such manner that it closes by centrifugal action due to rotation of the motor shaft 230 (Figure 23(*a*)). Thus immediately after the shaft 230 of motor P206 starts rotating, relay X6D is operated and contact X6D–3 is closed. The function of the other contacts X6D–1 and X6D–2 will be discussed later.

At this point some of the functions of manually preset switches S58 (Figures 26 and 27(*a*)) and relays X3B and X5B will be discussed as they bear upon the control of motor P206. The switches S58 provide a means for interrupting automatic operation of the machine at any desired point in the play-back sequence and subsequent continuation of operation. For purposes of explanation let it be assumed that switch #1 of the group of switches S58 has previously been closed by the operator. When the wiper arm of step-switch bank X12A–3 steps to a "home" position, say to contact X12A–3–1, relay X1A operates as described above. Then a ground path from contact X1A–2 through switch S48–1, contact X12–4–1, and closed switch S58–1 is completed to the coil of relay X3B, whereupon relay X3B operates, and in particular break contact X3B–3 opens. The momentary ground pulse on lead 300, generated by relays X1B and X2B, as described above, will in this case be gated by open contact X3B–3, the pulse will not be transmitted to lead 301, and thus relays X7D and X8D will not operate, and motor P206 will not start rotation. Operation of relay X1A initiates operation of both relays X1B and X3B simultaneously. However, the beginning of start pulse on lead 300 is delayed by the slow operate time of relay X1B, as described above, and thus time is allowed for normal-acting relay X3B to operate, if it is required to operate, as in the above discussion, and gate the pulse on lead 300.

The otherwise normal starting of motor P206 has thus been held in abeyance because switch S58–1 of the group of switches S58 had been manually preset in closed position. A practical reason for this delay may be that special functions are scheduled to be performed at the particular track whose S58 switch is closed and prior to the continuance of normal operations. At the interruption the operator may wish to press any one of the push button switches S1, S4, S6, S7, S8, or S29. However, the reasons for doing this will be deferred until later, and the explanation will continue by assuming such functions have been performed, after which the operator opens switch S58–1.

When switch S58–1 is open, ground path to relay X3B is broken, and relay X3B releases. It should be noted, however, that while make contact X3B–2 was closed, ground on lead 322 had operated relay X5B, and make contact X5B–2 had energized relay X9B. Moreover, make contact X5B–1 had operated relay X6B, and make contact X6B–1 had in turn operated relay X8B. Relays X6B, X8B, and X9B are all delay-release relays. Thus, when relay X3B and X5B release, contact arms X5B–1 and X5B–2 transfer to their break contacts. A momentary ground path then exists from the closed break contact X5B–1, make contact X6B–2, break contact X7B–2, and on lead 321 to break contact X2A–1 to the coil of step switch X12A, which operates. The ground pulse is terminated by the opening of make contact X6B–2 and the wipers of all banks of step switch X12A advance one step. (It is assumed here that relay X7B remains released.) If switch position S58–2, the one to which wiper X12A–4 now steps, is open, relay X3B remains released, and, in particular, break contact X3B–3 remains closed.

Simultaneously with the opening of contact X6B–2, contact X6B–1 opens, whereupon, after a pause, relay X8B releases. At this point a ground path exists on lead 305 through break contact X5B–2, break contact X8B–1 and make contact X9B–1, and this ground path on lead 305 is terminated when relay X9B releases. The resulting ground pulse on lead 305 will pass through closed break contact X3B–3 to lead 301, and operate relays X7D and X8D, as previously explained, whereupon motor P206 receives A.-C. power and starts to rotate.

If however, in the above discussion, when wiper X12A–4 of step switch X12A steps to the adjacent position X12A–4–2 and finds manually present switch S58–2 is closed relay X3B will re-operate. The open contact X3B–3 acts as a gate between lead 305 and lead 301, and the momentary ground on lead 305 does not start operation of motor P206. The operator then proceeds with any special operations required for switch position S58–2, as indicated above for switch position S58–1, and subsequently opens switch S58–2. Thereupon the wiper of step-switch bank X12A–4 steps to the next contact X12A–4–3, and subsequent apparatus operation, as before, then depends on the open or closed condition of switch S58–3, and so on.

A circuit comprising relays X1E, X2E, X3E, X4E, X5E, and X6E, which for convenience is termed the "sequence circuit," will now be described. The sequence circuit is controlled by make contact X6D–1 which is closed when centrifugal switch S49 is closed. As pointed out above, switch S49 is closed by centrifugal action due to rotation of the shaft 230 of motor P206. Thus, when motor P206 starts to rotate, a ground on lead 306 is presented to contact X1E–1 and X3E–1. Later in the cycle of operations, as will be explained, when the motor subsequently stops rotation, the ground is removed from lead 306, and so on, a series of grounded and un-grounded intervals occurring on lead 306 as motor P206 starts and stops (as will be described). It should be noted that these ground intervals are independent of the direction of rotation of the shaft of motor P206, i.e., independent of the direction of travel of the carriage assembly. The circuit connections between relays X1E and X3E comprise a well-known form of pulse-frequency dividing circuit, and may be found in such a text as "The Design of Switching Circuits" by Keister, Ritchie and Washburn on p. 171 and p. 243. Also it should be noted that relays X5E and X6E are similarly connected, and the ground to these relays arises from the series circuit comprising make contacts X1E–3 and X3E–3, and on lead 327 contact X11F–2 (which for the present discussion is assumed to remain closed). Thus relays X5E and X6E further divide the input pulses applied to relays X1E and X3E on lead 306. Relay X2E and coil X13E (Figure 27(*c*)) essentially duplicate the operation of relay X1E, and X4E that of X3E, by their interconnections, and are provided to furnish additional contacts as required. It is apparent from the diagram Figures 27 that the sequence-circuit relays are employed extensively in the control circuit of the apparatus and that their contacts are used individually and in a variety of parallel and series combinations.

Some typical circuit operations which occur as the carriage assembly moves through one operating cycle will now be described. By the operation of relays X7D and X8D, as discussed above, power is applied to motor P206. As a result, the carriage assembly is driven to the right and the centrifugal switch S49 closes. Ground on lead 306 operates relay X1E and therefore relay X2E operates. Contact X2E–1 transfers from break to make, thereby releasing ground from slow-release relay X7E and operates relay X8E through the still-closed make contact X7E–1. Operation of relay X8E is momentary, being released when relay X7E releases. Thus a momentary ground pulse exists on lead 307 from the closing of make contact X8E–2, on lead 308 from the closing of make contact X8E–1, and in some cases on lead 369 from the closing of make contact X8E–3.

The momentary ground pulse on lead 307 operates relay X1H through normally-closed switch S41 and initiates automatic operation of the SC stylus-control circuit comprising relays X1H, X2H, X3H, X4H, X5H, X6H, X7H, X8H, X9H, X10H, and X11H, motor P214, actuator P217 and the SC stylus switch proper, S56 (Figure 27(*d*)). Likewise, simultaneously, the ground pulse on lead 308 operates relays X1J and X2J through normally closed switch S42 and initiates automatic operation of the *x/V* stylus control circuit comprising relays X1J, X2J, X3J, X4J, X5J, X6J, X7J, X8J, and X9J, motor P208, selsyns P207 and P216, actuator P215, and *x/V* stylus switch proper, S82 (Figure 27(*e*)). Also, simultaneously, the ground pulse on lead 369, which exists only if there is a path to ground through rotary switch S55–4 or contact X6E–2, the functions of which will be discussed later, is transmitted by closed break contact X11D–3 to lead 309, by closed break contact X11F–3 to lead 310, and by closed break contact X9C–2 to lead 311 through normally-closed switch S40 and normally-closed contact X5G–3 and operates relay X1G. Operated relay X1G initiates automatic operation of the film magazine control circuit comprising relays X1G, X2G, X3G, X4G, X5G, thermal switch X12G, motor P210, and snap-action switch S33 (Figure 27(*e*)).

For the present purpose, it is sufficient to note regarding these three circuits that so long as they are running through their normal, automatic cycle of operations and until each circuit has completed its operation cycle, certain contacts are grounded. These contacts, while they are grounded, each constitutes what will be termed a "busy signal," which appears on lead 312. Thus, for the SC stylus circuit, make contact X1H–4 grounds lead 312; for the *x/V* stylus circuit, make contact X2J–2 grounds lead 312; for the magazine circuit, the parallel combination of make contacts X1G–5 and X4G–3 grounds lead 312. Any of these busy signal grounded contacts on lead 312 operate relay X2D, which is in the circuit controlling relays X7D and X8D described above in connection with application of power to synchronous motor P206. Significance of the busy signal function of relay X2D will become clear presently.

While the carriage assembly is moving to the right, the three above-mentioned circuits perform their individual functions. Then, when the carriage reaches the end of its normal rightward travel, right limit switch S44 is operated by a projecting tab on the carriage. Operation of the snap-action limit switch S44 operates the parallel combination of relays X3F and X4F. Meanwhile, it should be noted, relay X6F has been operated by ground through closed make contact X6D–2 on lead 313 owing to the closing of centrifugal switch S49 during rightward travel of the carriage. Thus, when make contact X4F–1 now closes at the right end of the travel, a ground path exists on lead 314 through closed make contact X6F–1, closed break contact X7F–2 and circuit element P251 to the actuator coil P209. The circuit element P251 has no effect on the operation as described. Since relay X7D is operated at this time, the parallel path from actuator P209 through break contact X7D–3 to capacitor C1 is open. Actuator P209, when energized, operates a brake which quickly clamps the shaft 230 of motor P206 and rightward motion of the carriage ceases. Simultaneously, make contact X3F–2 closes and operates relay X9F which by means of conventional reversing connections of contacts X9F–1 and X9F–2 reverses the phase of A.-C. voltage on phase $\phi$1 of synchronous motor P206. Also, contact X3F–2 operates relay X5F which by its own make contact of X5F–2 becomes locked on the closed break contact of X1F–3. Thus, after relay X3F subsequently releases, as will be explained, relay X9F remains operated since it is in parallel with the locked relay X5F, and the reversed phase $\phi$1 condition on motor P206 will continue until relay X1F ultimately is operated and the locking path for relay X5F is broken by the opening of break contact X1F–3.

When actuator P209 applies the brake to the shaft of motor P206, as described above, centrifugal switch S49 consequently opens, and open make contact X6D–2 removes ground from lead 313 and the coil of relay X6F. Thus contact X6F–1 transfers from its make to its break contact. The opening of make contact X6F–1 removes ground from brake actuator P209, thus permitting motor P206 to rotate, but, it will be observed, rotation is now in the reverse direction owing to reversal of phase $\phi$1. The function of operated relay X7F, which is now locked by its own make contact X7F–1 through the ground on lead 314, is to prevent, by the open break contact X7F–2, reapplication of brake actuator P209 until after make contact X4F–1 finally opens and removes ground from lead 314.

In the foregoing paragraphs it was explained that the brake on the shaft 230 of motor P206 was applied when the carriage assembly reached the right limit switch S44, and was released following opening of centrifugal switch S49. However, other circuit functions which occur while the carriage dwells on switch S44 must be discussed before leftward travel of the carriage is considered.

The opening of the centrifugal switch S49, for instance, altered the pattern of previously operated relays in the sequence circuit because of the opening of make contact X6D–1. Also simultaneously, make contact X6D–3 in the locking circuit for control of motor P206 opened. It must be recalled that the locking path for relays X7D and X8D includes the path of closed make contact X6D–3 in parallel with closed break contacts X2D–1 and X5D–2. Thus the locking path will be interrupted if, when make contact X6D–3 is open, break contact X2D–1 is also open. This will be the case during the dwell of the carriage assembly on the right limit switch S44 if any of the three auxiliary circuits, SC stylus control, *x/V* stylus control, or magazine control, enumerated above, are still busy, and are therefore applying a ground on lead 312. Consequently if a ground is on lead 312 when relay X6D operates as in this case, relays X7D and X8D release, and A.-C. voltage to motor P206 on leads 302, 303, and 304 is interrupted by the opening of contacts X8D–1, X8D–2, and X8D–3. Thus the carriage is held on the right limit switch S44 if a busy signal from any of the auxiliary circuits is registered by continued ground on lead 312 and relay X2D is operated. When the busy signal is removed, relay X2D releases, and by means of the "start" ground on lead 301 provided by closed make contact X4F–4 and the now-closed break contact X2D–1, relays X7D and X8D operate. The locking circuit for relays X7D and X8D is now restored to the normal operating condition as previously discussed, motor P206 resumes operation and effects leftward travel of the carriage. Relays X3F and X4F release as the carriage leaves the right limit switch S44, and make contact X4F–4 opens and removes ground from lead 301, terminating the "start" pulse.

Also, during the dwell period of the carriage assembly on the right limit switch S44, a shift in voltage on motor P206 occurs. When relay X6F releases following the application of the brake to the shaft of motor P206, relay X8F releases upon opening of make contact X6F-2. The function of relay X8F, when released and break contacts X8F-1 and X8F-2 are closed, is to permit application of full line voltage to the windings of motor P206 so as to provide rapid shaft acceleration. But when centrifugal switch S49 subsequently closes upon leftward motion of the carriage, relay X8F operates, break contacts X8F-1 and X8F-2 are opened, and by closing of make contact X8F-2, voltage to the windings of motor P206 is reduced to approximately half full line voltage (e.g., about 60 volts), which provides ample running torque while preventing overheating of the windings.

Events occurring during leftward motion of the carriage assembly will now be considered. The carriage leaves the right limit switch S44, whose contact returns to its normal position (i.e., to the left) and releases relays X3F and X4F; the lock is removed from relay X7F, which releases; and at about the same time (whether before or after is immaterial) centrifugal switch S49 closes, operating relay X6D. As pointed out above, relay X6F operates by ground on lead 313 upon closing of make contact X6D-2, whereupon relay X8F operates and reduces voltage on motor P206, as explained above. By closing of make contact X6D-1, ground is applied by lead 306 to the sequence circuit in which the pattern of operated and released relays is again altered, and closed make contact X6D-3 enters into the locking circuit for relays X7D and X8D, as described above.

Also, the play-back of the magnetic record track of record 15 and the photographic reproduction of the seismic signal on to the profile film 21 occur, as mentioned above, during the leftward motion of the carriage assembly. However, these functions and the associated circuits will be explained after discussion of other events accompanying the normal traverse cycle of the carriage assembly has been completed.

During traverse of the carriage assembly from right to left, the position of the contactors on rotary switch S55 will be specified as being on the first position as shown on Figures 27, which, of course, is the same for each of the S55 decks. In particular, make contact X2E-3 of the sequence circuit, which having meanwhile been closed and holding relay X5B operated through the first contact position of rotary switch S55-6 and lead 322, opens and releases relay X5B. The release of relay X5B, as in a case previously cited, produces a ground pulse through closed break contact X7B-2, lead 321, and closed break contact X2A-1 to the coil of step switch X12A, whereupon, as the pulse terminates, the step switch wipers advance one position. The result of the stepping action at this point will be of significance in later discussion.

The carriage assembly, upon reaching the end of its leftward travel, operates left limit switch S43 in the same manner as it operated the right limit switch S44, previously explained. In fact a similar series of events occur upon resultant operation of relays X1F and X2F, as can be seen by noting that contact X2F-1 is in parallel with X4F-1, and hence a ground circuit on lead 314 again operates brake actuator P209 exactly as described above. Motor P206 thus is quickly clamped by the brake and leftward motion of the carriage ceases. Locked relays X5F and X9F release as break contact X1F-3 opens, thus restoring phase $\phi 1$ winding of motor P206 to the original phase.

As centrifugal switch S49 opens upon clamping of the shaft of motor P206, ground is removed from lead 306 to the sequence circuit by opening of make contact X6D-1. At this point sequence circuit relays X1E, X2E, X3E, and X4E are all released.

Also, at this point, either of the solenoids P218 or P219 may be energized and shift the position of the record-carrier plate 25 by operation of the escapement mechanism shown in Figure 24. Basic control of these solenoids will be described on the assumption that rotary switch S55 is in the first contact position as shown on the diagram. In the above description of the initiation of play-back operation, it was assumed that wipers of step switch X12A stepped to the first contact position on each bank of contacts. In particular, it will be seen that wiper of bank X12A-7 stepped to a position having no connection to the associated relay X10D. Relay X10D, then, remains released, and solenoid P218 has a ground connection through closed break contacts X10D-1 and X4E-5, and switch S55-3. Solenoid P218 is therefore energized at the start of the operating cycle. Later, when sequence-circuit relay X4E operates, the ground path is broken by opening of break contact X4E-5, but the position of the plunger in solenoid P218 remains unchanged.

Later in the operating cycle, specifically when centrifugal switch S49 closes as the carriage assembly starts moving to the left, wiper of step switch bank X12A-7 moves to the second position, as described above, to which a lead to the coil of relay X10D is connected. (It should be noted that leads to relay X10D are connected to every other contact position across the entire bank of contacts on X12A-7, of which only a few are shown on the diagram.) Relay X10D then operates, a ground of course existing through lead 315 at the closed make contact X1A-4 and lead 345. But at this point sequence-circuit relay X4E is already operated, and it is not until the centrifugal switch S49 opens upon the carriage reaching the left limit position that relay X4E releases. At this moment break contact X4E-5 closes, and the opposing solenoid P219 is energized through the circuit comprising closed make contact X10D-1 and rotary switch bank S55-3. Thus, as solenoid P219 operates, the record-carrier plate 25 moves to the second track position, the one which is next to be played back on the ensuing operating cycle, by operation of the escapement mechanism shown in Figures 24 and 24(*a*). It can thus be seen that for successive stepping positions of the wiper of step-switch bank X12A-7 that the ground circuit is directed to opposing solenoids in succession, resulting in a progression of record-carrier plate positions determined by the escapement mechanism.

It should be noted here, in anticipation of various apparatus functions to be described later, that step switch X12A is not always required to step as described above, so that in such cases when the carriage assembly reaches the left limit switch S43, one of the solenoids P218 or P219 may be reenergized without resulting advancement of the record-carrier plate 25. In general, the record-carrier plate advances following an operating cycle during which step switch X12A actually steps to a successive position.

The carriage assembly, having arrived at the left limit position, has initiated several functions enumerated above and is holding switch S43 operated. As in the case at the right limit position, the brake actuator P209 releases when relay X6F releases, the full A.-C. voltage, whose phase $\theta 1$ has been restored to normal as mentioned above, is applied to the windings of motor P206 by release of relay X8F, and, in general, the carriage resumes travel toward the right. Upon subsequent closing of the centrifugal switch, A.-C. voltage on the driving motor reduces to 60 volts, and the SC stylus circuit, $x/V$ stylus circuit, and magazine-advancement circuit all operate as previously described.

It will now be assumed in this discussion of basic operation that the sequence of events already related will continue uninterrupted until all tracks of a magnetic record have been played back. At the time the carriage assembly leaves the right limit switch S44 for the play-back of the last track, the wipers of all banks of step switch X12A step from the next to the last position to the last position shown on the diagram. On banks X12A–3, X12A–4, X12A–5, and X12A–7 there is no connection to this last position; but on bank X12A–6 there is a connection to lead 315, the other end of which is grounded through closed make contact X1A–4. Thus when the wiper steps to this position on bank X12A–6, relay X4D operates. Closing of make contact X4D–1 places ground on lead 316 and operates relay X5D. Break contact X5D–2 opens and breaks that part of the locking circuit for relays X7D and X8D which is in parallel with still-closed contact X6D–3. Thus when the carriage assembly reaches the left limit switch S43, the brake actuator P209 is energized, and, as explained above, centrifugal switch S49 opens and releases relay X6D so as to open make contact X6D–3, whereupon A.-C. power is removed from motor P206 by release of relay X8D. The carriage assembly then ceases play-back operation and remains stopped in the left limit position, the translation of tracks of the magnetic record 15 to the photograhic profile film 21 having been completed.

For convenience in later discussions a ground or ground pulse on lead 316 which operates relay X5D in a manner described above will be termed a "stop" ground or "stop" ground pulse. It will be seen in Figures 27 that there are thus numerous ground connections to lead 316, all of which control the "stop" function described above.

It is appropriate to point out here in anticipation of later discussions that if the arm of rotary-switch bank S55 is set on certain positions other than the one shown on the diagrams of Figures 27, relay X4D may be operated and play-back operation automatically halted at two other wiper positions shown on step switch bank X12A–6, which results in correspondingly fewer number of magnetic tracks being played back.

The basic operations of playing back a magnetic record to completion have been outlined above. At this point the operator returns toggle switch S2 to normal position, whereupon, the locking path through open break contact X2F–1 being broken, relay X3K releases, and the locking path through make contact X3K–3 being broken, relays X8K and X9K release. All points indicated by an asterisk symbol (*) are now removed from ground, and any relays which are operated by a ground path terminated at this symbol are now released. The entire circuit has thus returned to normal, standby condition.

The signal circuits for the play-back and photographic reproduction function, which were deferred during the foregoing explanation of basic play-back operation, will now be discussed.

The variable-density reproduction of the seismic signal derived from the magnetic record is effected as the carriage moves through a play-back cycle, specifically as it moves from right to left. This essential function of the device will now be described in detail, with special reference to Figure 27(*f*).

The schematic circuit relationship of the magnetic play-back head 501, signal-channel components, and the variable-density lamp housing 23 are shown in Figure 27(*f*), together with the control elements which are integrated with the main control schematic diagrams of Figures 27(*a*), 27(*b*), 27(*c*), 27(*d*), and 27(*c*).

In Figure 27(*f*), the magnetic play-back head 501 is shown in intimate contact with one of the tracks of the magnetic record 15 upon which a seismic signal has previously been recorded, as explained above, and the lamp housing 23 is shown in intimate contact with profile film 21 so as to photographically expose a track which, when the film is developed, varies in density corresponding to the magnetically-recorded seismic signal. The magnetic play-back head 501 is shown schematically in relationship with the magnetic record 15 on the left-hand side of the Figure 27(*f*), and the lamp housing 23 in relationship with the profile film 21 on the righthand side of the figure. However, the play-back head and the lamp housing are each attached to the carriage assembly which moves these units simultaneously along their respective recording media in the manner which has been discussed in length above.

As the magnetic play-back head 501 moves along a signal track of the magnetized record 15, the seismic signal is picked up in electrical form in conventional manner and fed to a conventional amplifier or demodulator 510. Details of the magentic play-back head 501 and unit 510 will depend upon the type of magnetic recording employed in making the magnetic seismogram, and any conventional system may be employed which will deliver a demodulated output signal.

The signal-voltage output of the unit 510 is applied to a variable resistor R31 which acts as a gain control for the power amplifier unit 511. The adjustment of the gain control R31 will be explained presently. The output signal of amplifier 511 is fed to the primary winding of output transformer P285. The signal voltage at the secondary winding is impressed on the circuit of variable-density lamp P12.

The variable-density recording lamp P12 which is located in the lamp housing 23 is preferably a small incandescent lamp. Variations in brightness of the lamp effect variations in exposure, which when the profile film 21 is developed results in the variable-density recording of the seismic signals. The means for utilizing an incandescent lamp for variable-density recording is fully disclosed in U.S. Patent No. 2,051,153 issued to Frank Rieber, and an analogous procedure is employed at this step in the present invention. The physical arrangement of essential components of the lamp housing 23 has been described previously, and these are shown schematically in Figure 27(*f*) for convenient reference.

The circuit for lighting the variable-density lamp P12 comprises the parallel combination of resistors R5 and R6, the secondary winding of transformer P285, contacts X11C–1, X11C–2, and X11C–3 which are in parallel to minimize contact resistance, and the points indicated by W—V, across which the 2-volt battery P224 (shown in Figure 27(*a*)) is connected. Thus, when relay X11C is operated and its contacts are closed, D.-C. current from battery P224 flows through the circuit as described and the lamp P12 is illuminated at a moderate and steady intensity. This steady D.-C. current is a "bias" current for lamp P12 and in the operation of the device produces a constant exposure on the profile film 21, which develops as a moderate gray or "no-signal" density. The resistor R5 is part of the bias-current circuit so that by adjustment of its resistance value the bias current through lamp P12 may be adjusted to produce a suitable no-signal density on the film 21. The photovoltaic cell P213 which registers the brightness of the lamp P12 on the micro-ammeter P205 is employed to aid in adjustment of the bias current to a desirable value. The reason for producing a no-signal density on the film will become apparent presently.

As mentioned above, the output winding of transformer P285 is part of the circuit for lighting lamp P12, and the signal-voltage variations derived from the magnetic film 15 is produced in this winding. These A.-C. signal-voltage variations are superposed upon the D.-C. bias current just discussed, whereby the current flowing through the lamp P12 and hence the resulting illumination of the lamp increases and decreases about the generally steady average D.-C. value. Consequently the developed film exhibits these A.-C. signal variations as darker and lighter density variations about the steady average no-signal density. In this manner the variable-density type of signal reproduction is readily achieved, and the seismic signals originally recorded on the magnetic record 15 are transduced into readily comprehended, visual form.

Before the start of an operating cycle, the variable-density lamp P12 is extinguished, relay X11C being released. When, however, as the carriage assembly starts to the right and centrifugal switch S49 closes, make contact X2E–6 (Figure 27(*b*)) closes and relay X11C operates, which in turn closes the P224 battery circuit of Figure 27(*f*) through parallel contacts X11C–1, X11C–2, and X11C–3, and the D.-C. bias current lights lamp P12. (For the present, ground is assumed on lead 342 of Figure 27(*b*).) The lamp P12 remains lighted while the carriage assembly is on the right limit switch since both sequence-circuit make contacts X2E–6 and X3E–4 are then closed and holding relay X11C operated. On carriage travel to the left, make contact X2E–6 opens but make contact X3E–4 remains closed. When the carriage arrives at the left limit position, centrifugal switch S49 opens and, through operation of the sequence circuit described previously, make contact X3E–4 opens. Relay X11C releases and the D.-C. bias circuit is opened. Thus the variable-density lamp P12 is extinguished essentially while the carriage assembly is at the left limit switch position, but it is lighted otherwise during travel left or right, either by the D.-C. bias current, or by the D.-C. bias current modulated by the A.-C. signal, the latter modulation depending upon circuit conditions to be described presently.

Although the lamp P12 is lighted at the start of the rightward traverse of the carriage assembly, shutter 41 is closed to prevent exposure of the film 21 during this traverse and during the dwell interval of the carriage at the right limit position. The shutter 41 (Figures 3 and 4), controlled by coil P212 and opened when the coil is energized, is closed during the operating cycle as described until the centrifugal switch S49 closes when the leftward traverse of the carriage assembly begins. Thereupon sequence-circuit break contact X2E–5 closes, and through the closed make contact X4E–4 and closed break contact X11D–2, provides ground for coil P212. (Break contact X10G–6 is normally closed; its function will be discussed later.) The shutter 41 then opens and remains open, so that the variable-density exposure on film 21, as will be explained, may occur during the leftward traverse. When the carriage assembly reaches the left end of its travel, the shutter actuator coil P212 is de-energized as the sequence-circuit make contact X4E–4 opens, and the shutter therefore closes. Thus normally both the shutter is closed and the lamp is extinguished as the centrifugal switch S49 opens at the end of the leftward traverse of the carriage assembly.

It will be noted in Figure 27(*f*) that a parallel combination of contacts of relays X2E and X4E of the sequence circuit is arranged in such manner as to short circuit the input to amplifier 511. The signal-shorting provision prevents A.-C. signals from being fed to amplifier 511 and to the variable-density lamp P12 except during the play-back cycle. Unwanted voltage surges or signals which may occur in other portions of the operating cycle are short-circuited and cannot modulate the lamp P12. The short circuit is maintained by either the closed break contact X4E–8 or the closed make contact X2E–8, and one or the other, or both, is closed except for the play-back portion of the cycle. Specifically, as the carriage assembly starts leftward motion and the centrifugal switch S49 closes, sequence-circuit make contact X2E–8 opens, and removes the short circuit, since at that point break contact X4E–8 is already open. As the carriage assembly reaches the left limit position relay X4E releases, break contact X4E–8 closes, and the signal is again short-circuited. For the duration of the dwell of the carriage assembly at the left limit position, during the traverse to the right, and during the dwell at the right limit position, the signal is short-circuited; but the signal is not short-circuited during the leftward traverse, when the lamp P12 is lighted, the shutter 41 is open, and the variable-density reproduction of the signal is being made on film 21.

It is also desired to operate the apparatus through play-back cycles for testing and adjustment of play-back signal level. It is necessary that the signal be at or near a predetermined level so as to insure good photographic reproduction. The play-back level is determined by observation of the A.-C. voltmeter P286 and is adjusted accordingly by the gain control R31 (Figure 27(*f*)). The desired testing operation includes operation of the carriage assembly through a series of right and left traverses, advancement of the record-carrier plate 25, play-back from the magnetic record 15, actuation of the units 510 and 511 on Figure 27(*f*) by the play-back signal, lighting of the lamp P12, visual monitor of the A.-C. signal on the lamp P12 by observation of the A.-C. voltmeter P286, and adjustment of the gain control R31. However, it is desired that meanwhile the profile film 21 in the magazine not advance, that the SC and $x/V$ stylus circuits not operate, and that the shutter 41 remain closed so as not to expose the film during test. These conditions are initiated by setting of the toggle switch S87 into the Test run position.

The portion S87–1 of toggle switch S87 on Figure 27(*a*) is wired with respect to the normal starting switch S2 so that identical functions are performed in initiating operation of the apparatus as explained previously. However, the portion S87–2 of toggle switch S87 on Figure 27(*b*) operates relay X11D which accomplishes the particular restricted operations enumerated above for testing. Thus, the film magazine cannot receive the ground pulse which normally occurs, as explained, on lead 369, for the break contact X11D–3 is now open, and prevents the ground pulse from being transmitted to lead 309. The SC and $x/V$ stylus circuits cannot receive the ground pulse which normally occurs as explained on leads 307 and 308, for the ground is open at break contact X11D–1. Likewise, the shutter 41 cannot open, for the energizing circuit is open at break contact X11D–2. The variable-density lamp P12 is lighted, however, for the make contact X11D–2 is closed and relay X11C is therefore operated. Other apparatus functions proceed in normal manner during the period of test operation, and testing is concluded when the control circuits are shut off as explained elsewhere and when switch S87 is returned to normal or off position.

During the testing operation, the short circuit of the signal at the input of amplifier 511 is removed during the play-back cycle in the manner described for normal play-back cycles. A series combination of contacts of relays X2E and X4E is employed to connect the A.C. voltmeter P286 across the terminals of the variable-density lamp P12. The voltmeter is connected to the lamp terminals only during the play-back portion of the cycle. Specifically, as the carriage assembly starts leftward and the centrifugal switch S49 closes, break contact X2E–7 closes, and connects the voltmeter P286 across the lamp terminals, since at that point make contact X4E–7 is already closed. As the carriage assembly reaches the left limit position, relay X4E releases and the voltmeter is disconnected. During the play-back traverses, the gain control R31 is adjusted by the operator so as to make the average reading on the voltmeter P286 a predetermined value for standardization of the signal level on the lamp P12, thus the average exposure range on the film 21, and hence the corresponding variable-density signal modulation on the finished profile.

On Figure 2, which illustrates a profile of variable-density tracks, it will be noted that various tracks are shortened at the upper end, one of which is labelled 346. These shortened tracks correspond to the first track played back on each magnetic record and so make possible the identification of the series of tracks corresponding to each record of those comprising the profile. The circuits controlling this function will now be described.

The variable-density lamp P12 is lighted only when relay X11C is operated, as discussed above in connection with Figure 27(*f*). The control of relay X11C during normal running of the apparatus was discussed above in connection with Figure 27(*b*) upon the assumption that lead 342 is grounded. Lead 342 is grounded through the closed break contacts X2F–3 and X10C–2 in parallel, at least one of which contacts is normally closed. However, for the case of the play-back of the first magnetic track on a new record, relay X10C is operated in advance by the ground through closed break contact X1A–2 prior to the operation of relay X1A as described above. Thereupon relay X10C is normally locked to ground through its own make contact X10C–1, parallel contacts on normally-released relays X9C and X3B, and contacts of released relay X6E, or operated relay X4E through rotary-switch deck S55–3.

Thus for the first play-back cycle of a record, when break contact X10C–2 is open, ground for lead 342 is furnished solely by closed break contact X2F–3, since the locking contacts for relay X10C as described are so arranged as to maintain relay X10C operated throughout the operating cycle up to the point that centrifugal switch S49 opens when the carriage assembly reaches the left limit position. Thus, when ground through make contact X2F–3 on lead 342 is broken upon the carriage assembly operating the left limit switch S43, relay X11C releases, extinguishing the variable-density lamp P12. For the first play-back cycle in question, therefore, lamp P12 is extinguished sooner than in the normal case, since obviously the carriage assembly operates the left limit switch S43 sooner in time than sequence-circuit relay X3E releases and make contact X3E–4 opens, which in the normal case initiates extinguishing of lamp P12 as explained previously. Hence shortened tracks, such as 346 on Figure 2, occur for the first magnetic track played back on each new record. Once relay X10C has released after the play-back of the first track of a record, it remains released so that exposure by lamp P12 is terminated in the normal manner for the remainder of the tracks on the record.

Certain functions of the control circuits will now be discussed with special reference to the main control panel shown on Figure 26 and their relation to the diagrams of Figures 27.

When the apparatus is in operation, as by the operation of relay X9K and associated relays, as described above, the indicator lamps P16, of which there are 24 as shown on Figure 26, each illuminate a corresponding number, but one only is lighted at a time. Lamps P16 are provided for convenience and information for the operator, and their value will become apparent in later discussion. In the operating cycle cited above, when step switch X12A steps to the home position before the carriage assembly first moves to the right, lamp P16–1 lights by the ground path through contact X1A–2, switch S48–1, wiper of step-switch bank X12A–4 on the first position, lamp P16–1, and lead 317 to the parallel combination of contacts X4F–2 and X5F–4 to the negative bus. Later, when wiper of bank X12A–4 steps to the second position, lamp P16–2 lights and so on. Contacts X4F–2 and X5F–4 are inserted to prevent lighting of a P16 lamp for the next track to be played back until the carriage assembly concludes playing back the previous track and arrives at the left limit switch S43. When toggle S48–1 is in the position opposite to that shown on the diagram, then the ground circuit to the lamps is through the wiper of step switch bank X12A–5, instead of X12A–4, and because of reversed interconnections, lamp P16–24 lights in place of P16–1, P16–23 instead of P16–2, and so on. The position of toggle S48 on the control panel, Figure 26, is determined by the direction in which the record-carrier plate progresses from one side of the record to the other, as for the case switch S48–1 is thrown to the left position, in the sense of from track #24 towards track #1. Rectifiers P226 and P254 are placed in the wiring associated with banks X12A–4 and X12A–5 only to eliminate spurious circuits which may occur owing to the limited number of step-switch banks which are employed.

Previously, in connection with discussion of the function of relays X3B and X5B, it was pointed out that switches S58 may be preset and have control over operation of the carriage assembly and motor P206. The function of preset switches S58, which are shown on Figure 27(*a*) in association with lamps P16 bearing corresponding track numbers, will be considered in greater detail at this point. Assume that before starting operation switch S58–2 has been preset closed, and all other switches S58 are open; that contacts of all decks of rotary switch S55 are in the first position as shown on the diagram Figures 27, and that switch S48–1 is in the right-hand position as shown. Assume, also, that the first track is being played back, and note that, as previously explained, wipers of all banks of step switch X12A step from the first to the second position when centrifugal switch S49 closes as the carriage assembly starts to the left from the right limit switch position. Thus, in particular, wiper of step-switch bank X12A–4 which is now on contact X12A–4–2 will close a ground circuit to relay X3B, and relays X3B, X5B, and associated relays operate, as outlined previously. Now, however, note that transfer of the arm of contact X3B–1 from the break contact to the make contact produces a ground pulse, as generated by slow-release relay X4B, on lead 316 which, comprising a "stop" pulse, operates relay X5D. Relay X5D through its own make contact X5D–1 locks to ground through the closed make contact X7D–1, and break contact X5D–2 opens and thus breaks that part of the locking circuit for relays X7D and X8D which is in parallel with still-closed make contact X6D–3. Thus when the carriage assembly reaches the left limit switch S43, the brake is applied as explained previously, centrifugal switch S49 opens thus releasing relay X6D so as to open make contact X6D–3, whereupon A.-C. power is removed from motor P206 by release of relay X8D. The carriage assembly motion is now halted and further operation of the device is determined by subsequent action by the operator.

Attention of the operator is called to the fact that play-back operation has arrived at this point by intermittent flashing of lamp P6 (labelled Operator Call on the main control panel Figure 26) and intermittent sounding of buzzer P220, as controlled by relays X8G and X9G to be discussed below. Pulsing of relays X8G and X9G may be initiated in various ways, as will be seen later, and in this instance by operation of relay X6G (Figure 27(*c*)). Relay X6G is operated by the series circuit to ground formed by the closed break contact X7D–5 and the closed make contacts X2F–4 and X3B–5, which uniquely occurs at only this point in the operation of the apparatus. Closed make contact X6G–1 provides ground through break contact X9G–2 to operate slow-release relay X8G, which in turn through closed make contact X8G–1 energizes the coil of slow-operate relay X9G. After delayed operation, relay X9G, by opening of break contact X9G–2, de-energizes the coil of relay X8G, but only after the delayed release of relay X8G, by opening of make contact X8G–1, does the coil of relay X9G release. At this point break contact X9G–2 closes and operates relay X8G, whereupon the closing of make contact X8G–1 energizes the coil of relay X9G. This cycle continues automatically and when both make contacts X8G–1 and X9G–1 are closed simultaneously, a ground pulse appears on lead 318, which through the closed make contact X6G–2 (and contacts X10G–4 and X2D–2 which are presumed closed) lights lamp P6, referred to above as the Operator Call lamp, in roughly equal on and off intervals. Also, through closed break contact X7G–3 and lead 329, buzzer P220 receives the same series of ground pulses and sounds intermittently.

As will become apparent later, this intermittent pulse circuit is also used to signal other circuit conditions. In anticipation it may be mentioned at this point that when the circuit is in operation, as described above, the closing of make contact X7G–2 operates relay X8G directly, and therefore relay X9G also, so that the pulsing ground on lead 318 becomes a steady ground through closed make contacts X8G–1 and X9G–1. Also, the simultaneous opening of break contact X7G–3 removes the steady ground from lead 329 and buzzer P220 becomes silent.

Upon occurrence of the Operator Call signal, the operator observes that the signal lamp P16 which is lighted is opposite a closed preset switch S58, in the present example S58–2. It is at this track #2 in the play-back process that a special, manual operation is to be performed. As indicated earlier, the special operation may require use of one of the push buttons under the heading Track Controls (Figure 26) namely, Skip (S4), Repeat (S6), Blank (S1), Insert Blank (S7), Double Recording (S29), or Cancel Preset (S8). The significance of these may now be explained.

*Skip.*—If Skip push button S4 is momentarily depressed, in the case of the Operator Call signal occurring for closed preset switch S58–2, ground is placed on lead 319, and, through break contact X10G–2 which is presumed closed, relay X7G operates and locks through its own contact X7G–1 and closed make contact X3B–5 to ground. As described above, the buzzer becomes silent since break contact X7G–3 opens, and the Operator Call lamp P6 is lighted steadily. Upon the steady lighting of lamp P6, the operator opens preset switch S58–2.

Upon opening of switch S58–2, relay X3B releases, and, as explained above, relay X5B releases resulting in a ground pulse on lead 321 through closed contacts X6B–2 and X7B–2 to step switch coil X12A. The step switch pulse is terminated when make contact X6B–2 opens. The wiper of step-switch bank X12A–7 moves, in this case, from a position for which relay X10D is operated to the adjacent position for which relay X10D is released, and thus the ground through rotary-switch deck S55–3 and closed break contact X4E–5 to solenoid P219 is transferred by contact X10D–1 to solenoid P218. The escapement (Figure 24) whose circuit has already been explained displaces the record-carrier plate 25 transversely one track, and hence the Skip function for track #2 is accomplished.

Meanwhile, simultaneously with release of ground on lead 321 to the step switch X12A, opening of contact X6B–1 removes ground from the coil of relay X8B. After its delay, during which the record-carrier plate moved to a new transverse position as just described, relay X8B releases, a ground "start" pulse appears on lead 305, and if the pulse is not gated by re-opening of break contact X3B–3 (which does not occur in this example since switch S58–3 is presumed open), play-back resumes on track #3.

The result of Skip push button S4 operation is thus seen to be the advancement of the record-carrier plate 25 and the record 15 one record track without advancement of the film 21, since no magazine operating ground pulse has occurred on leads 309, 310, or 311 for the track which has been skipped. As many tracks as desired may be skipped in this manner, either randomly or consecutively, and with no interruption in the succession of tracks reproduced on the profile film 21.

*Blank.*—If the Blank push button S1 is momentarily depressed, in the case of the Operator Call signal occurring for closed preset switch S58–2, ground is removed from the coil of operated delay-release relay X5C and placed on the still-closed make contact X5C–1. A ground pulse thus appears on lead 311 which, as previously noted, initiates operation of one cycle of magazine-film advancement. When relay X5C releases switch S1 still depressed, contact X5C–1 transfers to the break position and relay X7G operates. As in the previous Skip case, buzzer P220 is then silenced and steady ground would be presented to Operator Call lamp P6, except that, since the magazine circuit is "busy," relay X2D is operated by the ground on lead 312 and break contact X2D–2 (Figure 27(*c*)) is open, extinguishing lamp P6. However, when the busy signal ground on lead 312 is removed, contact X2D–2 closes and Operator Call lamp P6 lights steady, which is the signal for the operator to open preset switch S58–2. Upon opening of switch S58–2, step switch X12A advances one position, the record 15 advances one record track, and the "start" pulse appears on lead 305, as previously explained for the case of Skip, and play-back resumes on track #3.

The result of Blank push button S1 operation is thus seen to be advancement of the magazine film 21 one track and advancement of the record-carrier plate 25 one record track, so that no play-back or reproduction occurs for that track of the magnetic record and the space which would have been occupied by the signal if it were reproduced on the profile film is left blank. In the case given above, the space on film 21 allotted to track #2 remains blank.

*Insert Blank.*—If the Insert Blank push button S7 is momentarily depressed, in the case of the Operator Call signal occurring for closed preset switch S58–2, relay X4C operates, and contact X4C–2 transfers ground from the coil of delay-release relay X5C to the still-closed make contact X5C–1. A ground pulse thus appears on lead 311 which, as previously noted, initiates operation of one cycle of magazine-film advancement. When relay X5C releases and relay X4C is still operated, contact X5C–1 transfers to the break position and relay X7G operates by the ground on lead 319. As in previous cases, buzzer P220 is then silenced and steady ground, by the closing of relays X8G and X9G, would be presented to Operator Call lamp P6, except that contact X2D–2 is open because of the busy signal from the magazine circuit.

Meanwhile, closed make contact X4C–1 places ground on lead 320 which operates relay X7B. Because the wiper of step-switch bank X12A–3 is on a contact closed to ground through switch S58–2, relays X3B, X5B, and X6B and associated relays are operated, and a locking path to ground is provided through closed make contact X6B–1 for the coil of relay X7B. When the busy-signal ground on lead 312 is removed, break contact X2D–2 closes and Operator Call lamp P6 lights steady, which is the signal for the operator to reoperate the Insert Blank push button S7 or to open preset switch S58–2.

As many operations of Insert Blank push button S7 as desired may be made while the preset switch S58 remains closed (in the present example S58–2), providing only that the operator waits for Operator Call lamp P6 to relight before depressing the push button S7 for the next blank insertion.

Upon opening of switch S58–2, relay X3B releases and, as explained previously, relay X5B also releases. In this case, since break contact X7B–2 is open, a ground pulse does not appear on lead 321, the wipers of step switch X12A do not step, and consequently, as previously discussed, the record-carrier plate 25 remains on track #2. But the ground "start" pulse appears on lead 305 as before, and play-back resumes on track #2. Note that relay X7D releases by breaking of its locking path when relay X6B releases, and thus the closing of break contact X7B–2 restores continuity to lead 321 and step switch X12A for subsequent normal operation of the step switch.

The result of Insert Blank push button S7 operation is then seen to be actuation of magazine-advancing circuits for one or more spaces on the profile film without advancement of the record-carrier plate 25, so that on the profile film 21 blank space or spaces are inserted between tracks which otherwise appear in consecutive order.

In the case given above, inserted blank spaces precede track #2. This operation is useful if a gap for some reason has occurred in the succession of geophone locations in the field operations.

*Repeat.*—If the Repeat push button S6 is momentarily depressed, in the case of the Operator Call signal occurring for closed preset switch S58–2, relay X1C operates and locks to the sequence circuit on the parallel combination of closed break contact X4E–1 or closed make contact X2E–2. Since the arm of rotary-switch deck S55–5 is assumed to be on its first position, the additional parallel path through contact X5E–2 is not in the locking circuit for the case under consideration. Contact X1C–2 grounds lead 320, which, as shown previously, prevents subsequent stepping of step switch X12A when preset switch S58–2 is ultimately opened. Contact X1C–5, on Figure 27(*c*), upon closing operates relay X7G by the ground on lead 319. As in previous cases, buzzer P220 is then silenced and the intermittent pulse generator relays X8G and X9G are held operated. Closed make contact X1C–4, upon operation of relay X1C, places a ground "start" pulse on lead 301, whereupon the carriage assembly moves to the right and a normal play-back cycle ensues for track #2. As the carriage returns to the left, and centrifugal switch S49 closes, relay X2E releases, and, since relay X4E is already operated, the locking circuit for relay X1C, comprising open contacts X2E–2 and X4E–1 as mentioned above, is broken and relay X1C releases. Thereupon closed break contact X1C–3 places a ground "stop" pulse on lead 316 which operates relay X5D. As described above, the opening of break contact X5D–2 results in the halting of the carriage assembly when it reaches the left limit switch S43, and make contact X6D–3 opens. At this point track #2 has been played back one time; the Operator Call lamp P6, which has been off during this operating cycle owing to open make contact X2F–4 and consequent opening of make contact X6G–2, is now relighted steady; and the record-carrier plate 25 is still in the track #2 position.

As many operations of Repeat push button S6 as desired may be made while, as in this case, S58–2 is closed, providing only that the operator waits for Operator Call lamp P6 to relight before depressing the push button S6 for the next repeat play-back.

Upon opening of switch S58–2, relay X3B releases and, as explained previously, relay X5B also releases. In this case, since break contact X7B–2 is open, a ground pulse does not appear on lead 321 and the wipers of step switch X12A do not step, and as a consequence, the record-carrier plate 25 remains on track #2. But the ground "start" pulse appears on lead 305, and play-back resumes for a final normal reproduction of track #2. As in a previous example, the eventual opening of make contact X6B–1 releases relay X7B which restores continuity through closed break contact X7B–2 to lead 321 for subsequent normal operation of step switch X12A.

The result of Repeat push button S6 operation is thus seen to be, in this case, the play-back of track #2 one or more times preceding, and in addition to, the normal play-back of that track.

*Cancel Preset.*—If the Cancel Preset push button S8 is momentarily depressed, in the case of the Operator Call signal occurring as for closed preset switch S58–2, relay X6C operates. From previous explanations, it will be apparent that ground on lead 320 through closed contact X4C–1 locks relay X7B to operate relay X6B, and a stepping pulse will not occur on lead 321 when switch S58–2 is subsequently released. Also, the buzzer is silenced by ground on lead 319 through contact X6C–2, and Operator Call lamp P6 lights steady by operation of relay X7G. Then when switch S58–2 is opened, a ground "start" pulse appears on lead 305 and play-back resumes on track #2.

The result of Cancel Preset push button S8 operation is thus to provide a means for restoring normal operation at any closed preset switch S58 position as though the switch had not been closed.

Operation as determined by the various contactor arm positions indicated in the enlarged view of contact designations on rotary select switch S55 on Figure 27(*f*) will now be outlined. The ten arm positions are designated in four groups labelled Regular, Pairs, Mix, and Timer, and except for Timer, each group is subdivided into positions A, B, and C. The significance of the main groups will be discussed in turn, but for simplicity the subgroups A, B, and C which have the same significance in each case, will be discussed first.

In the foregoing circuit discussions, it was assumed that rotary switch S55 was placed in contact No. 1 position, as the arms are shown on the diagram Figures 27. In particular it was noted in connection with the homing of step-switch bank X12A–3 that when wiper of bank X12A–3 reaches contact X12A–3–1 and ground is completed through contact S55–1–1, relay X1A operates and stepping ceases. Wiring to positions S551–1, S55–1–2, S55–1–4, S55–1–5, S55–1–7, S55–1–8, and S55–1–10 shows that the step switch home position for all A and B rotary-switch positions and Timer position is at contact X12A–3–1. Likewise, wiring to positions S55–3, S55–6, and S55–9 shows that home position for all C rotary-switch positions is at contact X12A–3–13.

Thus, for the designated A, B, and Timer positions of rotary switch S55, with wipers of step switch X12A banks on home, panel indicator lamp P16–1 is lighted if switch S48–1 is in the right position as shown on the diagram so that step-switch bank X12A–4 is included, which is a circuit previously described. If, however, switch S48–1 is in the left position, step-switch bank X12A–5 is included, and lamp P16–24 is lighted.

Likewise, for the designated C positions of rotary switch S55, with wipers of step switch X12A banks on home, panel indicator lamp P16–13 is lighted if switch S48–1 is in the right position including step-switch bank X12A–4; and lamp P16–12 is lighted if switch S48–1 is in the left position, including step-switch bank X12A–5.

With reference to step-switch bank X12A–6 and associated rotary-switch deck S55–2, it will be noted that certain combinations of contacts provide a ground "stop" circuit on lead 316 by operation of relay X4D, which has previously been discussed. In particular, the absence of connections to rotary-switch positions S55–2–1, S55–2–3, S55–2–4, S55–2–6, S55–2–7, and S55–2–9 permits printing to continue and step switch X12A to step periodically as required during play-back until wiper of bank X12A–6 reaches contact X12A–6–25. Thereupon relay X4D operates and a "stop" ground appears on lead 316, as previously discussed, following which play-back ceases and Record Complete signal, discussed below, occurs. Thus for all positions labelled A and C (see the contact designation diagram Figure 27(*f*) for rotary switch S55) play-back automatically ceases after wipers of step-switch banks reach positions corresponding to contact X12A–6–25.

The Record Complete signal referred to above, comprising a steady buzzer sound and lighting of lamp P7, occurs when break contact X7D–4 closes and make contact X4D–3 closes, Figure 27(*c*), as controlled by step-switch bank X12A–6 and rotary-switch arm S55–2. Resulting ground on lead 329 operates buzzer P220, and closing of contacts X4D–2 lights Record Complete lamp P7, which signals the operator to proceed to place the apparatus in condition for replacing the finished magnetic record with the succeeding record.

Connections from rotary-switch positions S55–2–2, S55–2–5, and S55–2–8 to contact X12A–6–13 permit play-back to continue and step switch X12A to step periodically during play-back as required until wiper of bank X12A–6 reaches contact X12A–6–13, following which, as before, play-back ceases and Record Complete signal occurs. Thus for all B positions, Figure 27(*f*), play-back automatically ceases after wipers of step-switch banks reach positions corresponding to contact X12–A–6–13.

The connection from rotary-switch position S55–2–10 to contact X12A–6–2 permits step switch X12A to step once during operation so that wiper of bank X12A–6 reaches contact X12A–6–2, whereupon play-back ceases as above. This is the condition for the Timer position of rotary switch S55, which comprises, as it is now evident, the play-back of one track only.

The above may be summarized as follows. With switch S48 to the right and rotary switch S55 on A positions, play-back of 24 tracks occurs and P16 indicator lamps are lighted in sequence from #1 lamp through increasing numbers; on B positions, 12 tracks, from #1 lamp, increasing; on C positions, 12 tracks, from #13 lamp, increasing; on Timer, 1 track, #1 lamp only. With switch S48 to the left and S55 on A positions, 24 tracks, from #24 lamp, decreasing; on B positions, 12 tracks, from #24 lamp, decreasing; on C positions, 12 tracks, from #12 lamp, decreasing; and on Timer, 1 track, lamp #24 only.

The importance of the above provisions in the operation circuit lies in the fact that for many records played back in actual practice only the first or second half of the 24 tracks are required to be played back, and that the order of play-back may be from either the lower-numbered or the higher-numbered tracks. These provisions provide means for the operator to readily preset the apparatus for appropriate automatic operation. Moreover, step-switch banks X12A–4 and X12A–5 not only provide correct sequence of lighting of lamps P16, but also simultaneously connect the corresponding switches S58 in correct sequence so that they may be preset closed as required in advance of play-back, without ambiguity and with maximum convenience for the operator.

From previous discussion, it is apparent that the Timer position of rotary switch S55 provides means for the automatic play-back of the Timer tracks 1(*a*) and 1(*b*) shown in Figure 2, which each require only one operating cycle.

In the following discussion of Regular, Pairs, and Mix, it will not be necessary to give further consideration to the subdivisions A, B, and C, since they apply similarly to each group, as described above. However, it will be assumed that contact arms of the decks of rotary switch S55 will be in A position for each of the following cases.

*Regular.*—Up to this point in description of the sequence of events during a play-back cycle, the Regular group position of rotary switch S55 has been assumed. Briefly, it may be stated that for each play-back cycle of the carriage assembly, the profile film 21 in the magazine advances one track space and the record-carrier plate 25 advances successively one record track. Thus a direct correspondence between each series of tracks exists, except for the relatively exceptional occasions on which record tracks are skipped, repeated and so on as discussed above in regard to the function of closed preset switches S58.

Thus, normally, for Regular operation, step switch X12A steps one position for each play-back cycle of the carriage assembly by opening of make contact X2E–3 of the sequence circuit and, through rotary-switch contact S55–6–1, S55–6–2, or S55–6–3, release of ground on lead 322 as previously explained.

The film magazine advances profile film 21 for each normal play-back cycle by closing of contact X8E–3 under control of sequence-circuit relay X2E, with a ground pulse through rotary-switch contact S55–4–1, S55–4–2, or S55–4–3 appearing on lead 309, as previously discussed.

The record-carrier plate 25 advances one record track when solenoids P218 and P219 (Figure 24 and circuit Figure 27(*b*)) are alternately operated. In particular, for Regular, the wiper of step-switch bank X12A–7 normally advancing one position for each play-back cycle, relay X10D is released for one play-back cycle and operated for the next, and so on. Thus the ground circuit through rotary-switch contact S55–3–1, S55–3–2, or S55–3–3 is applied to alternate solenoids when the sequence-circuit break contact X4E–5 closes once each play-back cycle, as has been explained previously. Thus the record-carrier plate advances one record track for each play-back cycle in normal Regular operation.

*Pairs.*—When the rotary switch S55 is set on any of the three pairs positions, for each play-back cycle of the carriage assembly the profile film 21 in the magazine advances one track space, and for every other play-back cycle of the carriage assembly the record-carrier plate 25 advances successively one record track. Thus on the resultant profile, each record track is reproduced in two adjacent positions on the profile film, except for the relatively exceptional occasions on which record tracks are skipped, etc., as in connection with use of closed preset switches S58.

Because of this automatic means for Pairs operation by doubling the horizontal extent or spread of a series of tracks on a profile, great flexibility in horizontal scale results, especially since, as previously explained with reference to Figure 25, the number of track spaces per inch of profile may be varied by choice of ratchet wheel 417 used in the magazine film-advancement mechanism.

Thus, normally, for Pairs operation, step switch X12A steps one position for every second play-back cycle of the carriage assembly by opening of make contact X6E–3 of the second pair of pulse-frequency divider relays of the sequence circuit and, through rotary-switch contact S55–6–4, S55–6–5, or S55–6–6, release of ground on lead 322, as previously explained.

While the record-carrier plate 25 advances one track when solenoids P218 and P219 are alternately energized as previously described, in Pairs operation it should be noted that the wiper of step-switch bank X12A–7 normally only steps to a new position for every second play-back cycle. Thus, by circuits previously described, relay X10D is released for two successive play-back cycles and operated for the next two successive play-back cycles. While the ground circuit through rotary-switch contact S55–3–4, S55–3–5, or S55–3–6 is applied to contact arm X10D–1 once each play-back cycle when sequence-circuit break contact X4E–5 closes, ground is however actually applied to an alternate solenoid for every second play-back cycle. Hence the record-carrier plate 25 advances once for two complete play-back cycles throughout the reproduction of a record in normal Pairs operation.

Meanwhile, the film magazine advances profile film 21 for each play-back cycle by closing of contact X8E–3 under control of sequence-circuit relay X2E, with a ground pulse through rotary-switch contact S55–4–4, S55–4–5, or S55–4–6 appearing on lead 309.

For the case of operation of Repeat push button S6 in connection with Pairs operation and a closed preset switch S58, the locking path for relay X1C now includes make contact X5E–2 through rotary-switch contact S55–5–4, S55–5–5, or S55–5–6. Functions of the apparatus proceed as in the previous discussion except that the parallel locking path to ground through closed contact make X5E–2 prevents relay X1C from releasing upon the first opening of make contact X2E–2, whereupon play-back continues through a second cycle. Then on the second cycle when the carriage assembly starts to the left, while break contact X4E–1 and make contact X5E–2 are open, the opening of make contact X2E–2 releases relay X1C and a ground "stop" pulse on lead 316 occurs. Thus on Pairs operation, one Repeat operation produces a pair of reproduced tracks in accord with the normal Pairs reproduction of record tracks.

*Mix.*—When rotary switch S55 is set on any of the three Mix positions, a form of reproduction termed Mix in this discussion is produced on the profile film, in which each track on the profile film is a composite, double exposure of the signals occurring on adjacent tracks of the magnetic record. In this process, as it occurs automatically by the basic circuits to be described, any one record track is played back two times in succession, and in any one track position on the profile film two adjacent record tracks are reproduced superposed. Thus, if record track #3, for instance, is reproduced singly on the profile film 21, on the next cycle track #4 is reproduced on the film 21 superposed on track #3. Before the next play-back cycle occurs the magazine film 21 advances one space. Then track #4 is reproduced singly in that space, and, as before, on the next cycle track #5 is reproduced superposed on track #4; and so on. In Mix operation, rheostat R10 is adjusted so that the indication of meter P205 is at the correct value to provide a lamp P12 intensity which will give proper photographic density on profile film 21 when each track segment is exposed twice.

It will be convenient in later explanation to show the order of Mix recording of tracks symbolically by numerals corresponding to record tracks, in which columns represent successive profile film tracks and the numerals in the columns are the numbers of the magnetic record tracks as superposed in the recording operation. Accordingly, the above description of the basic Mix pattern on the profile film 21 is shown as:

2 3 4 5 6
. . . . . .
3 4 5 6 7

For Mix operation, step switch X12A normally steps one position for every second operating cycle of the carriage assembly by opening of break contact X6E–3 of the second pair of pulse-frequency divider relays of the sequence circuit and breaking of ground on lead 322, as previously explained. The ground path to lead 322 is through make contact X11E–2, break contact X9E–1 and rotary-switch contact S55–6–7, S55–6–8, or S55–6–9. Incidental to this ground circuit to lead 322, note must be taken of the fact that prior to the play-back of the first track, the ground circuit is incomplete at open make contact X11E–2, but that when sequence-circuit make contact X2E–4 closes upon the start of operation for the first track, relay X11E operates by a ground through rotary-switch contact S55–4–7, S55–4–8, or S55–4–9, and relay X11E is thereafter locked on its own contact X11E–1 through closed break contact X10E–4 and rotary switch S55–4 to ground. The purpose of the gate at contact X11E–2 is to prevent ground prematurely appearing on lead 322 when rotary switch S55–6 is first placed on any Mix position. Hereafter it will be assumed that relay X11E operates and that make contact X11E–2 closes as described above.

One operation is started, as is assumed at this point, sequence-circuit relay X6E operates at the start of carriage-assembly travel to the left on a certain play-back cycle, and releases at the start of travel to the left on the succeeding cycle, and so on. Thus step switch X12A, as established previously, steps when relay X6E operates and break contact X6E–3 opens, followed by the record-carrier plate 25 advancing to a new record track position at the end of that particular cycle. But it may now be noted that with relay X6E operated, break contact X6E–2 is open and there is thus no path to ground for lead 309. Hence, when the carriage assembly starts to the right for the succeeding cycle and contact X8E–3 closes momentarily, there is no ground pulse transmitted to lead 309 and the film magazine does not operate. As a consequence, this play-back cycle is the one in which a new record track is superposed on the adjacent track already reproduced on the profile film.

As the carriage assembly now returns to the left position, relay X6E releases and closes break contact X6E–2, so that when, for the succeeding play-back cycle for the same record track, contact X8E–3 closes momentarily, there is a ground pulse on lead 309 and the film magazine advances profile film 21 one space. Thus the record-carrier plate 25 and the magazine film 21 operate alternately for successive cycles, providing the basic Mix reproduction function.

Before the start of a Mix profile, the operator places rotary switch S55 on one of the three Mix positions, and through closing of contact S55–7–7, S55–7–8, or S55–7–9 slow-operate relay X11B transmits a ground pulse through its still-closed break contact X11B–1 to relay X12E which operates and is latched operated. Thus break contact X12E–1 is open in ground lead 323, although make contact X11B–2 closes immediately thereafter. When operation is started and relay X1A operates by grounding of lead 345, as previously described, a ground pulse appears on lead 323 by the slow operation of relay X1B, but as noted this is gated by open break contact X12E–1, and therefore relays X10F and X11F do not operate at this time. When operation subsequently starts and sequence-circuit make contact X1E–2 closes, ground on lead 324 operates coil X13E and the latched relay X12E releases, restoring continuity from lead 323 through closed make contact X11B–2 and closed break contact X12E–1 to relays X10F and X11F. Relay X12E remains released for the duration of running the profile except for occasions on which ground pulses occur on lead 325, as will be explained later. The negative side Z of winding of the coil of relay X11B is connected at Z of the power supply (Figure 27(*a*)), so that in case the device is shut down between play-back of records on a Mix profile, when power is turned on again relay X11B will operate before the negative bus connection is made to relay X12E, with the result that relay X12E remains released. The significance of these circuits in the performance of Mix operation will become apparent shortly.

Meanwhile, the play-back cycle for the first track, as assumed above, has started and, when the carriage assembly starts return travel to the left, step switch X12A steps to the second position by operation of relay X6E and opening of break contact X6E–3, the circuits concerning which have been discussed above. Thereafter, play-back of the first track is completed, the record-carrier plate 25 advances to the second track, and following this, the second track is played back two times. However, before the second play-back of this track, the magazine film 21 advances one space. As a consequence of the basic operations described above, play-back of the profile continues, and the results on profile film 21 appear symbolically as follows:

1 2 3 4 5
. . .
2 3 4 5 6

When play-back reaches the last track to be reproduced, and while this last track is being played back the second time, relay X4D operates as determined by step-switch bank X12A–6 and the position of rotary-switch deck S55–2. A "stop" ground then appears on lead 316, and, as described previously, operation ceases with Record Complete indication. At this point, the reproduced tracks on profile film 21 ordinarily appear as follows:

20 21 22 23 24
. . .
21 22 23 24 and it should be noted that the single reproduction of the final track of the magnetic record as indicated in the right-hand column represents one-half the photographic exposure.

The operator now proceeds to reload the record-carrier plate with the next record in order and again initiates operation. As relay X1A closes thereafter, a momentary ground pulse appears on lead 323 from the delayed opening of break contact X1B–2, and, through closed make contact X11B–2 of still-operated relay X11B and closed break contact X12E–1 of unlatched relay X12E, the ground pulse operates both relays X10F and X11F, the coils of which are in series. Both relays lock to ground through closed make contact X10F–1.

Operation now being resumed on the newly-loaded record, the carriage assembly as usual starts moving to the right. It is important to note that while the magazine control circuit hitherto received a ground pulse at this point upon the momentary closing of contact X8E–3 on lead 309, such a pulse now is gated by the open break contact X11F–3, and the magazine does not advance. Also, the second pair of pulse-frequency divider relays X5E and X6E of the sequence circuit are at this point inoperative owing to the removal of ground on lead 327 by open break contact X11F–2. However, sequence-circuit make contact X4E–3 closes when the carriage assembly reaches the right limit position. The ground through contact X4E–3 thus placed on lead 326, through closed make contact X11F–1, shunts relay X10F, which releases. When the carriage assembly reaches the left limit position and sequence-circuit make contact X4E–3 opens, the ground on lead 326 through closed make contact X11F–1 which has been holding relay X11F operated is broken, and relay X11F releases. Thus ground is restored on lead 327 to the second pair of pulse-frequency divider relays X5E and X6E of the sequence circuit so that they will perform their normal operation during subsequent operating cycles. The inoperative status of these relays during the first cycle has prevented stepping of step switch X12A since contact X6E–3 remained closed during this interval; and, as it follows from discussion above, the record-carrier plate 25 did not advance. Also, break contact X11F–3 is now closed so that during play-back of the remainder of the record subsequent ground pulses on lead 309 may operate the film magazine 21 as required. At this point the results on profile film 21 appear as follows:

20 21 22 23 24

. . .

21 22 23 24 1 which illustrates that the reproduction on profile film 21 first track of the newly-loaded magnetic record is superposed on the reproduction of the last track of the previous magnetic record.

From this point on for other play-back cycles, circuit operation is essentially that previously discussed with the resulting sequence of reproduced tracks continuing as follows:

22 23 24 1 2

. . . . . .

23 24 1 2 3

As a result of the procedure outlined above, mixing of adjacent tracks of successive magnetic records is accomplished on the profile film 21 in the same manner as mixing of adjacent tracks of the same magnetic record.

Prior to playing back the last record of a series of records on a Mix profile, the operator closes preset switch S58 for the last track to be played back. When play-back proceeds to this particular closed switch S58, operation ceases and the Operator Call signal occurs, as explained above. If for instance track #24 is the last track, then when the Operator Call signal occurs corresponding to closed preset switch S58–24, the reproduced tracks on profile film 21 appear as follows:

19 20 21 22 23

. . .

20 21 22 23

Since this is a Mix profile, the operator then momentarily depresses the push button S29, labeled Double Recording (Mix) on Figure 26, and thereafter opens closed switch S58–24. Play-back then automatically resumes for the final track #24, and when the Record Complete signal occurs the completed reproduction on profile film 21 appears as follows:

19 20 22 23 24

. . .

20 21 23 24 24

Thus the final magnetic track has been reproduced on the same profile film position two times so as to bring the photographic density to the level of preceding tracks.

When the Double Recording (Mix) push button S29 (Figure 27(*a*)) is momentarily depressed, as mentioned above with Operator Call signal and the carriage assembly in left limit position, relay X3A operates and locks on the closed break contact X12A–1 through its own make contact X3A–1. Lead 328, which is now grounded, operates relay X6C which performs the same function as described above for operation by Cancel Preset push button S8. Rectifiers P252 and P253 prevent circuit interaction. As before, buzzer P220 is silenced and Operator Call lamp P6 lights steady. Ground on lead 320 locks relay X7B to operated relay X6B, and a stepping pulse does not occur on lead 321 when preset switch S58–24 is subsequently opened. Consequently the record-carrier plate 25 remains in position on track #24.

Since sequence-circuit relay X6E is operated and break contact X6E–3 is open at this point, there is no ground path to lead 322 through closed make contact X11E–2, closed break contact X9E–2, and rotary switch S55–6, so that relay X5B releases when relay X3B releases upon opening of preset switch S58–24. Thus, when relay X6B releases thereafter, relay X7B is no longer locked on contact X6B–1, but a ground "start" pulse appears on lead 305 and operation resumes for track #24.

When the carriage assembly starts returning to the left on this cycle, sequence-circuit relays X1E and X6E release and break contacts X1E–4 and X6E–3 close. Thus relay X5B operates by the circuit from closed break contact X6E–3 through break contact X9E–2 to lead 322. But it is to be noted that relay X9E simultaneously operates by the ground on lead 348 from closed make contact X3A–2 through the now-closed sequence-circuit contacts X4E–2, X5E–3 and the just-closed break contact X1E–4. Relay X9E locks to ground on lead 348 through its own closed make contact X9E–3. Thus when relay X9E operates, the ground path to lead 322 enumerated above which includes break contact X9E–2, no longer has control in operation of relay X5B, but because of the make-before-break arrangements of contact X9E–2, relay X5B remains operated, now by the ground path from lead 348 through break contact X10E–2, make contact X9E–2 to lead 322. This path, as it will be seen, will continue to be closed until relay X10E is subsequently operated.

When the carriage assembly starts to the right during the second play-back cycle of track #24, break contact X6E–2 being closed to ground, a ground pulse on lead 309, upon momentary closing of contact X8E–3, operates the magazine to advance profile film 21 one space.

When the carriage assembly thereafter starts returning to the left on play-back of track #24 the second time, sequence-circuit relay X6E operates, and the closed make contact X6E–3 now operates relay X10E through closed make contact X9E–1 and closed break contact X10E–1. At this point, operated relay X10E locks to the ground on lead 348 through its own closed make contact X10E–1; and its connection to closed make contact X6E–3 is broken by its make-before-break contact arrangement. At this point the important consideration is that relay X5B is held operated by the closed make contact X6E–3 rather than by the otherwise normal break contact X6E–3, and is isolated from other ground paths by the make-before-break contact arrangements of contacts X9E–2, X10E–1, and X10E–2. The ground path from closed make contact X6E–3 is now by way of closed make contacts X9E–1, X10E–2, X9E–2, and rotary switch S55–6 to lead 322 and relay X5B, which as noted is still operated.

Meanwhile, the carriage assembly completes the second play-back of track #24, and returns to the right without advancing the magazine because, since sequence-circuit relay X6E is operated and break contact X6E–2 is open, no ground appears on lead 309. As the carriage assembly starts to the left to complete the third play-back cycle for track #24, sequence-circuit relay X6E releases. Owing to the configuration of the circuit as described immediately above, relay X5B then releases. Thereupon step switch X12A steps to the final position for which a ground "stop" pulse appears on lead 316 and operation ceases when the carriage assembly returns to the left position. At the time of stepping of relay X12A, contact X12A–1 opens and breaks the locking circuit for relay X3A. In turn, the opening of make contact X3A–2 breaks the ground on lead 348 and relays X9E and X10E release, the entire circuit as described returning to normal.

Thus, since the operator depressed Double Recording (Mix) push button S29, the carriage assembly has played back track #24 three times, and the profile film 21 advanced one space only between the first and second cycles, giving the result illustrated symbolically above for the termination of a Mix profile by the double recording of track #24 following the superposition of tracks #23 and #24. It will be seen later that the Double Recording (Mix) circuit is used, essentially as described above, in connection with other Mix operations.

For the case of operation of any of the push buttons Skip (S4), Repeat (S6), Blank (S1), Insert Blank (S7), or Cancel Preset (S8) in connection with a closed preset switch S58, the resulting operation functions are analogous for Mix reproduction to those already described for Regular and Pairs.

For Skip, with closed preset switch S58–5, for example, reproduction on profile film 21 appears symbolically as follows by inherent operation of the circuit as described above:

```
            2  3  4  6  7
 . . .                          . . .
            3  4  6  7  8
```

For Repeat, with closed preset switch S58–5, and the Repeat push button S6 depressed momentarily for two repeat operations, reproduction on profile film 21 appears symbolically as follows, by operation of the circuit as shown on Figures 27:

```
        2  3  4  5  5  5  6
 . .                            . . .
        3  4  5  5  5  6  7
```

Note that for the repetitions of track #5, two play-back cycles occur on the same profile film position so as to bring the photographic density to the level of other tracks.

For Blank, with closed preset switch S58–5, reproduction on profile film 21 appears symbolically as follows:

```
        2  3  4      6  7  8
 . . .          —              . . .
        3  4  4      7  8  9
```

For Insert Blank, with closed preset switch S58–5, and the Insert Blank push button S7 depressed momentarily for two insert blank operations, reproduction on profile film 21 appears symbolically as follows, with the blank spaces inserted prior to the play-back of track #5:

```
        2  3  4         5  6  7
 . . .          —  —              . . .
        3  4  4         6  7  8
```

Thus in this case of Blank and Insert Blank, the track preceding the one in question is reproduced two times without profile-film advancement, namely track #4 (as shown above), so as to maintain the full photographic density on the profile film and in view of the fact that there is no other track available to be superposed on track #4.

An additional procedure step employing use of the Double Recording (Mix) push button S29 is required of the operator in the cases of Blank and Insert Blank on Mix operation in order to accomplish double recording of the preceding track, as is illustrated with track #4 in the examples above. The operator, thus, in advance of playing back the record in question, closes preset switch S58–4 in addition to S58–5, and, when the Operator Call indication occurs prior to play-back of track #4 depresses momentarily the Double Recording (Mix) push button S29 and then opens switch S58–4. The sequence of control events which has been described above in connection with the operation of Double Recording (Mix) push button S29 at the play back of the last track on the last record of a Mix profile then occurs, resulting in the double recording, as illustrated above, of track #4. When the Operator Call signal subsequently occurs, the operator depresses the Blank or Insert Blank push buttons, as required, and opens the corresponding preset switch S58–5 as in procedures discussed previously.

It should be noted that during the third play-back of the track in question (in this example track #4), sequence-circuit relay X5E releases as the carriage assembly reaches the right limit position. Ground through closed break contact X5E–4 and closed make contact X10E–3 (relay X10E having operated during the preceding cycle) to lead 325 now operates latch relay X12E, which latches operated on coil X13E. Circuit configuration and subsequent operation are similar to that described above for the start of a Mix profile, in which relay X12E is latched by a ground pulse through contact X11B–1, so that break contact X12E–1 is open. Likewise here, in the case of Blank, record tracks #6 and #7, and in the case of Insert Blank, record tracks #5 and #6, are reproduced superposed in the adjoining space of profile film 21, and the normal Mix operation sequence continues.

Operation of the Pause push button S3 and Resume push button S14 (Figures 26 and 27(*b*)) will now be discussed. During the course of playing back a record it may be desirable to halt operation temporarily without loss of circuit memory, and later resume operation without in any way having disturbed the succession of automatic operations. To stop operation in such a case, Pause push button S3 is momentarily depressed. Break contact X11G–2 being assumed closed, ground is presented by closing of the left contact of switch S3 (see Figure 27(*b*)) to slow-release relay X10B, which operates and locks to ground through its own closed make contact X10B–1, unoperated switch S14, and the right contact of push button switch S3 upon its being released. The slow release of relay X10B provides time for the arm of switch S3 to return and become part of the locking circuit. From discussion above, it will be clear that the ground through closed make contact X10B–2 on lead 316 comprises a "stop" ground by operation of relay X5D. Thus when the traverse of the carriage assembly is completed at either left or right limit positions, further action of the mechanism and circuits is suspended.

When the operator depresses Resume push button S14 momentarily (but long enough for slow-release relay X10B to release), ground is presented to lead 301 which constitutes a "start" ground. It may be noted that the "start" ground on lead 301 is effective to operate relays X7D and X8D only after relay X10B releases and opens make contact X10B–2, thereby releasing relay X5D and restoring continuity through break contact X5D–1. Thereafter the circuit is in normal condition and operation resumes as if it had not been halted.

The SC stylus control circuit will now be described. The circuit for controlling motion of SC stylus S56 by operation of motor P214 is shown on Figure 27(*d*). It will be assumed at the start of the discussion that the SC stylus carriage 100 is not in extreme left or right position so that limit switches S50 and S51 and override switches S52 and S53 are in normal position as shown on Fig. 27(*d*); that relay X7H is therefore operated and that through closed make contact X7H–2 ground is available to the coil of relay X6H; that relay X2H is operated by the path to ground through closed break contact X1H–2 and switch S50; and that switch S41 is closed, as shown, to permit a ground pulse on lead 307 to enter the circuit.

During the course of normal apparatus operation, it was pointed out above, periodically a ground pulse on lead 307 occurs which activates the SC stylus control circuit. Such a pulse operates relay X1H, which locks to ground through its own closed contact X1H–1, closed break contacts X8H–1 and X8H–2 and push button switch S12. Thereupon, closed make contact X1H–4 places ground on the busy signal lead 312, previously discussed; closed contact X1H–5 permits D.-C. voltage from points X—Y to be connected to the control circuit of motor P214; open break contact X1H–4 releases the shunting ground on relay X6H, which operates; and transfer of contact X1H–2 to the make position provides a ground pulse through still-closed make contact X2H–1 to operate relays X4H and X5H. Since relay X4H, by closing of make contact X1H–2, and relay X6H, by opening of break contact X1H–4, operate practically simultaneously, it can be seen that the circuit to motor P214 will be closed and voltage applied to rotate motor P214 in a definite direction, in this case such that stylus S51 is driven to the left, indicated by (L) in the diagram.

After a time interval corresponding to approximately one-fourth inch of stylus travel to the left, relay X2H releases. The duration of the slow release of relay X2H is prolonged somewhat by capacitors C15 and C16 connected to negative bus across the coil of relay X2H. Thereupon break contact X2H–1 closes and ground is removed from relay X4H, which releases, and a path to ground is provided through the closed break contact X3H–4 and closed make contact X5H–1 to shunt relay X6H, which releases. As make contact X6H–1 opens, voltage is removed from motor P214, and when break contact X6H–1 closes, a shorting path occurs on motor P214, which acts as a magnetic brake, suddenly stopping motion of the SC stylus.

Relay X5H releases only after a delay following release of relay X4H during which delay the motor is magnetically braked, as indicated above. Now, however, when make contact X5H–1 opens, relay X6H again operates, and since relay X4H is released, voltage on motor P214 is in reversed direction, so that stylus S56 is driven to the right, indicated by (R) on the diagram. Moreover, when break contact X5H–1 is closed, ground through switch S50 and contacts X1H–2, X2H–1, X3H–4, and X5H–1 operates stylus-depressor coil P217, whereby, as explained elsewhere, stylus S56 is pressed against the insulating SC punched card 95 (Figures 7 and 9) on the contactor plate.

If while now moving to the right, stylus S56 falls through a punched hole in the insulating card 95 to the grounded contactor plate, relay X8H operates (switch S15 being in the position shown in the diagram). Opening of break contact X8H–4 creates a braking short on motor P214, whose rotation and that of the SC stylus carriage immediately cease. Opening of contact X8H–2 breaks the locking ground on relay X1H, which releases. The circuit then returns to normal, with opening of make contact X1H–2 removing ground from stylus-depressor coil P217. The resultant raising of the stylus removes ground from relay X8H. Release of relay X1H also restores shunt ground to relay X6H by closing of break contact X1H–4.

If while moving to the right, as above, stylus S56 does not contact ground in scanning the punched card, the SC stylus carriage 100 eventually operates the right limit switch S51, thereupon operating relay X3H which locks by its own contact X3H–1 to the unoperated left limit switch S50. Closing of make contact X3H–4 operates relay X4H, which, as before, causes motor P214 to drive stylus S56 to the left; and also operates relay X5H which together with opening of break contact X3H–4 allows stylus S56 to raise from the card. When the stylus carriage reaches the left limit switch S50, ground through operated switch S50, closed make contact X1H–3 and closed make contact X5H–1 shunts relay X6H, which releases and applies magnetic braking to motor P214. Concurrently, by opening of the normally-closed contact of the left limit switch S50 together with release of relay X3H, ground is removed from relays X4H and X5H, which release in turn as described previously. When delay release relay X5H releases, relay X6H operates by removal of the shunt path to ground and the stylus S56 is again depressed as described previously, together with resumption of motor P214 operation, now driving stylus S56 to the right. Thus stylus S56 resumes scanning of the card from the left limit switch position, and if it locates a hole in the card, the stylus stops immediately as previously discussed.

The complete circuit as shown on Figure 27(*d*) provides for various special operations based on the basic circuit as described. Among these are provisions for testing the circuit by operation of push button switch S12, protective override switches S52 and S53, which remove voltage from motor P214 if they are opened, and the pulse-frequency dividing circuit of relays X9H and X10H, which is used as a pulse counter and together with relay X11H provides a "trouble signal" indication as described below for the operator. By contact X3H–3, ground on lead 331 occurs for each operation of right limit switch S51. When the second of two successive ground applications on lead 331 occurs break contact X9H–1 closes and, make contact X10H–2 being already closed, relay X11H operates. This occurs if stylus S56 completely scans the punched card at least once and not more than two times without locating a hole and making ground contact. Ground then appears on lead 330 activating the "trouble signal" circuit to be discussed later. The counting circuit is cleared, however, whenever a hole is located by opening of break contact X8H–3, so that any count in the circuit will not hold over for the scan of a succeeding hole. Closing of make contact X11H–4 stops further operation of motor P214 by applying ground to shunt relay X6H, which releases. The points indicated by the asterisk symbol (*) will normally be removed from ground before play-back operation continues, after location of the trouble source, so that the circuit is restored to normal.

The $x/V$ stylus control circuit will now be described. The circuit for controlling motion of $x/V$ stylus S82 by operation of motor P208 through selsyn link P207 and P216 is shown on Figure 27(*e*). It will be assumed at the start of the discussion that the $x/V$ stylus carriage 101 is not in an extreme left or right position so that limit switches S38 and S39, stylus override switches S36 and S37, and lead screw override switches S34 and S35 are in normal position as shown on Figure 27(*e*); that relay X6J is normally operated, as under the override switch conditions mentioned above; and that switch S42 is closed, as shown, to permit a ground pulse on lead 308 to enter the circuit.

During the course of normal apparatus operation, it was pointed out before, periodically a ground pulse on lead 308 occurs which activates the $x/V$ stylus control circuit. Such a pulse operates relays X1J and X2J, which lock to ground through closed make contact X2J–1 and closed break contact X3J–2. Thereupon, closed make contact X2J–2 places ground on the busy signal lead 312, previously discussed; and ground through closed break contact X5J–1 and closed make contact X1J–1 operate the stylus-depressor coil P215, whereby, as explained elsewhere, stylus 82 is pressed against the insulating $x/V$ punched card 96 (Figures 7 and 17) on the contactor plate; and through closed break contact X3J–1, the same ground path is completed to slow-operate relay X9J, which after a delay, operates. The delay permits the conducting stylus S82 to press against the punched card 96 before subsequent action occurs. The next essential step is that closing of contact X9J–2 operates slow-operate relay X4J, which by closing of make contact X4J–1 applies voltage to motor P208 which rotates in the proper direction to drive stylus S82 to the right as indicated by (R) on Figure 27(*e*).

Note that the driving force of motor P208 is transmitted through gearing and the pair of selsyn devices P207 and P216 to the $x/V$ stylus carriage 101. The circuit for driving motor P208 in the proper direction so that stylus S82 motion is to the right is from ground through closed make contact X6J–1, break contact X5J–3, motor P208, break contact X3J–3, make contact X4J–1, and resistor R2 to the negative bus. (Resistor R2 provides a means to reduce voltage on the motor and thus lower its rated speed somewhat.)

If while now moving to the right, stylus S82 falls through a punched hole in the insulating card to the grounded contactor plate, relay X3J operates. Opening of break contact X3J–3 removes voltage from motor P208 and closing of make contact X3J–3 creates a braking short on motor P208, whose rotation and that of the $x/V$ stylus carriage immediately cease. Opening of break contact X3J–1 releases relays X9J and X4J in turn, removing the negative bus connection to motor P208; and opening of make contact X3J–2 breaks the locking ground on relays X1J and X2J, which release, but note that owing to the delayed release of relay X1J, closed make contact X1J–1 maintains ground on stylus-depressor coil P215 until the end of the delay period. Thus release of relay X3J is delayed, by the delayed breaking of stylus S82 contact with the contactor plate, so that circuit elements may have time to return to normal status without reoperation.

If while moving to the right, as above, stylus S82 does not contact ground in scanning the punched card, the carriage eventually operates the right limit switch S39, thereupon operating relay X8J through closed break contact X5J–2. Ground through make contact X8J–3 operates relay X3J, which, as before when operated by stylus S82, stops rotation of motor P208 and motion of the stylus carriage. By the closing of make contact X8J–1, lead 330 is grounded and, as will be discussed later, a "trouble signal" indication occurs. Operation of the $x/V$ circuit may be resumed when push button S10 is depressed, as described below.

By operation of push button S10 ($x/V$ Reset on Figure 26), the $x/V$ stylus carriage 101 is driven to the left as indicated by (L) on Figure 27(*e*). Providing the carriage is not in left position so that left limit switch S38 is closed, then when push button S10 is depressed relay X5J operates, and, by closing make contact X5J–3, motor P208 rotates in the direction opposite to that described above, so that the stylus S82 moves to the left. The stylus- depressor coil P215 is not actuated so that stylus S82 is raised from the card for the leftward travel of the stylus carriage.

The circuit for driving motor P208 so that stylus S82 motion is to the left is from ground through make contact X6J–1, break contact X4J–1, break contact X3J–3, motor P208, make contact X5J–3, and resistor R2 to negative bus. It will be noted that direction of current flow through motor P208 is thus reversed for this case. The circuit returns to normal when either switch S10 is released or the left limit switch S38 is operated by the stylus carriage.

The stylus S82 may be driven in the rightward or scanning direction manually by depressing push button S11 ($x/V$ Test on Figure 26), as for testing or adjustment purposes, providing an insulating card is mounted on the contactor plate. The circuit is similar to that described for automatic operation, in that stylus S82 stops rightward motion when it falls into a hole, but the rightward motion occurs only while the push button is depressed and ceases when it is released, owing to the exclusion of locking relays X1J and X2J from the manual circuit.

In the course of normal apparatus operation, the Reset push button S10 is employed to advance the stylus leftward in preparation for running the next record.

The film magazine control circuit will now be described. The circuit for controlling advancing of profile film 15 by operation of motor P210 is shown on Figure 27(*e*). It will be assumed at the start of the discussion that relay X5G is operated by ground through closed break contact X12G–1 and that mechanical elements of the magazine and switches are in normal position as shown. Reference will be made to the mechanical arrangement and functional operation of the magazine, as shown on Figure 25, only to the extent that it is pertinent to the circuit under consideration; actual operation of the magazine has been explained previously with reference to Figure 25.

During the course of normal apparatus operation, it was pointed out above, a ground pulse on leads 309, 310 and 311, periodically activates the magazine control circuit. Providing switch S40 is closed, such a pulse operates relay X1G through closed make contact X5G–3. Relay X1G locks through its own make contact X1G–1 and closed break contact X4G–1 to ground. Thereupon, closed make contact X1G–5 places ground on the busy signal lead 312, previously discussed, and it will be observed in anticipation that make contact X4G–3 when closed may likewise ground lead 312, so that the busy signal is maintained so long as either relay is operated.

Also when relay X1G operates, motor P210 starts rotation of the film 21 take-up roller 28 as shown by the arrow on shaft 413 in Figure 25. The circuit in Figure 27(*e*) is from ground through resistor R18, make contact X1G–3, motor P210, and make contact X1G–4 to negative bus. Thereafter, as described above with reference to Figure 25, ratchet wheel 417, shown schematically in the wiring diagram, Figure 27(*e*), rotates and lifts pawl 418, thereby closing the make contact of switch S33 prior to the maximum lift of pawl 418. Thus slow-release relay X2G, whose release time is slightly prolonged by the presence of capacitor C17, is operated, and it is apparent that closed make contact X2G–1 operates slow-release relay X3G in turn.

Meanwhile, rotation of ratchet wheel 417 continues lifting pawl 418 to the top of the tooth whereupon, as described previously, pawl 418 drops into the succeeding notch. Accordingly, switch S33 which is a snap-action type releases, its arm returning to the break position as shown on Figure 27(*e*), so that ground now is applied to relay X4G through closed make contact X3G–1. Relay X4G operates and remains operated essentially for the duration of the successive release times of relays X2G and X3G, whose release is initiated when make contact of switch S33 opens and removes ground from the coil of relay X2G.

During the interval just described for which relay X4G is operated, locking ground on relay X1G is removed by opening of break contact X4G–1, so that relay X1G releases, and concurrently a circuit is provided to reverse rotation of motor P210. The circuit is from ground through make contact X4G–1, to break contact X1G–4, motor P210, break contact X1G–3 to negative bus. It may be noted that this path through motor P210 is opposite to that existing just previous to operation of relay X4G. For the original direction of motor rotation, resistor R18 in the motor circuit provided slower-than-normal motor rotation speed; for the reversed direction full voltage is applied to motor P210 which then, upon simultaneous increase in voltage and voltage-polarity reversal, quickly stops and accelerates in the new direction. When relay X4G releases as described above at the end of the operation interval, motor P210 stops rotation, and the control circuit returns to normal condition.

For the duration of the magazine control cycle just described it will be noted that either relay X1G or relay X4G is operated. Thus by the parallel connection of contacts X1G–2 and X4G–2 and ground provided by lead 343, to be explained presently, voltage is applied to the heating element of thermal switch or relay X12G. If the element of relay X12G is heated sufficiently to operate and open its break contact X12G–1, then relay X5G releases and applies ground to lead 330; and open make contact X5G–3 releases relay X1G, following which motor P210 stops. Ground on lead 330 initiates operation of "trouble signal" indication, as will be discussed later. Heating and operation of thermal relay X12G can thus occur only if lead 343 is grounded, and ground can occur on lead 343 only when the carriage assembly is on the right limit switch S44 so that make contact X3F–1 is closed. Thus prolonged manual operation of the magazine, as by use of push button switch S8 or S9, normally performed when the carriage assembly is not on right limit switch S44, does not operate thermal relay X12G and release relay X1G prematurely.

The heating time for thermal relay X12G is preferably on the order of 20 to 30 seconds. Thus, during the course of normal operation of the apparatus, if the magazine for instance runs out of film on some operating cycle, ratchet 417 (which is driven by film 21 as it passes over roller 30, Figure 25) will fail to operate switch S33, and contact X1G–2 remains closed. In such a case, the carriage assembly will be on the right limit switch S44, so that ground is provided for the thermal circuit. If contact X1G–2 (or X4G–2) thus remains closed for the duration of the heating time of relay X12G, as described above, relay X12G operates, motor P210 stops, and the "trouble signal" indication occurs.

Push button switch S5 (Magazine Test on Figure 26), when momentarily depressed, is employed to test magazine operation ordinarily when the apparatus is not in use. It will be seen from circuit connections on Figure 27(*c*) that the function of switch S5, when operated, is to remove ground from slow-release relay X5C and apply a ground pulse on lead 311 through the still-closed make contact X5C–1. The subsequent ground on lead 319 is of no significance when testing as described, since various circuit components associated with relay X7G are at this time not connected to ground. Thus the ground pulse on lead 311 produces one cycle of magazine operation, as previously described.

Push button switch S9 (Magazine Adv on Figure 26) is employed to advance magazine film 21 steadily while held depressed, as before or after a profile is run in order to provide a strip of clear film 21 at each end. In this case a ground through rectifier P278 operates relay X1G which, as explained above, rotates the motor P210 in the proper direction to wind film 21 on to the take-up roller 28 (Figure 25). Simultaneously a ground circuit through rectifier P279, lamp P15, switch S83, and make contact X1G–4 to negative bus lights lamp P15 upon closure of switch S83 by actuation of cam 402 (Figure 4), as previously explained. Rectifiers P278 and P279 are employed to prevent circuit interaction.

Reference has been made above to a "trouble signal" in connection with operation of the SC stylus control circuit, the $x/V$ stylus control circuit, and the magazine control circuit, whereby a ground is placed on lead 330 for certain trouble conditions which can arise in these circuits. In Figure 27(*c*) it will be noted that a ground on lead 330 operates relays X10G and X11G, providing make contact X4F–6 is closed. This contact will normally be closed on the occasion that a ground occurs on lead 330, since in normal operation the carriage assembly will be in the right limit position, held there by a "busy signal," so that relay X4F is therefore operated. Relays X10G and X11G thereafter lock to ground on closed make contact X10G–1.

Several circuit functions result from the operation of relays X10G and X11G. Among these is the release of relay X7G, should relay X7G be held operated. This can occur following Repeat path button S6 operation, owing to the fact that make contact X3B–5 is held closed during the first play-back cycle thereafter by a still-closed preset switch S58, and that closed make contact X3B–5 is in the lock circuit for relay X7G, as previously discussed. Thus if a trouble signal occurs in such circumstance, relay X7G releases by opening of break contact X10G–2, and restores the buzzer P220 connection by lead 329 through closed break contact X7G–3 to the intermittent pulsing circuit of relays X8G and X9G; and removes the blocking ground on relay X8G by opening of make contact X7G–2. Thus, in the case cited, control of relays X8G and X9G is restored to normal. In any case, however, by operation of relay X10G, closed make contact X10G–3 now provides ground to the pulsing relays X8G and X9G, which thus produce an intermittent ground on lead 318 as previously described in connection with closing of make contact X6G–1.

The intermittent ground on lead 318, then in the SC stylus control circuit, flashes lamp P4 through make contact X11H–2, if it is closed; in the $x/V$ stylus control circuit, flashes lamp P5 through make contact X8J–2, if it is closed; or in the magazine control circuit, flashes lamp P3 through break contact X5G–2 if it is closed. It will be recalled that the relays enumerated in these circuits are the relays which placed ground on lead 330 to initiate operation of the trouble circuit. Note should also be taken of the fact that while any of these relays can initiate a trouble signal, the lamp which is flashing corresponds to the circuit in which trouble develops. The indication is appropriate, likewise, if trouble develops in more than one circuit concurrently. The buzzer P220 sounds intermittently in synchronism with the flashing lamp by ground on lead 329.

Also, by operation of relay X10G, contact X10G–5, which is shown on Figure 27(*b*) in connection with delay-release relay X3D, provides a ground pulse to operate relay X1C, which locks to ground through closed make contact X2E–2 of the sequence circuit. Upon release of relay X3D, a ground circuit through closed make contact X10G–5 and closed break contact X3D–1 is placed on lead 344. As pointed out above, relay X4F is operated under trouble signal conditions, so that the ground on lead 344, through closed make contact X4F–5, is applied to relays X7D and X8D, and voltage is applied to motor P206, in the manner discussed previously, whereupon motor P206 drives the carriage assembly to the left.

When the carriage assembly starts to the left from the right limit position, the sequence-circuit relay X2E releases. Make contact X2E–2, which holds the locking ground to relay X1C, now opens, and relay X1C releases. Upon release of relay X1C, a "stop" pulse through lead 316 operates relay X5D, the function of which, in stopping the carriage assembly when it reaches the left limit position, has been previously described.

Meanwhile, the shutter actuator coil P212 which normally is operated, as previously described, during the leftward travel of the carriage assembly, remains closed following a trouble signal, by opening of break contact X10G–6. Hence, no exposure by variable-density lamp P12 is made on profile film 21 as the carriage assembly returns to the left position.

Also, closing of make contact X11G–1, upon occurrence of a trouble signal, operates latch relay X7C, which remains latched until coil X8C is eventually energized to release the contacts of relay X7C. It should be noted that relay X7C is a latch type relay so that it will retain its operated status whether or not, during the process of trouble location, main power should be turned off. One of the functions of latched relay X7C is to maintain ground on lead 335 by closed make contact X7C–1 so that on whichever record track the trouble occurred, the corresponding lamp P16 remains lighted, it being noted that the arm of either step-switch bank X12A or X12A–5 remains on the contact position in question. This information is of value for subsequent trouble diagnosis. For example, the operator may have omitted the hole for one of the tracks in either the SC or *x*/*V* card. When the source of trouble is remedied, as by replacement of a defective card and apparatus operation is restored in normal manner, then a ground pulse on lead 337 generated by the slow operation of relay X8K through break contact X8K–2 operates the coil X8C, whereupon relay X7C releases.

Further, prior to the release of relay X7C, however, closed make contact X7C–2 operates relay X9C which locks on the closed break contact X3F–1 to ground, the carriage assembly now not being on the right limit switch S43. The function of relay X9C, in turn, is to provide a gate by open break contact X9C–2 between lead 310 and lead 311, so that a normal ground pulse on lead 310 (from lead 309) cannot operate the magazine control circuit while the carriage travels to the right on resumption of operation. It should be noted that the magazine already advanced profile film 21 on the last previous play-back cycle, the one on which trouble occurred, and the unexposed film space is still in correct position for the reproduction of the record track in question. In practice, the operator closes preset switches S58 for those tracks previously reproduced, sets the record-carrier plate 25 to the original starting position, and performs the Skip push button S4 function described above for the tracks already reproduced, whereupon the play-back cycle starts with the track on which trouble occurred.

As a result of the above provisions for a trouble signal situation, the circuits provide information that certain trouble conditions have occurred, in which circuit and at what point in the operation, return the carriage assembly automatically to the left so that the main plate and record-carrier plate 25 may be cranked into load position and the cover opened for inspection of trouble conditions without fogging film 21, particularly if either SC or *x*/*V* punch card or stylus is at fault, and permit resumption of play-back on the advanced, but unexposed film 21.

An auxiliary circuit is provided to act as a continuous monitor on certain sequential operations, and in case of failure of certain switches, relays of contacts, operation ceases and a special signal lamp P67 on Figure 28(*c*) lights. When the apparatus is placed in operation and a ground pulse is placed on lead 338, generated by the slow operation of relay X8K through break contact X8K–1, relay X9D operates and locks to ground through closed contact X2F–2 associated with the normal position of the carriage assembly on the left limit switch S43 and through its own make contact X9D–1. The locking path also includes, in parallel, sequence-circuit contact X4E–6 and contacts X5F–3 and X3F–3, of relays whose operations have been described. As a result, when circuits operate in proper synchronism, relay X9D remains continuously operated. If however a break occurs in the locking circuit through faulty operation, as indicated above, relay X9D releases and lamp P67 lights. Concurrently, when make contact X9D–2 opens, relays X7D and X8D, with which it is shown in association on Figure 27(*b*), also open and remove voltage from motor P206 as previously explained. Thereupon, the capacitor C1, which is shown on Figure 27(*c*) in association with relay contact X7D–2, is connected to brake actuator P209. The charge on capacitor C1 is thus transferred from closed break contact X7D–3 to make contact X7D–3 and actuator P209, resulting in immediate braking of motor P206 rotation and carriage assembly motion.

Likewise, the charge on capacitor C1 is transferred to brake actuator P209 in case of main power failure, or release of marginal lock relay X1K, as, for instance, by release of ground on lead 336 should the carriage assembly pass by either limit switch and operate override switch S45 or S46. Thus consequent removal of voltage from the negative bus, and from the coil of relay X7D in particular, results in immediate stopping of motor P206 rotation and carriage assembly motion. The storage of energy in capacitor C1 and its application to brake actuator P209 is a precautionary feature to prevent possible mechanical damage to the equipment upon occurrence of such events as described.

In the foregoing description of control circuits with reference to the wiring diagrams of Figure 27, not all possible circuits and circuit combinations have been discussed. Many other operations are performed automatically owing to inherent properties of the circuits shown on Figure 27.

Having thus described the mechanical and electrical features of the invention and their respective functions it is believed apparent to those skilled in the art that, with the magnetically-recorded seismogram and the associated SC and *x*/*V* cards being inserted in their respective places, the machine will automatically transduce the magnetic tracks in controllable sequence. This sequence is determined by the known shot and detector locations along the profile line and with proper presetting of the machine controls, the machine automatically operates in proper sequence, stopping and calling the operator when a new magnetic record is to be placed in the machine or when a special or otherwise unusual operation is to be performed. Upon completion of the profile, the operator runs several inches of blank film through the magazine and takes it to a dark room for development in customary manner. Subsequently any desired number of photographic prints or reproductions may be made for use of geophysicists, geologists or others concerned with the interpretation of the finished profile print.

Whereas the apparatus has been described as employing a moving magnetic play-back head, it is within the purview of this invention to mount the magnetic record on a drum which is rotated under the magnetic play-back head. In such an embodiment the magnetic play-back operation may be interrupted while the lamp housing is returned to the right-hand end of its travel, and rotation of the drum and leftward travel of the lamp housing are synchronized. In such an embodiment also the cord which effects the corrections may be arranged to shift the magnetic play-back head instead of the magnetic record as in the present embodiment. A further embodiment is also contemplated in which both the magnetic record and the profile film are mounted on an elongated drum, in which case both the magnetic record and the profile film are moved under the play-back head and the lamp housing respectively. Such an embodiment has the advantage that the magnetic record drum and the profile film drum may be made to have different diameters whereby the scale of the profile may easily be made different from that of the magnetic record.

Mention was previously made of the fact that in a profile of the type shown in Figure 2 the seismic impulses "paint a picture" of the underground formations. The "picture" presented by the profile is actually a time picture which will be of the same general form as the geological formations, particularly in the case of horizontal or gently dipping beds. A depth plot may be calculated from profile prints of this type by converting the time to depth by means of the known time-depth curve Figure 18. The profile shown in Figure 2 shows many dipping alignments of impulses from which it is logical to infer that the reflecting formation from which such alignment came was also dipping. As is well known, the actual reflection points are offset to the side of their position in Figure 2. The "picture" painted by Figure 2 may be further transformed by making offset calculations of the reflection points.

In describing the invention emphasis has been placed on its broad aspects, but it is apparent that many combinations and sub-combinations of the various elements described are inventions in themselves which are intended to be covered in this application or in continuing applications.

Certain features disclosed in this application are disclosed and claimed in my copending applications Serial No. 560,928 filed January 24, 1956 on Method and Apparatus for Controlling an Analog Computer, and Serial No. 586,519 filed on May 22, 1956, now Patent No. 2,861,752 on Film Transport Mechanism, as well as the previously mentioned application Serial No. 561,085 filed January 24, 1956 on Seismograph Profile Printer, now Patent No. 2,861,507 all of which are assigned to the same assignee as the present application.

What I claim as my invention is:

1. Apparatus for making a seismic profile from selected tracks of a multi-channel seismographic magnetic record which comprises a carriage for holding the magnetic record, a magnetic play-back head adapted to magnetically engage the magnetic record, means for supporting a photographic medium on which the profile is to be made, a restricted light source adapted to photographically expose successive longitudinal strips of said photographic medium, automatic means connected to said light source and to said play-back head repeatedly synchronously moving said light source and said play-back head back and forth with respect to said medium and said record respectively, amplifier means having input terminals connected to said play-back head and having output terminals connected to said light source to vary the illumination of said light source in response to signals from said play-back head whenever said play-back head moves from the long-time end of said magnetic record toward the shot-moment end of said magnetic record, and electrical circuit means short circuiting the input terminals of said amplifier means whenever said play-back head moves from the shot-moment end of said magnetic record to the long-time end of said magnetic record.

2. Apparatus for producing a seismic profile having a side-by-side time-coordinate array of time-corrected seismograms on a photographic medium from a plurality of elongate magnetic record type reflection seismograms requiring fixed corrections and variable corrections which comprises a seismogram holder having an elongate flat bed supporting a magnetic record type seismogram thereon, said seismogram holder being movable lengthwise of said bed, a magnetic play-back head adapted to engage said seismogram, means mechanically connected to said play-back head moving the same lengthwise and in magnetic engagement with said seismogram from the long-time end of said seismogram to the shot-moment end of said seismogram, a variable-intensity light source, means supporting a photographic medium on which the profile is to be made and positioning for photographic exposure a straight strip of said photographic medium parallel to said seismogram, means mechanically connected to said light source moving the same on said strip of said photographic medium in synchronism with motion of said play-back head to photographically expose said strip of said medium when said play-back head moves from the long-time end of said seismogram to the shot-moment end of said seismogram, amplifying means connecting said play-back head to said light source varying the intensity thereof, a first punched card mounted on said seismogram holder, the position of the perforation in said first punched card lengthwise of said seismogram being an analog of the required fixed correction applicable to said seismogram, means sensing a perforation in said first punched card connected to said seismogram holder moving the same lengthwise in proportion to the position of said perforation in said first punched card prior to movement of said play-back head from the long-time end of said seismogram to the shot-moment end of said seismogram, a mechanical analog computer adapted to compute the required variable correction applicable to said seismogram, a second punched card mounted on said seismogram holder, the position of the perforation in said second punched card being an analog of a parameter that is required to compute said variable correction, means sensing a perforation in said second punched card connected to said computer adjusting said parameter thereof in proportion to the position of said perforation in said second punched card prior to movement of said play-back head from the long-time end of said seismogram to the shot-moment end of said seismogram, said computer being mechanically connected to said seismogram holder and moving the same lengthwise in proportion to said variable correction during movement of said play-back head from the long-time end of said seismogram to the shot-moment end of said seismogram.

3. Apparatus for producing a seismic profile having a side-by-side coordinate array of time-corrected seismograms on a photographic medium from a plurality of elongate magnetic record type reflection seismograms requiring fixed corrections and variable corrections which comprises a seismogram holder having an elongate flat bed supporting a magnetic record type seismogram thereon, said seismogram holder being movable lengthwise of said bed, a magnetic play-back head adapted to engage said seismogram, means mechanically connected to said play-back head moving the same lengthwise and in magnetic engagement with said seismogram from the long-time end of said seismogram to the shot-moment end of said seismogram, a variable-intensity light source, means supporting a photographic medium on which the profile is to be made and positioning for photographic exposure a straight strip of said photographic medium parallel to said seismogram, means mechanically connected to said light source moving the same on said strip of said photographic medium in synchronism with motion of said play-back head to photographically expose said strip of said medium when said play-back head moves from the long-time end of said seismogram to the shot-moment end of said seismogram, amplifying means connecting said play-back head to said light source varying the intensity thereof, a first punched card mounted on said seismogram holder, the position of the perforation in said first punched card lengthwise of said seismogram being an analog of the required fixed correction applicable to said seismogram, means sensing a perforation in said first punched card connected to said seismogram holder moving the same lengthwise in proportion to the position of said perforation on said first punched card prior to movement of said play-back head from the long-time end of said seismogram to the shot-moment end of said seismogram, a mechanical analog computer adapted to compute the required variable correction from an analog of the parameter $x/V$ where $x$ is the shot-detector distance applicable to said seismogram and V is the near-surface seismic velocity applicable to said seismogram, a second punched card mounted on said seismogram holder, the position of the perforation in said second punched card being an analog of the $x/V$ parameter value applicable to said seismogram, means sensing a perforation in said second punched card connected to said computer adjusting the $x/V$ parameter thereof in proportion to the position of said perforation in said second punched card prior to movement of said play-back head from the long-time end of said seismogram to the shot-moment end of said seismogram, said computer being mechanically connected to said seismogram holder and moving the same lengthwise in proportion to said variable correction during movement of said play-back head from the long-time end of said seismogram to the shot-moment end of said seismogram.

4. Apparatus for producing a seismic profile having a side-by-side time-coordinate array of time-corrected seismograms on a photographic medium from a plurality of elongate magnetic record type reflection seismograms requiring fixed corrections and variable corrections which comprises a seismogram holder having an elongate flat bed supporting a magnetic record type seismogram thereon, said seismogram holder being movable lengthwise of said bed, a magnetic play-back head adapted to engage said seismogram, means mechanically connected to said play-back head moving the same lengthwise and in magnetic engagement with said seismogram from the long-time end of said seismogram to thhe shot-moment end of said seismogram, a variable-intensity light source, means supporting a photographic medium on which the profile is to be made and positioning for photographic exposure a straight strip of said photographic medium parallel to said seismogram, means mechanically connected to said light source moving the same on said strip of said photographic medium in synchronism with motion of said play-back head to photographically expose said strip of said medium when said play-back head moves from the long-time end of said seismogram to the shot-moment end of said seismogram, amplifying means connecting said play-back head to said light source varying the intensity thereof, a first punched card mounted on said seismogram holder, the position of the perforation on said first punched card lengthwise of said seismogram being an analog of the required fixed correction applicable to said seismogram, means sensing a perforation in said first punched card connected to said seismogram holder moving the same lengthwise in proportion to the position of said perforation in said first punched card prior to movement of said play-back head from the long-time end of said seismogram to the shot-moment end of said seismogram, a mechanical analog computer adapted to compute the required variable correction from an analog of the parameter $x/V$ where $x$ is the shot-detector distance applicable to said seismogram and V is the near-surface seismic velocity applicable to said seismogram, a second punched card mounted on said seismogram holder, the position of the perforation in said second punched card being an analog of the $x/V$ parameter value applicable to said seismogram, means sensing a perforation in said second punched card connected to said computer adjusting the $x/V$ parameter thereof in proportion to the position of said perforation in said second punched card prior to movement of said play-back head from the long-time end of said seismogram to the shot-moment end of said seismogram, said computer including multiplying means multiplying the $x/V$ parameter value from said second punched card by an amount $V/V_z$ where $V_z$ is the average seismic velocity and said multiplying means including a cam whose contour follows the known variable relationship between V and $V_z$ applicable to said seismogram, and said cam is moved in synchronism with the movement of said play-back head from the long-time end of said seismogram to the shot-moment end of said seismogram, said computer being mechanically connected to said seismogram holder and moving the same lengthwise in proportion to said variable correction during movement of said play-back head from the long-time end of said seismogram to the shot-moment end of said seismogram.

References Cited in the file of this patent

UNITED STATES PATENTS

| | | |
|---|---|---|
| 1,917,509 | De Ybarrondo | July 11, 1933 |
| 2,204,668 | Eggert | June 18, 1940 |
| 2,241,544 | Dreyer | May 13, 1941 |
| 2,243,730 | Ellis | May 27, 1941 |
| 2,292,099 | Bliss | Aug. 4, 1942 |
| 2,335,864 | Lang | Dec. 7, 1943 |
| 2,620,890 | Lee | Dec. 9, 1952 |
| 2,712,694 | Herbold | July 12, 1955 |
| 2,732,025 | Lee | Jan. 24, 1956 |
| 2,803,515 | Begun | Aug. 20, 1957 |
| 2,821,892 | Merten | Feb. 4, 1958 |
| 2,825,885 | Reynolds | Mar. 4, 1958 |